United States Patent
Naumann et al.

(10) Patent No.: US 12,297,011 B2
(45) Date of Patent: May 13, 2025

(54) METHOD OF SECURING A CLOSURE ON A CONTAINER

(71) Applicant: Husky Injection Molding Systems Ltd., Bolton (CA)

(72) Inventors: Tobias Naumann, Merzig (DE); Stephan Scherer, Trierweiler (DE); Ingo Willems, Saarwellingen (DE); Christophe Halter, Arlon (BE); Sebastian Rasche, Trier (DE); Cedric Boulay, Bulgneville (DE); Jean-Michel Raymond Pierre Cunche, Amnéville (FR); Günter Blesius, Wittlich (DE); Thomas Ara, Courcelles-Chaussy (FR); James Rodrigues, Mono (CA); Geoffrey Andrew Gow, Orangeville (CA); Douglas James Weatherall, Bolton (CA); Thibaud Jöel Philippe Brill, Freyming-Merlebach (FR); Thomas Schmidt, Neustadt an der Orla (DE); Gilles Lacome, Avril (FR); Joaquim Martins Nogueira, Everett (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 18/919,098

(22) Filed: Oct. 17, 2024

(65) Prior Publication Data
US 2025/0033819 A1 Jan. 30, 2025

Related U.S. Application Data

(63) Continuation of application No. PCT/CA2024/050392, filed on Mar. 28, 2024.
(Continued)

(51) Int. Cl.
B23K 103/00 (2006.01)
B23K 26/06 (2014.01)
(Continued)

(52) U.S. Cl.
CPC ...... B65D 41/3466 (2013.01); B23K 26/0643 (2013.01); B23K 26/0648 (2013.01);
(Continued)

(58) Field of Classification Search
CPC . B65B 7/2835; B65B 7/2842; B29C 65/1664; B29C 65/1687; B29C 66/542
(Continued)

(56) References Cited

U.S. PATENT DOCUMENTS

| | | |
|---|---|---|
| 2,001,248 A | 5/1935 | Greene |
| D196,082 S | 8/1963 | Stull |

(Continued)

FOREIGN PATENT DOCUMENTS

| | | |
|---|---|---|
| AU | 2009100256 A4 | 6/2009 |
| CA | 2 816 734 A1 | 5/2012 |

(Continued)

OTHER PUBLICATIONS

International Search Report and Written Opinion mailed Jun. 25, 2024 in connection with International Application No. PCT/CA2024/050392.

(Continued)

*Primary Examiner* — Stephen F. Gerrity
(74) *Attorney, Agent, or Firm* — Wolf, Greenfield & Sacks, P.C.

(57) ABSTRACT

Closures with a tamper evidence feature that is reshaped to connect it to the container neck are disclosed. Methods and systems for carrying out the methods, and to mold stacks for making the closures are also disclosed. The tamper evidence feature can be a band, a portion of a cylindrical skirt or a (Continued)

panel formed in the cylindrical skirt. The application of heat may deform the band inwardly to create a lip for engaging a flange on the container neck, or it may weld the tamper evidence feature to the flange.

28 Claims, 38 Drawing Sheets

Related U.S. Application Data

(60) Provisional application No. 63/552,344, filed on Feb. 12, 2024, provisional application No. 63/600,229, filed on Nov. 17, 2023, provisional application No. 63/535,174, filed on Aug. 29, 2023, provisional application No. 63/516,199, filed on Jul. 28, 2023, provisional application No. 63/507,747, filed on Jun. 13, 2023, provisional application No. 63/494,301, filed on Apr. 5, 2023.

(51) Int. Cl.
| | | |
|---|---|---|
| B23K 26/073 | (2006.01) | |
| B23K 26/082 | (2014.01) | |
| B23K 26/28 | (2014.01) | |
| B23K 26/352 | (2014.01) | |
| B23K 26/359 | (2014.01) | |
| B29C 45/00 | (2006.01) | |
| B29C 45/26 | (2006.01) | |
| B29C 45/42 | (2006.01) | |
| B29C 65/16 | (2006.01) | |
| B29K 67/00 | (2006.01) | |
| B29L 31/56 | (2006.01) | |
| B65B 7/28 | (2006.01) | |
| B65B 51/10 | (2006.01) | |
| B65B 51/22 | (2006.01) | |
| B65B 61/00 | (2006.01) | |
| B65D 41/34 | (2006.01) | |
| B65D 51/24 | (2006.01) | |

(52) U.S. Cl.
CPC ........ *B23K 26/0738* (2013.01); *B23K 26/082* (2015.10); *B23K 26/28* (2013.01); *B23K 26/352* (2015.10); *B23K 26/359* (2015.10); *B29C 45/0081* (2013.01); *B29C 45/26* (2013.01); *B29C 45/42* (2013.01); *B29C 65/1664* (2013.01); *B29C 65/1687* (2013.01); *B65B 7/2835* (2013.01); *B65B 7/2842* (2013.01); *B65B 51/10* (2013.01); *B65B 51/22* (2013.01); *B65B 61/00* (2013.01); *B65D 41/34* (2013.01); *B65D 41/3428* (2013.01); *B65D 41/3447* (2013.01); *B65D 41/3461* (2013.01); *B65D 51/248* (2013.01); *B23K 2103/42* (2018.08); *B29C 2045/0093* (2013.01); *B29C 2045/2695* (2013.01); *B29K 2067/003* (2013.01); *B29L 2031/565* (2013.01); *B65D 2401/15* (2020.05)

(58) Field of Classification Search
USPC ...... 53/412, 420, 442, 478, 490, 133.8, 557, 53/329.2, 329.4, 317, 331.5; 156/69, 156/272.8
See application file for complete search history.

(56) References Cited

U.S. PATENT DOCUMENTS

| | | |
|---|---|---|
| 3,673,761 A | 7/1972 | Leitz |
| 4,033,472 A | 7/1977 | Aichinger |
| D248,217 S | 6/1978 | Allen et al. |
| 4,206,851 A | 6/1980 | Ostrowsky |
| 4,206,852 A | 6/1980 | Dunn et al. |
| 4,345,692 A | 8/1982 | Obrist et al. |
| 4,346,812 A | 8/1982 | Banich, Sr. |
| 4,369,889 A | 1/1983 | Ostrowsky |
| 4,378,893 A | 4/1983 | Wilde et al. |
| 4,407,422 A | 10/1983 | Wilde et al. |
| 4,476,987 A | 10/1984 | Nolan |
| 4,506,795 A | 3/1985 | Herr |
| 4,595,110 A | 6/1986 | Herr |
| 4,598,833 A | 7/1986 | Herr |
| 4,638,917 A | 1/1987 | Persch |
| 4,640,427 A | 2/1987 | Marino et al. |
| 4,664,279 A | 5/1987 | Obrist et al. |
| 4,721,221 A | 1/1988 | Barriac |
| 4,844,272 A * | 7/1989 | Dutt .................. B65D 41/3495 215/232 |
| 5,004,112 A | 4/1991 | McBride |
| 5,242,068 A | 9/1993 | McCandless |
| 5,289,932 A | 3/1994 | Dimeo et al. |
| 5,390,469 A | 2/1995 | Shimizu et al. |
| 5,405,032 A | 4/1995 | Anderson |
| 5,581,978 A | 12/1996 | Hekal et al. |
| D385,191 S | 10/1997 | Cheek |
| 5,673,808 A | 10/1997 | Valyi et al. |
| 5,749,201 A | 5/1998 | Cochrane |
| 6,039,196 A | 3/2000 | Ekkert et al. |
| 6,095,359 A | 8/2000 | Richmond |
| 6,112,923 A | 9/2000 | Ma |
| 6,172,355 B1 | 1/2001 | Gast et al. |
| 6,199,350 B1 | 3/2001 | Brechel et al. |
| 6,371,317 B1 | 4/2002 | Krueger |
| D460,357 S | 7/2002 | Kras et al. |
| D465,731 S | 11/2002 | Brant et al. |
| 6,681,475 B2 | 1/2004 | Thibault et al. |
| D518,717 S | 4/2006 | German |
| D519,030 S | 4/2006 | Matsuda et al. |
| 7,032,631 B2 | 4/2006 | Py |
| 7,207,453 B2 | 4/2007 | Rossi |
| 7,243,689 B2 | 7/2007 | Py |
| D583,237 S | 12/2008 | Fuchs |
| D584,149 S | 1/2009 | Lohrman et al. |
| 7,669,390 B2 | 3/2010 | Py |
| 7,726,352 B2 | 6/2010 | Py et al. |
| D632,958 S | 2/2011 | Fuchs |
| D633,386 S | 3/2011 | Taber et al. |
| D634,200 S | 3/2011 | Taber et al. |
| 7,967,034 B2 | 6/2011 | Py |
| D647,800 S | 11/2011 | Rigling et al. |
| 8,132,600 B2 | 3/2012 | Py et al. |
| D686,886 S | 7/2013 | Meyers et al. |
| D687,299 S | 8/2013 | Peykoff et al. |
| 8,899,429 B2 | 12/2014 | Parrinello et al. |
| 9,061,457 B2 | 6/2015 | Schmid |
| D789,201 S | 6/2017 | Yu |
| D790,966 S | 7/2017 | Roberts et al. |
| D792,219 S | 7/2017 | Nunez |
| D836,442 S | 12/2018 | Wood et al. |
| D842,030 S | 3/2019 | Meyers |
| 10,377,534 B2 | 8/2019 | Hanan |
| D867,062 S | 11/2019 | Meyers |
| D869,274 S | 12/2019 | Kim |
| D869,275 S | 12/2019 | Taunk |
| D871,905 S | 1/2020 | Kim |
| D872,577 S | 1/2020 | Kim |
| D874,276 S | 2/2020 | Byron et al. |
| D885,896 S | 6/2020 | Edie et al. |
| D885,897 S | 6/2020 | Edie et al. |
| D885,904 S | 6/2020 | Kim |
| D920,040 S | 5/2021 | Kauffman et al. |
| D930,474 S | 9/2021 | Faragher |
| 11,214,410 B2 | 1/2022 | Hanan |
| 11,565,322 B2 | 1/2023 | Leichtfried et al. |
| D982,443 S | 4/2023 | Graux |
| D996,968 S | 8/2023 | Murali |
| 11,772,852 B2 | 10/2023 | Yonkers et al. |
| 12,006,089 B2 | 6/2024 | Bashir et al. |
| 2001/0015341 A1 | 8/2001 | Higgins |

(56) References Cited

U.S. PATENT DOCUMENTS

| | | |
|---|---|---|
| 2001/0027957 A1 | 10/2001 | Kano |
| 2002/0158037 A1 | 10/2002 | Kano et al. |
| 2003/0021920 A1* | 1/2003 | Williamson et al. ........................ B65B 7/2857 428/34.1 |
| 2003/0080130 A1 | 5/2003 | Goetz et al. |
| 2003/0132244 A1 | 7/2003 | Birkmayer et al. |
| 2004/0007556 A1 | 1/2004 | Manera et al. |
| 2005/0199574 A1 | 9/2005 | Bloom et al. |
| 2005/0217211 A1 | 10/2005 | Py |
| 2006/0000793 A1 | 1/2006 | Mavin et al. |
| 2006/0032831 A1 | 2/2006 | Major |
| 2006/0124575 A1 | 6/2006 | Mavin et al. |
| 2006/0138071 A1 | 6/2006 | Tsutsumi et al. |
| 2006/0138073 A1 | 6/2006 | Ooka et al. |
| 2006/0191594 A1 | 8/2006 | Py |
| 2007/0075083 A1 | 4/2007 | Mc Clellan |
| 2007/0131639 A1* | 6/2007 | Nakaya et al. ....... B29C 66/542 220/359.4 |
| 2007/0131642 A1 | 6/2007 | Human |
| 2007/0160792 A1 | 7/2007 | Human |
| 2008/0058495 A1 | 3/2008 | Quillen |
| 2008/0087625 A1 | 4/2008 | Kumata et al. |
| 2008/0264894 A1 | 10/2008 | Loughrin et al. |
| 2008/0314000 A1 | 12/2008 | Druitt |
| 2009/0020494 A1 | 1/2009 | Seelhofer |
| 2009/0050596 A1 | 2/2009 | Fuchs |
| 2009/0120556 A1* | 5/2009 | Nakaya et al. ... B29C 66/93431 219/121.64 |
| 2010/0094245 A1 | 4/2010 | Py |
| 2010/0200532 A1 | 8/2010 | Ekkert |
| 2011/0210122 A1 | 9/2011 | Benoit-Gonin et al. |
| 2011/0290754 A1 | 12/2011 | Taber et al. |
| 2011/0290755 A1 | 12/2011 | Taber et al. |
| 2012/0009109 A1 | 1/2012 | Wright et al. |
| 2012/0018401 A1 | 1/2012 | Win |
| 2012/0031871 A1 | 2/2012 | Molinaro et al. |
| 2012/0091091 A1 | 4/2012 | Steinberger |
| 2012/0211506 A1 | 8/2012 | Cerveny et al. |
| 2012/0318768 A1 | 12/2012 | Bashyam |
| 2013/0233481 A1* | 9/2013 | Hepp et al. ......... B29C 65/1435 156/499 |
| 2013/0313218 A1 | 11/2013 | Cox et al. |
| 2014/0001182 A1 | 1/2014 | Wood et al. |
| 2014/0158660 A1 | 6/2014 | Wood et al. |
| 2014/0263335 A1 | 9/2014 | Taber et al. |
| 2014/0319093 A1 | 10/2014 | Tsujiguchi et al. |
| 2015/0122769 A1 | 5/2015 | Taber et al. |
| 2016/0052694 A1 | 2/2016 | Li et al. |
| 2016/0332783 A1 | 11/2016 | Kim |
| 2017/0021978 A1 | 1/2017 | Keener |
| 2017/0166360 A1 | 6/2017 | Falzoni |
| 2018/0057227 A1 | 3/2018 | Bartow |
| 2018/0118418 A1 | 5/2018 | Nakamura |
| 2018/0162605 A1 | 6/2018 | Zeng et al. |
| 2019/0144169 A1 | 5/2019 | Byron et al. |
| 2019/0337691 A1 | 11/2019 | Kim |
| 2019/0337692 A1 | 11/2019 | Kim |
| 2019/0344933 A1 | 11/2019 | Kim |
| 2020/0031531 A1 | 1/2020 | Hanan |
| 2020/0189805 A1 | 6/2020 | Scherer |
| 2021/0260695 A1 | 8/2021 | Nakazawa |
| 2022/0097414 A1 | 3/2022 | Hariyama et al. |
| 2022/0119165 A1 | 4/2022 | Hanan |
| 2022/0176497 A1 | 6/2022 | Chan |
| 2022/0296470 A1 | 9/2022 | Wagner |
| 2022/0379515 A1 | 12/2022 | Friedli |
| 2024/0425240 A1 | 12/2024 | Naumann et al. |
| 2024/0425241 A1 | 12/2024 | Naumann et al. |
| 2025/0002229 A1 | 1/2025 | Naumann et al. |
| 2025/0033812 A1 | 1/2025 | Naumann et al. |
| 2025/0058939 A1 | 2/2025 | Naumann et al. |
| 2025/0058940 A1 | 2/2025 | Naumann et al. |

FOREIGN PATENT DOCUMENTS

| | | | |
|---|---|---|---|
| CA | 3023423 A1 | 6/2019 | |
| CA | 199572 S | 7/2022 | |
| CN | 301558183 S | 5/2011 | |
| CN | 112904581 A * | 6/2021 | ............. G02B 27/30 |
| EP | 0308995 A2 | 3/1989 | |
| EP | 0308995 A3 | 4/1989 | |
| EP | 0 698 559 A2 | 2/1996 | |
| EP | 0 698 559 A3 | 9/1996 | |
| EP | 002184374-0001 A1 | 2/2013 | |
| EP | 2957417 A1 * | 12/2015 | ........... B65B 7/2842 |
| EP | 015013769-0001 | 3/2023 | |
| FR | 2514326 A1 | 4/1983 | |
| FR | 044522-0001 | 4/2005 | |
| GB | 1 384 370 A | 2/1975 | |
| GB | 2 062 593 A | 5/1981 | |
| GB | 2 083 801 A | 3/1982 | |
| GB | 2 062 593 B | 6/1984 | |
| IN | 380978-001 | 3/2023 | |
| JP | S5942768 A * | 3/1984 | ......... B29C 65/1687 |
| JP | 4947775 B2 | 6/2012 | |
| JP | D1715329 S | 5/2022 | |
| WO | WO 93/23304 A1 | 11/1993 | |
| WO | WO 2005/056413 A1 | 6/2005 | |
| WO | WO 2006/092077 A1 | 9/2006 | |
| WO | WO 2008/102725 A1 | 8/2008 | |
| WO | WO 2013/029167 A1 | 3/2013 | |
| WO | WO-2017034172 A1 * | 3/2017 | ............. B23K 1/005 |
| WO | WO 2018/064250 A1 | 4/2018 | |
| WO | WO 2020/023402 A1 | 1/2020 | |
| WO | WO 2020/028387 A1 | 2/2020 | |
| WO | WO 2020/144183 A1 | 7/2020 | |
| WO | WO 2020/245062 A1 | 12/2020 | |
| WO | WO 2021/048333 A1 | 3/2021 | |
| WO | WO 2021/113061 A1 | 6/2021 | |
| WO | WO 2022/184528 A1 | 9/2022 | |
| WO | WO 2022/224287 A1 | 10/2022 | |
| WO | WO 2023/205730 A1 | 10/2023 | |

OTHER PUBLICATIONS

No Author Listed, Husky Beverage Containers—Good Looks that Perform—Consumer Goods. Jan. 20, 2021. 9 pages. Accessed at: https://www.husky.co/en/industries/consumer-goods/ [last accessed Jun. 15, 2024].

[No Author Listed], How to make a flat beam. Laser Pointer Forums. https://laserpointerforums.com/threads/how-to-make-a-flat-beam.98095/ Jul. 25, 2016. 8 pages.

* cited by examiner

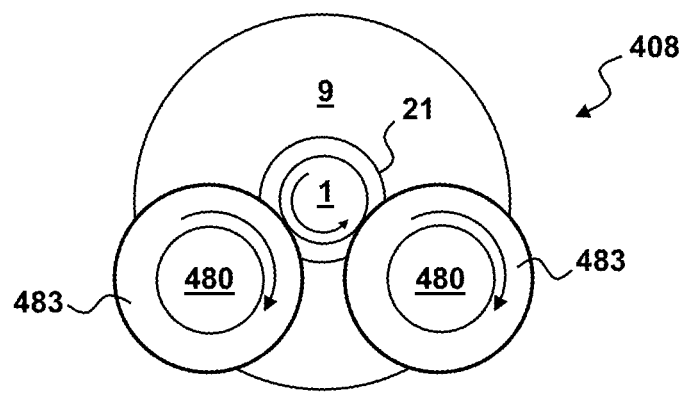
FIG. 28
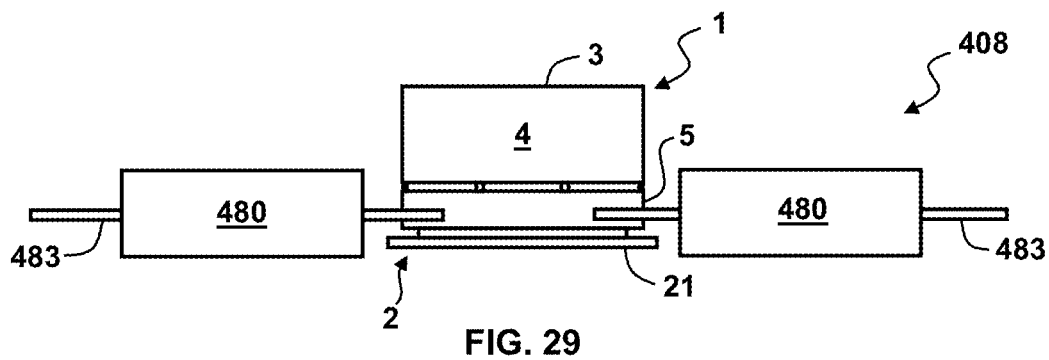
FIG. 29
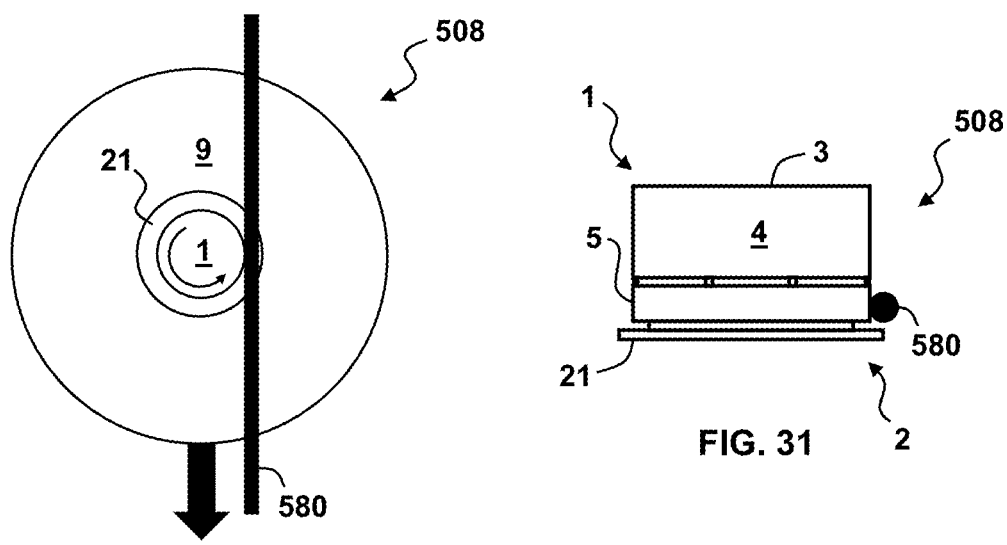
FIG. 30
FIG. 31

METHOD OF SECURING A CLOSURE ON A CONTAINER

CROSS REFERENCE TO RELATED APPLICATIONS

This Application is a continuation of and claims priority under 35 U.S.C. § 120 to International Patent Application Serial No. PCT/CA2024/050392, filed Mar. 28, 2024, which claims the benefit under 35 U.S.C. § 119(e)) to U.S. Provisional Application No. 63/552,344, filed Feb. 12, 2024, and to U.S. Provisional Application No. 63/600,229, filed Nov. 17, 2023, and to U.S. Provisional Application No. 63/535,174, filed Aug. 29, 2023, and to U.S. Provisional Application No. 63/516,199, filed Jul. 28, 2023, and to 63/507,747, filed Jun. 13, 2023, and to U.S. Provisional Application No. 63/494,301, filed Apr. 5, 2023. Each of the foregoing is incorporated herein in its entirety.

FIELD

This disclosure relates generally to closures with tamper evidence. More specifically, although not exclusively, aspects disclosed herein relate to molded closures for sealingly closing beverage containers, closures having tamper evidence feature(s) that can be engaged with a beverage container and to mold stacks, molds and molding systems for molding such closures, systems for perforating, slitting or cutting such closures, systems for installing and/or engaging closure tamper evidence features with a container neck and to methods associated with one or more of the aforementioned.

BACKGROUND

Containers, such as bottles, are generally provided with closures, such as caps, to fluidly seal the container.

Plastic beverage closures normally include four main functional elements: a tubular body, securing feature(s), sealing feature(s) and tamper evidence feature(s). The body typically includes a top wall, usually circular, with an annular side wall depending from the top wall. The side wall is typically in the form of a cylindrical skirt extending perpendicularly from the periphery of the top wall. The securing feature usually includes either a screw thread or a snap on feature, normally formed integrally with the side wall on the inner surface thereof and adjacent to the container opening, for example the neck of a bottle. One or more sealing features are used to seal the cap to the bottle to prevent leakage. One known tamper evidence feature includes a band frangibly connected to an open end of the tubular body of the closure by a series of bridges. The band can include a series of tabs connected by flexible hinges to a lower portion of the band and extend upwardly and inwardly thereof. The tabs engage an undercut surface of an external flange, or pilfer bead, on a container neck when the closure is secured thereto. With this arrangement, the action of unscrewing the closure from the container for the first time brings the tabs into contact with the flange, which prevents further upward movement of the tabs. Continued unscrewing of the closure beyond this point progressively places the frangible connection under tension and severs the bridges, thereby separating the tamper evidence band from the body of the closure.

SUMMARY

According to some aspects, a method of securing a closure on a container is disclosed. The method comprises placing the closure on a container neck of the container, conveying the container along a is conveying direction, and irradiating a portion of a tamper evidence band of the closure with a substantially planar laser beam to engage the portion of the tamper evidence band with the container neck as the container is conveyed along the conveying direction.

According to some aspects, a method of securing a closure on a container is disclosed. The method comprises placing the closure on a container neck of the container, conveying the container and the closure along a conveying direction, rotating the container and the closure as the container and the closure is conveyed along the conveying direction, and irradiating a portion of a tamper evidence band of the closure with a laser to engage the portion of the tamper evidence band with the container neck as the container and the closure are rotated and conveyed along the conveying direction.

Aspects of this disclosure are directed, generally but not exclusively, to molded articles, and to mold stacks, molds, molding systems, systems for perforating, slitting or cutting molded articles, systems for installing and/or engaging molded articles with other articles and to methods associated with one or more of the aforementioned.

Aspects of this disclosure are directed, in particular but not exclusively, to closures, and to mold stacks, molds, molding systems, systems for perforating, slitting or cutting closures, systems for installing and/or engaging closure tamper evidence features with a container neck and to methods associated with one or more of the aforementioned. The closure may comprise a molded closure. The closure may comprise a polymeric closure. The closure may comprise a plastic closure. The closure may comprise a thermoplastic closure.

According to a first broad aspect, there is provided a method of engaging a molded article with another article.

Another broad aspect relates to a method of installing a closure, e.g. a molded and/or polymeric and/or plastic and/or thermoplastic closure, on a container neck. The method may, but need not, comprise placing the closure over the container neck. The method may, but need not, comprise engaging a tamper evidence feature, e.g. one or more tamper evidence features, with the container neck.

The method may, but need not, comprise reshaping at least part of the closure and/or at least part of the container neck, e.g. to cause the tamper evidence feature(s) to engage with the container neck.

Another broad aspect disclosed herein relates to a method of installing a molded closure on a container neck comprising placing the closure over the container neck and reshaping part of the closure or container neck to cause one or more tamper evidence features to engage with the container neck.

The method, or reshaping part of the closure, may, but need not, comprise deforming or shrinking part of the closure, e.g. to engage the tamper evidence feature(s) with the container neck. The method, or reshaping part of the container neck, may, but need not, comprise deforming or shrinking part of the container neck, e.g. to engage the tamper evidence feature(s) with the container neck.

Another broad aspect relates to a method of installing a closure on a container neck comprising placing the closure over the container neck and deforming or shrinking part of the closure or container neck to cause one or more tamper evidence features to engage with the container neck.

Reshaping, deforming or shrinking part of the closure may, but need not, comprise plastically reshaping, deforming or shrinking part of the closure. Reshaping, deforming or shrinking part of the container neck may, but need not, comprise plastically reshaping, deforming or shrinking part of the container neck. Reshaping, deforming or shrinking part of the container neck may, but need not, comprise curling part of the closure.

Another broad aspect relates to a method of installing a molded and/or thermoplastic closure on a container neck comprising placing the closure over the container neck and plastically reshaping, deforming or shrinking part of the closure or container neck to cause one or more tamper evidence features to engage with the container neck.

Reshaping, deforming or shrinking part of the closure or container neck may, but need not, be carried out with the closure in a closed position on the container neck.

Another broad aspect relates to a method of installing a molded and/or thermoplastic closure on a container neck comprising placing the closure over the container neck and reshaping, deforming or shrinking part of the closure or container neck, with the closure in a closed position on the container neck, to cause one or more tamper evidence features to engage with the container neck.

The method may, but need not, comprise applying heat to the part of the closure or container neck, e.g. to deform or shrink it and/or to cause the tamper evidence feature(s) to engage with the container neck. The method may, but need not, comprise irradiating the part of the closure or container neck, e.g. to deform or shrink it and/or to cause the tamper evidence feature(s) to engage with the container neck. Applying heat to the part of the closure or container neck may, but need not, comprise irradiating it or subjecting it to heat.

Another broad aspect relates to a method of installing a closure on a container neck comprising placing the closure over the container neck and irradiating, or applying heat to, part of the closure or container neck to engage one or more tamper evidence features with the container neck.

The heat may be applied differentially. The method may comprise irradiating, or applying heat to, one side, e.g. a first side, of the part of the closure or container neck and not to the other side, e.g. a second side. The method may comprise irradiating, or applying heat to, the outside of the part of the closure or container neck and not to the inside or vice versa. Preferably, the method comprises irradiating, or applying heat to, the outside of the part of the closure or container neck and not to the inside.

Another broad aspect relates to a method of engaging a molded article with another article, the method comprising irradiating, or applying heat to, a first side of part of the molded article, without irradiating, or applying heat to, a second side of the part, opposite the first side, thereby to engage the molded article with the other article.

The method may comprise cooling the second side of the part before, after or as heat is applied to the first side.

In some examples, applying heat to the first side may comprises irradiating an outer surface with a laser so as to create a predetermined temperature differential between the outer surface and an inner surface on the second side.

Another broad aspect relates to a method of engaging a molded article with another article, the method comprising irradiating, or applying heat to, an outer surface of part of the molded article or the other article, without irradiating, or applying heat to, an inner surface of the part, thereby to engage the molded article with the other article.

The method may comprise cooling the inner surface of the part, for example before, after or as the outer surface is irradiated or heat is applied thereto.

In other examples, applying heat to the first side may comprises irradiating an inner surface with a laser so as to create a predetermined temperature differential between the inner surface and an outer surface on the second side.

Another broad aspect relates to a method of engaging a molded article with another article, the method comprising irradiating, or applying heat to, an inner surface of part of the molded article or the other article, without irradiating, or applying heat to, an outer surface of the part, thereby to engage the molded article with the other article.

The method may comprise cooling the outer surface of the part, for example before, after or as the inner surface is irradiated or heat is applied thereto.

Irradiating or applying heat to the outer or inner surface may comprise irradiating the surface with a laser, e.g. so as to create a predetermined temperature differential between the outer surface and the inner surface.

Cooling may be carried out with a cooling fluid, e.g. a jet of fluid such as air. The cooling fluid may, but need not, be cooled. The temperature of the cooling fluid may be the same or even above an ambient temperature.

The part of the molded article may comprise a coupling portion. The coupling portion may be adapted to be reshaped, e.g. in a post-molding operation, when heat is applied differentially to its external and internal surfaces.

Another broad aspect relates to a molded article comprising a coupling portion that is adapted to be reshaped in a post-molding operation when heat is applied differentially to its external and internal surfaces.

The molded article may comprise a polyalkylene terephthalate material, such as polyethylene terephthalate. In some examples, the polyethylene terephthalate material may comprise an intrinsic is viscosity of less than 0.8 dL/g. In further examples, the polyethylene terephthalate material may comprise an intrinsic viscosity of less than 0.7 dL/g. The polyethylene terephthalate material may comprise an intrinsic viscosity of between 0.4 dL/g and 0.8 dL/g. In some examples, the polyethylene terephthalate material may comprise an intrinsic viscosity of between 0.4 dL/g and 0.7 dL/g.

The polyethylene terephthalate (PET) material may comprise a multimodal PET. The PET may be formed of a first PET having a first molecular weight. The PET material may be formed a second PET having a second molecular weight higher than the first molecular weight.

Additionally, or alternatively, the molded article may comprise a different material or polymeric material, such as a polylactic acid or polylactide (PLA) material or any other suitable material.

The molded article may comprise a closure. The other article may comprise a container neck.

The part to which heat is applied may comprise a tamper evidence feature of the closure. The coupling feature may comprise a tamper evidence feature. The tamper evidence feature may comprise a tamper evidence band or sleeve.

Alternatively, the part to which heat is applied may comprise a portion of the container neck. The portion of the container neck may be deformed into engagement with a tamper evidence band of the closure.

In some examples, the molded article comprises a container neck. In such examples, the coupling portion may comprise a portion of the container neck that is deformable, e.g. to engage with a tamper evidence band of a closure.

Another broad aspect relates to a method of molding a closure using a polyethylene terephthalate material having an intrinsic viscosity of less than 0.8 dL/g.

The polyethylene terephthalate material may comprise an intrinsic viscosity of less than 0.76 dL/g. The polyethylene terephthalate material may comprise an intrinsic viscosity of between 0.4 dL/g and 0.8 dL/g, for example between 0.44 dL/g and 0.76 dL/g or between 0.4 dL/g and 0.7 dL/g. At least a tamper evidence feature of the closure may be formed of the polyethylene terephthalate material having an intrinsic viscosity of less than 0.8 dL/g, for example less than 0.76 dL/g or 0.7 dL/g. The tamper evidence feature may comprise a tamper evidence band or sleeve.

The intrinsic viscosity of the molded closure, e.g. after it has been molded, may be less than 0.7 dL/g or between 0.3 dL/g and 0.7 dL/g, for example between 0.55 dL/g and 0.7 dL/g. In some cases, the intrinsic viscosity of the molded closure, e.g. after it has been molded, may be less than 0.66 dL/g or between 0.34 dL/g and 0.66 dL/g. In other cases, the intrinsic viscosity of the molded closure, e.g. after it has been molded, may be less than 0.6 dL/g or between 0.3 dL/g and 0.6 dL/g.

The polyethylene terephthalate (PET) material may comprise a multimodal PET. The PET may be formed of a first PET having a first molecular weight. The PET material may be formed a second PET having a second molecular weight higher than the first molecular weight.

Another aspect relates to a closure comprising a polyethylene terephthalate material having an intrinsic viscosity of less than 0.7 dL/g.

The polyethylene terephthalate material of the closure may comprise an intrinsic viscosity of between 0.3 dL/g and 0.7 dL/g. In some cases, polyethylene terephthalate material of the closure may comprise an intrinsic viscosity of less than 0.66 dL/g or between 0.34 dL/g and 0.66 dL/g. In other cases, polyethylene terephthalate material of the closure may comprise an intrinsic viscosity of less than 0.6 dL/g or between 0.3 dL/g and 0.6 dL/g. The closure may comprise a tamper evidence feature, which may be formed of the polyethylene terephthalate material having an intrinsic viscosity of less than 0.7 dL/g. The tamper evidence feature may comprise a tamper evidence band or sleeve.

The polyethylene terephthalate (PET) material may comprise a multimodal PET. The PET may be formed of a first PET having a first molecular weight. The PET material may be formed a second PET having a second molecular weight higher than the first molecular weight.

Engaging the tamper evidence feature(s) with the container neck may, but need not, comprise irradiating or heating at least part of the container neck or the closure, e.g. at least part of the tamper evidence feature(s). The method may, but need not, comprise reshaping, deforming or shrinking the tamper evidence feature(s), e.g. to engage it or them with the container neck. Additionally, or alternatively, the method may, but need not, comprise reshaping, deforming or shrinking the container neck, e.g. to engage it with the tamper evidence feature(s).

The method may, but need not, comprise irradiating, or applying heat to, the tamper evidence feature(s), e.g. to reshape, deform or shrink the tamper evidence feature(s) and/or to engage it or them with the container neck. The method may, but need not, comprise irradiating, or applying heat to, the container neck, e.g. to reshape, deform or shrink part of the container neck and/or to engage it with the tamper evidence feature(s).

Reshaping, deforming or shrinking the tamper evidence feature(s) may comprise curling the tamper evidence feature(s). In examples where the tamper evidence feature(s) comprise(s) a tamper evidence band, reshaping, deforming or shrinking the tamper evidence feature(s) may comprise curling the tamper evidence band, for example a free edge or free edge portion of the tamper evidence band.

Engaging the tamper evidence feature(s) with the container neck may comprise movably engaging the tamper evidence feature(s) with the container neck. Engaging the tamper evidence feature(s) with the container neck may inhibit removal of the tamper evidence feature(s) from the container neck when the closure is removed therefrom.

However, engaging the tamper evidence feature(s) with the container neck may allow one or more other degrees of movement, e.g. whilst limiting at least one degree of movement. In some cases, such engagement of the tamper evidence feature(s) to the container neck may allow movement or rotation therebetween, for example to enable the closure to be unscrewed from the container neck or at least rotated relative thereto.

It should be appreciated that engaging the tamper evidence feature with the container neck may include a form of intimate contact therebetween, e.g., where the tamper evidence feature is shrunk onto the container neck. In this respect, such engagement may include simply coupling the tamper evidence feature(s) to the container neck so that the tamper evidence feature(s) is or are held to the container neck and remains therewith when the closure is unscrewed or otherwise opened to allow dispensing or access to the contents of the container.

In other examples, the method may, but need not, comprise welding the tamper evidence feature(s), e.g. to engage the tamper evidence feature(s) with the container neck.

Engaging the tamper evidence feature(s) with the container neck may, but need not, comprise attaching the tamper evidence feature(s) to the container neck. Engaging the tamper evidence feature(s) with the container neck may, but need not, comprise connecting the tamper evidence feature(s) to the container neck. Engaging the tamper evidence feature(s) with the container neck may, but need not, comprise securing the tamper evidence feature(s) to the container neck.

The or each tamper evidence feature may be frangibly connected to the closure, for example such that it remains on the container neck upon removal of the closure therefrom. The or each tamper evidence feature may be frangibly connected to the closure by a line of weakness. The line of weakness may be configured to be severed, in use, on removal of the closure from the container neck, e.g. thereby causing the tamper evidence feature to remain on the container neck.

Alternatively, the or each tamper evidence feature may be configured to remain on the closure upon removal of the closure from the container neck. In such cases, the or each tamper evidence feature may be configured to deform, e.g. mechanically, on removal of the closure or first removal of the closure.

Another broad aspect relates to a method of installing a closure on a container neck comprising placing the closure over the container neck and irradiating, or applying heat to, one or more tamper evidence features to engage the tamper evidence feature(s) with the container neck.

The method may comprise irradiating, or applying heat to, at least part of a circumference of the closure, e.g. to engage the tamper evidence feature(s) with the container neck about at least part of its circumference.

Another broad aspect relates to a method of installing a closure on a container neck comprising placing the closure over the container neck and irradiating, or applying heat to, part of the closure or container neck about at least part of the circumference thereof to engage one or more tamper evidence features with the container neck about at least part of the circumference of the closure or container neck.

Another broad aspect relates to a method of installing a closure on a container neck comprising placing the closure over the container neck and irradiating, or applying heat to, one or more tamper evidence features about at least part of a circumference of the closure to engage the tamper evidence feature(s) with the container neck about at least part of its circumference, wherein at least part of the or each tamper evidence feature is configured to be severed, in use, from the closure on removal of the closure from the container neck, thereby causing the tamper evidence feature to remain on the container neck.

The method may comprise generating a visual indicator when the closure or container neck is reshaped, which may be indicative of the reshaping. The method may comprise crystallizing the reshaped part of the closure or container neck, for example by the application of heat. The crystallization may be or provide the visual indicator. The method may comprise changing a color or opacity of the reshaped part of the closure or container neck, e.g. wherein the color is or provides the visual indicator. The method may comprise providing the closure or the part of the closure to be reshaped with an additive configured to change color when exposed to a predetermined heat for a predetermined period. The method may comprise providing the container or the part of the container to be reshaped with an additive configured to change color when exposed to a predetermined heat for a predetermined period. The additive may comprise a light sensitive additive.

The tamper evidence feature(s) may be on or form part of the closure.

Another broad aspect disclosed herein relates to a closure, e.g. for sealingly closing a neck opening of a container. The closure may comprise a top wall. The closure may comprise a side wall or cylindrical skirt, hereinafter cylindrical skirt. The cylindrical skirt may depend from the top wall. The closure may comprise a tamper evidence feature. The tamper evidence feature may be connected to the closure, for example to the cylindrical skirt. The tamper evidence feature may, but need not, be frangibly connected to the closure, for example to the cylindrical skirt.

At least part of the cylindrical skirt and/or the tamper evidence feature may comprise an inner surface. In some examples, the inner surface has one or more engaging features, such as tabs or cams. In other examples, the inner surface is substantially cylindrical and/or featureless. The inner surface may, but need not, be featureless and/or devoid of engaging features, e.g. for enabling an engaging feature of the container neck to be received therein an unencumbered manner. The engaging feature may comprise a flange. The tamper evidence feature may comprise a tamper evidence band.

Another broad aspect relates to a closure, e.g. for sealingly closing a neck opening of a container, the closure comprising a top wall, a cylindrical skirt depending from the top wall and an annular tamper evidence band frangibly connected to the cylindrical skirt, wherein the tamper evidence band comprises a substantially cylindrical inner surface that is featureless and/or devoid of engaging features for enabling an engaging feature, e.g. a flange, of the container neck to be received therein an substantially unencumbered manner.

The tamper evidence feature may, but need not, be connected to the closure, e.g. the cylindrical skirt by a line of weakness or by a membrane.

Another broad aspect relates to a closure, e.g. for sealingly closing a neck opening of a container, the closure comprising a top wall, a cylindrical skirt depending from the top wall and an annular tamper evidence band connected to the cylindrical skirt by a line of weakness or a membrane, wherein the tamper evidence band comprises a substantially cylindrical inner surface that is featureless and/or devoid of engaging features for enabling an engaging feature, e.g. a flange, of the container neck to be received therein an unencumbered manner.

The tamper evidence band may be substantially free of residual hoop stress. The tamper evidence band may be molded by a substantially cylindrical outer surface of a core for inhibiting internal stresses within the molded tamper evidence band.

The closure may comprise or be formed of polyethylene terephthalate.

The inventors have determined that omitting and/or minimizing the radial extent of conventional engagement features, such as cams or tabs, from the tamper evidence band during the molding stage is advantageous for demolding and capping. More particularly, where bridges are molded into a closure, forcing such engagement features over the core part of the mold during demolding can stress the bridges, as can forcing them over the tamper evidence bead of the container neck during capping. These phenomena can be particularly problematic when the closure is formed of a polyethylene terephthalate material, due to its inherent mechanical properties. As such, the omission and/or reduction of such features reduces the complexity of demolding and capping, particularly for closures is formed of a polyethylene terephthalate material.

Moreover, the inventors have also determined that the application of heat to the tamper evidence feature(s) will cause them to deform in predetermined ways, enabling such features to be configured to engage with the container neck upon such application of heat. By way of example, the inventors have determined that the free end portion of a tamper evidence band will normally contract if heat is applied to its external surface in this region. Without wishing to be bound by any particular theory, the inventors believe that the deformation or shrinkage of the tamper evidence features that results from applying heat thereto, is due to the temperature difference between the heated external region and the unheated internal region. Tests have been carried out which support this theory, whereby heat applied to an internal region of the tamper evidence band caused it to expand or curl outwardly. The inventors also believe that the adjacent region of the container neck may function as a heat sink as the tamper evidence band contacts this region during its contraction, further enhancing this effect.

Another broad aspect relates to a closure for sealingly closing a neck opening of a container, the closure comprising a top wall, a cylindrical skirt depending from the top wall and an annular tamper evidence band connected to the cylindrical skirt by a membrane, wherein the closure is formed of polyethylene terephthalate.

The membrane may have a radial wall thickness that is less than that of the tamper evidence feature and/or the cylindrical skirt. The membrane may be configured to be perforated or slit, for example to provide a frangible connection or line of weakness between the tamper evidence feature and the closure or cylindrical skirt. In some examples, the membrane has one or more localized regions of greater thickness. The membrane may have one or more ribs, which may be thicker or have a radial wall thickness that is greater than that of the rest of the membrane. The thickness of the or each rib may be similar or substantially the same as the thickness of the tamper evidence band.

The one or more ribs may comprise a plurality of ribs, for example wherein the membrane is configured to be cut, in use, between the ribs. The ribs may be configured to provide bridges, e.g. frangible bridges, joining the tamper evidence band to the cylindrical skirt.

The one or more ribs may comprise a single rib. The membrane may be configured to be perforated or slit, for example to provide a frangible connection or line of weakness between the tamper evidence feature and the closure or cylindrical skirt. The single rib may be configured to provide a tether, e.g. for retaining the closure on the container neck.

The provision of a membrane molded into the closure to be demolded and subsequently capped, instead of bridges molded into the closure, can further mitigate the issues relating to the use polyethylene terephthalate material in closures. The membrane can then be slit after capping to provide a frangible connection.

The membrane or frangible connection or bridges may be substantially cylindrical or extend axially. The membrane or frangible connection or bridges may be substantially aligned with and/or parallel to the cylindrical skirt or tamper evidence band.

In some examples, the tamper evidence band may be larger than the cylindrical skirt. The tamper evidence band may have a diameter that is larger than that of the cylindrical skirt. The tamper evidence band may be connected, for example frangibly connected, to the cylindrical skirt by a membrane or frangible connection or one or more bridges that extend radially and/or axially. The membrane or frangible connection or one or more bridges may extend at an angle relative to both the radial and axial directions. The tamper evidence band may be connected, for example frangibly connected, to the cylindrical skirt by a radial membrane or one or more radial bridges. The tamper evidence band may be connected to the cylindrical skirt by a conical or frustoconical membrane.

The tamper evidence features may comprise one or more tabs. The tamper evidence band may comprise one or more tabs, e.g. included, described or defined therein. The or each tab may be deformable or may be hinged to the tamper evidence band. The or each tab may be hinged along one of its edges, e.g. a first edge. The or each tab may be connected to the tamper evidence band only along the hinged or first edge. The or each tab may have a reduced wall thickness. The method may comprise deforming, reshaping, shrinking, irradiating or heating the or each tab, for example such that it pivots inwardly about its hinged edge. The irradiation or application of heat to one or more areas of the tamper evidence band may comprise irradiating or applying heat to the one or more tabs.

The one or more tamper evidence features may comprise one or more projections or cams, which may be on the tamper evidence band such as on an internal surface thereof. The projections or cams may clear the container neck when the closure is placed thereon. The method may comprise reshaping the part of the closure by shrinking the tamper evidence band, for example to cause the projections or cams to align and/or engage with the container neck.

The one or more tamper evidence features may comprise flaps. The or each flap may be configured to pivot or fold along a connecting line with the tamper evidence band, for example as the closure is screwed onto a container neck. The or each flap may be configured to deploy on rotation of the closure, for example in an opposite, e.g. unscrewing, direction. once deployed, the one or more flaps may be configured to engage a flange of the container neck, e.g. to retain the tamper evidence band thereon and/or to sever the or a frangible connection or bridges.

Another broad aspect relates to a closure, e.g. for sealingly closing a neck opening of a container, the closure being formed at least partially of polyethylene terephthalate and comprising a top wall, a cylindrical skirt depending from the top wall and an annular tamper evidence band frangibly connected to the cylindrical skirt, wherein the tamper evidence band comprises one or more flaps, wherein the or each flap is configured to pivot or fold along a connecting line with the tamper evidence band as the closure is screwed onto a container neck, and to deploy on rotation of the closure in an opposite, unscrewing direction thereby to engage a flange of the container neck to retain the tamper evidence band thereon and sever the frangible connection.

Another broad aspect relates to a combination of a container neck and a closure according to the immediately preceding aspect, the container neck comprising a ratchet or one or more engaging features for cooperating with the one or more flaps to inhibit rotation of the tamper evidence band on rotation of the closure in the unscrewing direction.

The ratchet or one or more engaging features may comprise one or more serrations. The one or more flaps may comprise a plurality of flaps and/or the ratchet or one or engaging features may comprise a plurality, e.g. a corresponding plurality, of engaging features.

The method may comprise mechanically deforming part of the closure or container neck to cause one or more tamper evidence features to engage with the container neck.

In some examples, the method may comprise deforming, such as mechanically deforming, part of the closure. The part of the closure may comprise one or more localized regions of the closure or tamper evidence band. The part of the closure to be reshaped may be mechanically deformed to engage the one or more tamper evidence features, e.g. the tamper evidence band, with the container neck. The method may comprise piercing or perforating one or more localized regions of the closure or tamper evidence band, e.g. thereby to deform part of the closure or tamper evidence band and/or to engage the tamper evidence band with the container neck.

Another broad aspect relates to a method of installing a closure on a container neck comprising placing the closure over the container neck such that the tamper evidence band does not engage the container neck, and reshaping at least part of the closure or container neck while the closure is installed on the container, thereby to engage the tamper evidence band with the container.

The container may comprise a neck finish, which may comprise a mating surface. The tamper evidence band may comprise a mating surface. The mating surface of the tamper evidence band may clear the mating surface of the neck finish when the closure is installed over the neck opening of the container. The method may comprise reshaping the tamper evidence band, for example to cause the mating surface thereof to engage with the mating surface of the container neck.

Another broad aspect relates to a method of installing a closure on a container neck comprising placing the closure over the container neck such that a mating surface of a tamper evidence band of the closure clears a mating surface of a neck finish of the container neck and reshaping the tamper evidence band to cause the mating surface thereof to engage with the mating surface of the container neck.

In some examples, the closure may be placed on the container neck such that securing features thereof do not engage the container neck. In such examples, part, or the entire, closure may be reshaped. For example, heat may be applied to the entire closure, e.g. such that the entire closure is reshaped, deformed or shrunk. The securing features of the closure may engage securing features of the container neck after or as the closure is reshaped.

The method may comprise reshaping a further part of the closure, e.g. to provide a securing feature on an inner surface of the closure for cooperating with a securing feature of the container neck.

At least one of the one or more tamper evidence features may be connected, e.g. permanently or non-frangibly connected, to the closure. The closure may comprise a non-frangible connection between the tamper evidence band and the cylindrical skirt. The tamper evidence band may comprise a frangible line, which may be across its width or height. The frangible line of the tamper evidence band may be next to the non-frangible connection, for example such that the tamper evidence band becomes a strip connected to the closure by the non-frangible connection on first removal, in use, of the closure from a container neck.

In some embodiments, the closure may comprise a plurality of non-frangible connections between the tamper evidence band and the cylindrical skirt. The tamper evidence band may comprise a frangible line between each pair of non-frangible connections. Each frangible line may be across the width or height of the tamper evidence band. The tamper evidence band may be configured to be divided into multiple strips each connected to the closure by a respective one of the non-frangible connections on first removal, in use, of the closure from a container neck.

At least part of the one or more tamper evidence features may be configured to remain on the closure upon removal of the closure from the container neck, e.g. by virtue of the non-frangible connection. At least part of the one or more tamper evidence features may remain on the closure upon removal of the closure from the container neck.

The tamper evidence feature may comprise part of the cylindrical skirt. The cylindrical skirt may comprise a rim, which may be substantially planar, describing an open end of the closure. The tamper evidence feature(s) may comprise the rim or part of the rim.

Another broad aspect relates to a method of installing a closure on a container neck comprising placing the closure over the container neck and irradiating, or applying heat to, at least part of a rim describing an open end of the closure to engage or weld the rim with the container neck, wherein at least part of the rim is configured to be severed, in use, from the closure on removal of the closure from the container neck, thereby causing the rim or rim portion to remain on the container neck.

The rim or rim portion may be engaged or welded with an engaging feature, such as a flange, of the container neck. The rim or rim portion may remain on the engaging feature of the container neck.

The method may comprise irradiating, or applying heat to, one or more areas of the tamper evidence feature(s), for example about its or their circumference, e.g. to engage it with the container neck.

The closure may comprise a tether, which may connect the tamper evidence feature(s) or band to the cylindrical skirt. Part of the tether may, but need not, also be frangibly connected to the tamper evidence feature(s) or band and/or to the cylindrical skirt, e.g. along at least part of its length.

Irradiating, or applying heat to, one or more areas of the tamper evidence feature(s), or band may engage it with the container neck without preventing articulation of the tether, for example on removal of the closure from the container neck.

Irradiating, or applying heat to, one or more areas of the tamper evidence feature(s), or band may cause the one or more areas or the entire tamper evidence band to deform or shrink inwardly. Irradiating, or applying heat to, one or more areas of the tamper evidence feature(s), or band may cause it to create a lip, e.g. for engaging an engaging feature or flange on the container neck. Irradiating, or applying heat to, one or more areas of the tamper evidence feature(s), or band may cause it to create a lip which enables the closure to rotate about the container neck. Irradiating, or applying heat to, one or more areas of the tamper evidence feature(s) or band may cause it to create a lip which inhibits axial movement of the tamper evidence feature(s), e.g. such that the tamper evidence feature remains on the container neck when the closure is removed therefrom. Irradiating, or applying heat to, one or more areas of the tamper evidence feature(s), or band may cause it to create a lip which enables the closure to rotate relative to the container neck whilst axially engaging the engaging feature or flange, e.g. thereby inhibiting its removal from the container neck.

The lip may be continuous or substantially continuous. For example, the lip may be provided by a deformed, reshaped or shrunk annulus of the tamper evidence band. Alternatively, the lip may be discontinuous and/or may be provided by two or more tamper evidence features that may be spaced about the circumference of the closure and/or tamper evidence band. The two or more tamper evidence features may comprise localized regions or tabs, e.g. the aforementioned localized regions or tabs.

In some examples, irradiating, or applying heat to, the tamper evidence feature(s), or band may comprise welding the tamper evidence feature(s) or band to the container neck.

The tamper evidence feature(s) may comprise a tamper evidence panel. The tamper evidence panel may be included, described or defined in the cylindrical skirt. The tamper evidence panel may, but need not, be frangibly connected to a surrounding portion of the cylindrical skirt, e.g. by a line of weakness. The method may comprise welding the tamper evidence panel to the container neck.

Another broad aspect relates to a method of installing a closure on a container neck comprising placing the closure over the container neck and irradiating, or applying heat to, at least part of a tamper evidence panel included, described or defined in the closure to weld the panel to the container neck, wherein at least part of the tamper evidence panel is frangibly connected to a surrounding portion of the closure by a line of weakness such that it remains on the container neck upon removal of the closure therefrom.

The tamper evidence band may comprise a film or foil, for example a tamper evidence film or foil. The tamper evidence film or foil may have a radial wall thickness that is similar or slightly more than the bridges or membrane joining it to the cylindrical skirt. In some examples, the tamper evidence band comprises a film or foil or membrane that may be secured directly to the cylindrical skirt.

The method, or reshaping part of the closure, may, but need not, comprise deforming or shrinking the tamper evidence film, foil or membrane, e.g. to engage the tamper evidence feature(s) with the container neck. The tamper evidence film, foil or membrane may be deformed or shrunk via any means described herein.

Another broad aspect relates to a closure for sealingly closing a neck opening of a container, the closure comprising a top wall and a cylindrical skirt depending from the top wall, wherein the cylindrical skirt comprises a tamper evidence panel included, described or defined therein which is frangibly connected to a surrounding portion of the cylindrical skirt by a line of weakness.

The tamper evidence panel may have a radial wall thickness that is less than that of the surrounding portion of the cylindrical skirt. The tamper evidence panel may have a bottom edge describing part of the rim of the cylindrical skirt.

Another broad aspect relates to provides a closure for sealingly closing a neck opening of a container, the closure comprising a top wall and a cylindrical skirt depending from the top wall and having a substantially planar rim describing an open end of the closure, wherein the cylindrical skirt comprises a tamper evidence panel included, described or defined therein which has a bottom edge describing part of the substantially planar rim and a radial wall thickness that is less than that of a surrounding portion of the cylindrical skirt.

At least part of the tamper evidence feature(s), e.g., at least part of the tamper evidence band, tab or panel, may have a radial wall thickness that is 0.6 mm or less, for example 0.5 mm or less, such as 0.4 mm or less or even 0.3 mm or less ("or less" being a minimum practical, non-zero, radial wall thickness e.g., 0.05 mm).

At least one of the tamper evidence feature(s), e.g. the tamper evidence band, may comprise one or more stiffened portions or regions. At least one of the tamper evidence feature(s), e.g. the tamper evidence band, may comprise one or more weakened portions or regions. The one or more stiffened portions or regions may comprise a radial wall thickness, which may be greater than a radial wall thickness of at least a portion, e.g. the rest of and/or the weakened portion(s) or region(s), of the tamper evidence feature(s) or band.

The stiffened portion(s) or region(s) and/or weakened portion(s) or region(s) may be configured to cause or encourage preferential deformation, e.g. when the at least part of the closure or container neck is reshaped. The stiffened portion(s) or region(s) and/or weakened portion(s) or region(s) may be configured to cause or encourage preferential deformation when the at least part of the closure or container neck is irradiated and/or when the laser is directed thereat.

The weakened portion(s) or region(s) may be configured to deform preferentially, e.g. relative to the stiffened portion(s) or region(s), when irradiated and/or when the laser is directed thereat.

At least one of the tamper evidence feature(s), e.g. the tamper evidence band, may comprise a first annular portion and/or a second annular portion. The first annular portion may be connected to the cylindrical skirt. The second annular portion may depend from the first annular portion. The second annular portion may have a radial wall thickness that is less than that of the first annular portion.

The second annular portion may be configured to deform preferentially, e.g. relative to the first annular portion, when it is irradiated and/or when the laser is directed thereat.

The stiffened portion(s) or region(s) may comprise or provide the first annular portion. The first annular portion may comprise or provide the stiffened portion(s). The weakened portion(s) or region(s) may comprise or provide the second annular portion. The second annular portion may comprise or provide the weakened portion(s) or region(s).

The stiffened portion(s) or region(s), or the first annular portion, may comprise one or more stiffening features, elements or formations. The or each stiffening feature, element or formation may comprise a rib, bulge or undulation. The weakened portion(s) or region(s) may comprise one or more weakening features, elements or formations. The or each weakening feature, element or formation may comprise a groove, recess or depression. In some examples, at least one of the tamper evidence feature(s), e.g. the tamper evidence band, comprises an axial or circumferential groove.

In some examples, at least one of the tamper evidence feature(s), e.g. the tamper evidence band, comprises a circumferential groove between the first and second annular portions.

The inner surface of the first annular portion may be substantially contiguous with and/or have substantially the same diameter or substantially continuous diameter as the second annular portion. A radial step may be formed between first and second annular portions, e.g. on an external surface thereof, which may be the result of or provide the difference in radial wall thicknesses.

Additionally, or alternatively, the outer surface of the first annular portion may be substantially contiguous with and/or have substantially the same diameter or substantially continuous diameter as the second annular portion. A radial step may be formed between first and second annular portions, e.g. on an internal surface thereof, which may be the result of or provide the difference in radial wall thicknesses.

The method may comprise irradiating, or directing the laser beam at or along, at least part of the circumference of the second annular portion, e.g. to engage the tamper evidence band with a flange of the container neck.

Without wishing to be bound by any particular theory, the inventors have found that the provision of a thinner, second annular portion tends to result in a more reliable curling of the tamper evidence band. The provision of a thinner second annular portion also enables the weight of the closure to be reduced.

The radial wall thickness of the second annular portion may be at least 10% less than that of the first annular portion, for example at least 20% less than that of the first annular portion. The radial wall thickness of the second annular portion may be between 40% and 90% of the radial wall thickness of the first annular portion, for example between 50% and 80% of the radial wall thickness of the first annular portion.

Additionally, or alternatively, the second annular portion may have an axial height that is at least 50% of an axial height of the first annular portion, for example at least 80% of an axial height of the first annular portion. The second annular portion may have an axial height that is at least equal to an axial height of the first annular portion. The axial height of the second annular portion may be less than 3 times that of the first annular portion, for example, around 2.5 or 2.2 times that of the first annular portion. The axial height of the second annular portion may be between 0.5 and 3 times that of the first annular portion, for example between 0.8 and 2.5 or between 1 and 2.5 times that of the first annular portion. In some cases, the axial height of the second annular portion is between 1 and 2.2 times that of the first annular portion.

The second annular portion may have an axial height that is at least 25% of a total axial height of the tamper evidence band, for example at least 40% of a total axial height of the tamper evidence band. The second annular portion may have an axial height that is at least 50% of a total axial height of the tamper evidence band. The axial height of the second annular portion may be less than 75% of a total axial height of the tamper evidence band, for example at most around 70% of a total axial height of the tamper evidence band. The axial height of the second annular portion may be between 25% and 75% of a total axial height of the tamper evidence band, for example between 40% and 70% or between 50% and 70% of a total axial height of the tamper evidence band.

At least part of the tether may be included, described or defined in or by the tamper evidence band, for example the first annular portion thereof. The tether may be described at least partially by the first annular portion. Additionally, or alternatively, at least part of the tether may be included described or defined in or by the cylindrical skirt.

At least part of the first annular portion of the tamper evidence band may have a radial wall thickness that is 0.6 mm or less, for example 0.5 mm or less. At least part of the first annular portion of the tamper evidence band may have a radial wall thickness that is 0.4 mm or less, for example 0.3 mm or less.

Irradiating, or applying heat to, part of the closure or the tamper evidence feature(s) or rim may comprise irradiating part of the closure and/or the tamper evidence feature(s) or rim with electromagnetic energy. Alternatively, irradiating, or applying heat to, part of the closure or the tamper evidence feature(s) or rim may comprise positioning the part of the closure to be reshaped or the tamper evidence feature(s) or rim on, against or adjacent a heating element.

The method may comprise positioning the part of the closure or container neck to be reshaped or the one or more tamper evidence features against or adjacent a heating element, e.g. to apply heat thereto and to cause the one or more tamper evidence features to engage with the container neck.

The method may comprise rotating a tamper evidence band of the closure as heat is applied thereto by the heating element. The method may comprise rolling the tamper evidence band along the heating element.

The method may comprise irradiating, or applying heat about, at least part of a circumference of the closure, e.g. to engage the tamper evidence feature(s) with the container neck about at least part of its circumference.

In some examples, the method may comprise rotating the closure and/or the container, for example as the tamper evidence feature(s) are irradiated or heated. Rotation of the closure and/or container may result in irradiating, or applying heat about, at least part of the circumference of the closure, e.g. to engage the tamper evidence feature(s) with the container neck about at least part of its circumference. Rotation of the closure and/or container may comprise causing a conveying means, such as a conveyor, to engage one side of the container or container neck. The conveying means may engage the container neck adjacent and/or immediately below a support ring or ledge. Alternatively, the conveying means may engage a side wall of a body of the container. The conveying means may comprise a first conveying means. A further or second conveying means, e.g. a further or second conveyor, may engage an opposite side of the container or container neck. The further or second conveying means may be stationary or may move in an opposite direction to the first conveying means, e.g. so as to cause the closure and/or the container to rotate.

The method may comprise conveying the container or container neck, for example with the closure installed thereon. The method may comprise conveying the container or container neck along a conveying direction. The conveying means or conveyor, e.g. the first and/or second conveying means or conveyors, or yet a further conveying means or conveyor may convey the container or container neck, e.g. along the conveying direction. The method may comprise conveying, e.g. along a conveying direction, a plurality of closures each on a respective container neck. The method may comprise irradiating part of each closure simultaneously. The substantially planar laser beam may be directed along part of the circumference of a tamper evidence band of the closure, e.g. to engage the tamper evidence band with a flange of the container neck.

The method may comprise directing a substantially planar laser beam along part of the circumference of a tamper evidence band of the closure, for example to cause part of the tamper evidence band, e.g. a free edge or free edge portion thereof, to curl inwardly for engaging with the flange of the container neck.

Where the tamper evidence band comprises first and second annular portions, the substantially planar laser beam may be directed along part of the circumference of the second annular portion. This may cause part of the tamper evidence band or the second annular portion thereof to engage the tamper evidence band with a flange of the container neck. This may cause part of the tamper evidence band or the second annular portion thereof, e.g. a free edge or free edge portion thereof, to curl inwardly for engaging with the flange of the container neck.

The method may comprise supporting a radial support flange of the container neck. The method may comprise engaging opposite sides of a container body depending from the container neck, e.g. whilst the radial support flange is supported. The method may comprise engaging opposite sides of a container body to convey the container along the conveying direction and/or to rotate the container and closure as it is conveyed along the conveying direction.

The method may comprise engaging opposite sides of a container body using a pair of conveyors. Each conveyor may engage the container body at a different axial location.

The method may comprise detecting the presence of one or more containers, for example being conveyed along the conveying means or conveyor. The method may comprise detecting the presence of one or more containers upstream and/or downstream of the reshaping means.

The method may comprise irradiating the tamper evidence feature(s) using more than one, e.g. a plurality of sources of electromagnetic energy. The sources may be distributed about the closure, for example distributed evenly about the closure. The method may comprise irradiating or applying heat to two or more, e.g. a plurality of, sides of the closure, e.g. to engage the tamper evidence feature(s) with two or more sides of the container neck.

Irradiating or applying heat to the tamper evidence feature(s) may comprise directing electromagnetic energy toward a contact interface between the closure, e.g. the tamper evidence feature(s), and the container neck. In such cases, the closure is preferably formed of a different material or different type of material to the container neck. For example, the closure may be formed of high density polyethylene (HDPE) and the container neck may be formed of polyethylene terephthalate (PET).

The closure may comprise a different material to the container neck. The closure may comprise polyethylene, for example high density polyethylene.

Irradiating the tamper evidence feature(s) with electromagnetic energy may comprise directing the electromagnetic energy at or through the tamper evidence feature(s).

Irradiating the tamper evidence feature(s) with electromagnetic energy may comprise directing a laser or laser beam thereat. The laser or laser beam may comprise a power of between 10 W and 400 W, preferably between 20 W and 350 W. The power of the laser or laser beam may decrease during the irradiation, for example within the aforementioned ranges. For example, the power of the laser could be 400 W or 350 W initially, and gradually reduce to 150 W or 100 W as the closure or container neck is irradiated. Other arrangements are also envisaged. The method may comprise irradiating the part of the closure or container neck to be reshaped or the tamper evidence feature(s) for less than 2 seconds, for example 1 second or less. In some examples, the method may comprise irradiating the part of the closure or container to be reshaped or the tamper evidence feature(s) for between 0.2 seconds and 0.8 seconds, for example between 0.3 seconds and 0.7 seconds or between 0.4 seconds and 0.6 seconds. In examples where the closure and/or container neck is or are irradiated by a single laser and/or rotated, the irradiation time may be greater than examples where it or they are irradiated by multiple lasers.

The method may comprise using one or more optical devices, for example to modify one or more characteristics of the electromagnetic energy or laser.

Another broad aspect relates to a method of engaging a molded article with another article, the method comprising irradiating a part of the molded article with electromagnetic energy after modifying one or more characteristics of the electromagnetic energy using one or more optical devices.

Another broad aspect relates to a method of engaging a molded article with another article, the method comprising irradiating a part of the molded article with a laser after modifying one or more characteristics of the laser using one or more optical devices.

The one or more optical devices may comprise one or more lenses, prisms or mirrors.

The method may comprise using one or more lenses, for example to narrow or broaden the electromagnetic energy or laser. The method may comprise using one or more lenses to narrow or broaden the electromagnetic energy or laser along at least one axis or plane. At least one of the lenses may comprise a telescope. The method may comprise using one or more telescopes, for example to narrow or broaden the electromagnetic energy or laser. The method may comprise using one or more telescopes to narrow or broaden the electromagnetic energy or laser along at least one axis or plane. The method may comprise using a convex or focusing lens, for example to narrow or focus the electromagnetic energy or laser, e.g. toward the tamper evidence feature(s). The method may comprise using a concave or diverging lens, for example to broaden or spread the electromagnetic energy or laser. The method may comprise using a convex lens or focusing lens and a concave lens or diverging lens, for example to provide one or more desired characteristics of the electromagnetic energy or laser.

The method may comprise using one or more prisms, for example to redirect and/or refract the electromagnetic energy or laser. The or each prism may comprise a polygonal prism, for example with three or more sides or faces. The or each prism may comprise a polygonal prism with at least ten sides or faces. In some examples, the polygonal prism includes 18 or more sides. The or at least one prism may comprise a non-polygonal shape or any shape configured to provide the required optical effect. The method may comprise using the one or more prisms with one or more lenses, for example to provide one or more desired characteristics of the electromagnetic energy or laser before the electromagnetic energy is directed at or through the tamper evidence feature(s).

The method may comprise using one or more reflectors or mirrors, hereinafter mirror(s), to reflect the electromagnetic energy or laser to irradiate one or more, e.g. a plurality of, closures or container necks or tamper evidence feature(s). The method may comprise using the one or more mirrors with one or more lenses and/or one or more prisms, for example to provide one or more desired characteristics of the electromagnetic energy or laser before the electromagnetic energy is directed at or through the tamper evidence feature(s).

The or at least one mirror may be polygonal. The or at least one mirror may comprise a non-polygonal shape or any shape configured to provide the required optical effect. The method may comprise splitting with the or at least one mirror the electromagnetic energy or laser into two or more beams each for irradiating a respective molded article, closure or tamper evidence feature. The method may comprise rotating the mirror, e.g. relative to the source. The speed of rotation of the mirror may cause the two or more beams to follow a movement of the molded article, closure or tamper evidence feature. The method may comprise providing with the mirror a substantially linear or planar beam of electromagnetic energy, e.g. a planar laser beam. The method may comprise rotating the mirror at a speed that generates a substantially continuous or substantially contiguous linear or planar beam of electromagnetic energy, e.g. a planar laser beam. The method may comprise rotating the mirror at a speed that provides a substantially linear or planar beam of electromagnetic energy, e.g. a planar laser beam.

The method may comprise irradiating part of each of a plurality of closures each on a respective container neck simultaneously, e.g. as they are conveyed along a conveying direction, with a substantially planar or linear laser beam. The substantially planar laser beam may be directed along part of the circumference of a tamper evidence band of the closure, e.g. to engage the tamper evidence band with a flange of the container neck.

The or at least one lens may comprise a scanning lens. The scanning lens may comprise a flat-field scanning lens or an f-Theta scanning lens. The method may comprise altering, e.g. with the or at least one lens such as the scanning lens, one or more characteristics of the beam. The characteristic(s) of the beam may be altered to provide a substantially planar focal point. The scanning lens may be for providing the substantially planar laser beam with a substantially planar focal point along the conveying direction. The method may comprise using the or at least one lens, e.g. the scanning lens, to provide a more continuous resolution and/or intensity, e.g. across a plane along which irradiated closures lie.

The method may comprise directing the beam of electromagnetic energy or laser through the lens or scanning lens prior to irradiating the closure. The method may comprise directing the substantially linear or planar beam of electromagnetic energy or planar laser beam through the lens or scanning lens prior to irradiating the closure.

The method may comprise directing the laser at a closure passing between the laser and the or at least one mirror.

The or at least one mirror may be concave. The concave mirror may be mounted adjacent to the molded article or closure or tamper evidence feature. The concave mirror may be mounted on an opposite side of the molded article or closure or tamper evidence feature to the source. The method may comprise reflecting with the concave mirror electromagnetic energy, e.g. a laser beam or portion thereof, back toward the molded article or closure or tamper evidence feature. The method may comprise moving the concave mirror with the molded article or closure or tamper evidence feature.

The or at least one mirror may be configured to move, in use, with a closure on the conveyor thereby to reflect a portion of a laser beam emitted from the laser toward the closure. The or at least one mirror may be stationary or configured to remain stationary, in use, as a closure on the conveyor moves therepast.

The or at least one mirror may comprise one or more peaks and/or troughs, for example a series of alternating peaks and troughs. At least one or each peak may comprise a pair of opposed flanks. The or at least one or each flank may be substantially flat or planar. Alternatively, the or at least one or each flank may be curved, concave, convex, sinusoidal or have any other suitable shape. The peaks and troughs, or at least some of the peaks and troughs of the series, may be substantially identical. Additionally, or alternatively, the peaks and troughs, or at least some of the peaks and troughs of the series, may vary, for example they may vary in amplitude or any other characteristic.

At least one of the one or more optical devices may comprise a freeform reflective or refractive surface. At least one of the lens, prism or mirror may comprise a freeform lens, prism or mirror. At least one of the freeform surface, lens or prism may be adjustable, e.g. dynamically, to change its optical characteristics. The freeform surface, lens or prism may be for spreading the laser emitted by the source.

In some examples, the optical device is configured to shape or alter or modify the intensity distribution of the laser beam. The optical device may be configured to shape or alter or modify the horizontal or vertical intensity distribution of the laser beam. The horizontal intensity distribution may be along the or at least one of the conveying means or conveyor. The horizontal intensity distribution may be along the conveying direction or a direction of movement of one or more containers or container necks, which may comprise the closure installed thereon. The vertical intensity distribution may comprise an intensity distribution along an axial direction of the closure and/or container. The vertical intensity distribution may comprise an intensity distribution along a direction corresponding or substantially parallel to the or an axis of the closure and/or container. The horizontal direction may be substantially orthogonal to the vertical direction.

The optical device may be configured to shape or alter or modify the intensity distribution of the laser beam along the conveying direction or a direction of movement of one or more containers or container necks, which may comprise the closure installed thereon. The optical device may be configured to shape or alter or modify the intensity distribution of the laser beam along an axial direction of the closure and/or container. The optical device may be configured to shape or alter or modify the intensity distribution of the laser beam along a lateral direction and/or a direction substantially perpendicular to an axial direction of the closure and/or container. The optical device may be configured to shape or alter or modify the intensity distribution of the laser beam along a direction corresponding or substantially parallel to the or an axis of the closure and/or container. The optical device may be configured to shape or alter or modify the intensity distribution of the laser beam along a direction substantially perpendicular to the or an axis of the closure and/or container.

The optical device may be configured to shape or alter or modify the intensity distribution of the laser beam to focus it on a predetermined region of the closure or tamper evidence band, for example a lower or free end or end portion thereof. In examples where the laser beam is used to create a securing feature, the optical device may be configured to shape or alter or modify the intensity distribution of the laser beam to focus it on a predetermined region of the cylindrical skirt of the closure.

The method may comprise molding the closure, e.g. before it is placed on the container. The method may comprise creating, during the molding process, internal stresses within the part of the closure or tamper evidence feature that is reshaped.

Another broad aspect relates to a method of molding a closure configured to be reshaped at least in part to engage a container neck, the method comprising creating, during the molding process, internal stresses within the part of the closure to be reshaped.

The method may comprise stretching or expanding the part of the closure to be reshaped during or after the molding process. The method may comprise subjecting an internal surface of the part of the closure to be reshaped to a cooling temperature that is substantially different from a cooling temperature that an outer surface thereof is subjected to. The part of the closure to be reshaped may comprise one or more tamper evidence features, for example a tamper evidence band.

Another broad aspect relates to a mold stack. The mold stack may comprise a molding configuration, e.g. in which it describes a cavity for molding a thermoplastic closure for sealingly closing a neck opening of a container. The mold stack may include one or more molding surfaces that describe features of a closure resulting from the molding process, referred to hereinafter as the resulting closure.

The closure may comprise a top wall. The closure may comprise a cylindrical skirt, which may depend from the top wall. The closure may comprise an annular tamper evidence band, which may be connected to the cylindrical skirt.

The mold stack may be configured to stretch or expand, in use, radially the tamper evidence band.

Another broad aspect relates to a mold stack comprising a molding configuration in which it describes a cavity for molding a thermoplastic closure for sealingly closing a neck opening of a container, the closure comprising a top wall, a cylindrical skirt depending from the top wall and an annular tamper evidence band connected to the cylindrical skirt, wherein the mold stack is configured to stretch or expand, in use, radially the tamper evidence band.

Another broad aspect relates to a thermoplastic closure for sealingly closing a neck opening of a container, the closure comprising a top wall, a cylindrical skirt depending from the top wall and an annular tamper evidence band connected to the cylindrical skirt, wherein the tamper evidence band comprises a substantially cylindrical inner surface having one or more recesses therein which are formed by one or more corresponding projections of a mold core such that the tamper evidence band stretches or expands, in use, radially as it is urged off the mold core after molding.

The tamper evidence band may comprise a substantially cylindrical inner surface, which may have one or more recesses therein. The one or more recesses may be formed by one or more corresponding projections of a mold core, e.g. such that the tamper evidence band stretches or expands, in use, radially as it is urged off the mold core after molding.

The tamper evidence band of the closure may comprise internal stress therewithin as a result of a stretching or expanding thereof after molding.

Another broad aspect relates to a thermoplastic closure for sealingly closing a neck opening of a container, the closure comprising a top wall, a cylindrical skirt depending from the top wall and an annular tamper evidence band connected to the cylindrical skirt, wherein the tamper evidence band comprises internal stress therewithin as a result of a stretching or expanding thereof after molding.

Another broad aspect relates to a package comprising the closure installed on a neck of a container, wherein a free end of the tamper evidence band is deformed inwardly to create a lip for engaging a flange on the container neck.

The part of the closure or container neck to be reshaped or the one or more tamper evidence features that is or are reshaped may comprise one or more ribs. The one or more ribs may be on an inner or outer surface of the part of the closure or container neck to be reshaped or the one or more tamper evidence features that is or are reshaped. The one or more ribs may comprise one or more axial ribs and/or may extend axially or along an axis, e.g. a primary axis, of the closure. The part of the closure or container neck to be reshaped or the one or more tamper evidence features that is or are reshaped may comprise a reheat agent, e.g. for increasing its heat absorption. The part of the closure or container neck to be reshaped or the one or more tamper evidence features that is or are reshaped may comprise a surface finish, which may be configured to increase its heat absorption.

The method may comprise perforating, slitting or cutting the closure, cylindrical skirt, tamper evidence feature or a membrane joining the tamper evidence feature to the closure or cylindrical skirt. The perforating, slitting or cutting may be for providing or to provide the or a frangible connection or line of weakness between the tamper evidence feature and the closure or cylindrical skirt.

The method may comprise perforating, slitting or cutting the cylindrical skirt, tamper evidence feature or membrane before, whilst or after irradiating or applying heat to the tamper evidence feature(s). The method may comprise perforating, slitting or cutting the membrane whilst the closure is installed on the container neck.

Another broad aspect relates to a method of creating a frangible connection between a closure, which may comprise or be formed of polyethylene terephthalate, and a tamper evidence feature thereof, the method comprising perforating, slitting or cutting a membrane joining the tamper evidence feature to the closure, thereby to provide a frangible connection or line of weakness therebetween.

The method may comprise perforating, slitting or cutting the cylindrical skirt, tamper evidence feature or membrane. The method is not particularly limited, and may include, for example, using one or more spikes or a serrated blade or surface. Alternatively, in a further example the method may comprise perforating, slitting or cutting the cylindrical skirt, tamper evidence feature or membrane using a laser or laser cutter.

The perforating, slitting or cutting of the membrane may be performed or carried out before, or after deforming by mechanical deformation one or more localized regions of the part of the closure or container neck or tamper evidence feature(s) to be reshaped, or simultaneously therewith. The perforating, slitting or cutting of the membrane may be performed or carried out before, or after, heating of the part of the closure or container neck or tamper evidence feature(s) to be reshaped, or simultaneously therewith.

Another broad aspect relates to a system, e.g. a system for installing, engaging one or more tamper evidence features of a closure with a container neck. The system may, but need not, comprise a reshaping element. The system may, but need not, be operable to cause the reshaping element to reshape part of the closure or container neck or the tamper evidence feature(s), e.g. to engage the tamper evidence feature(s) with the container neck.

Another broad aspect relates to a system for engaging one or more tamper evidence features of a closure, e.g. a molded or thermoplastic closure, with a container neck, the system comprising one or more reshaping elements, wherein the system is operable to cause the reshaping element(s) to reshape part of the closure or container neck to engage, e.g. to movably engage, the tamper evidence feature(s) with the container neck about at least part of its circumference.

The system may, but need not, comprise a conveying means or assembly, such as one or more conveyors, e.g. for conveying the container through the system.

The reshaping element may, but need not, be one of two or more, e.g. a plurality of, reshaping elements. The reshaping elements may be distributed about at least part of the closure. The reshaping elements may be operable to reshape part of the closure or container neck about at least part of the circumference thereof, e.g. to engage the tamper evidence feature(s) with the container neck about at least part of its circumference.

The reshaping element may, but need not, be or comprise a source of electromagnetic radiation. The system may be operable to cause the source of electromagnetic radiation to irradiate part of the closure or container neck to engage, e.g. movably engage, the tamper evidence feature(s) with the container neck. The source may, but need not, be one of two or more, e.g. a plurality, of sources of electromagnetic radiation. The source(s) of electromagnetic radiation may be operable to cause the source to irradiate part of the closure or container neck about at least part of the circumference thereof, e.g. to engage the tamper evidence feature(s) with the container neck about at least part of its circumference.

In some examples, the reshaping elements comprise a cooling element. The cooling element may comprise a source of cooling fluid, for example a gas such as air. The cooling element may be operable or configured to cooperate with one or more other reshaping elements to provide a differential temperature to the closure or closure part or tamper evidence feature or band. The system may be operable to cause the cooling element to cool one side, e.g. an internal or external side, of the closure or container neck.

Another broad aspect relates to a system for engaging one or more tamper evidence features of a closure with a container neck, the system comprising one or more sources of electromagnetic radiation, wherein the system is operable to cause the source(s) to irradiate part of the closure or container neck to engage, e.g. to movably engage, the tamper evidence feature(s) with the container neck about at least part of its circumference.

The system may comprise a conveying means or assembly, e.g. for conveying the container through the system. The conveying means or assembly may be operable to rotate the closure and/or the container, for example as the part of the closure or container neck is reshaped or irradiated with electromagnetic energy. The conveying means or assembly may comprise two or more conveyors. The conveying means or assembly or at least one of the conveyors may be configured or operable to rotate the closure and/or the container, e.g. as the part of the closure or container neck is reshaped or irradiated with electromagnetic energy. The conveying means or assembly or at least one of the conveyors may be configured or operable to translate the closure and/or the container, e.g. as the part of the closure or container neck is reshaped or irradiated with electromagnetic energy.

A first of the conveyors may be configured to engage one side of the closure, container or container neck. The first conveyor may be configured to engage the container neck adjacent and/or immediately below a support ring or ledge. Alternatively, the first conveyor may be configured to engage a side wall of a body of the container or the cylindrical skirt of the closure. A further or second conveyor may engage an opposite side of the closure, container or container neck. The further or second conveyor may be stationary or may move in an opposite direction to the first conveyor, e.g. so as to cause the closure and/or the container to rotate.

The system or conveying means may comprise a detection means or detector, for example a photoelectric detector or barrier. The detection means may be upstream and/or downstream of the reshaping means, e.g. for detect the presence of containers being conveyed along the conveyor.

The source(s) of electromagnetic radiation may comprise a plurality of sources of electromagnetic energy, which may, but need not, be distributed about the closure or container neck. The sources, which are operable to irradiate the part of the closure or container neck to be reshaped or the tamper evidence feature(s) about at least part of the circumference of the closure or container neck.

The or each or at least one source of electromagnetic energy may comprise a laser or a laser source or emitter. The system or source may be operable to provide a laser having a power of between 10 W and 400 W, preferably between 20 W and 350 W. The system or source may be operable to decrease the power of the laser during the irradiation, for example within the aforementioned ranges.

The system may comprise one or more optical elements, features or devices, such as one or more lenses, prisms or mirrors.

Another broad aspect relates to a system for engaging a molded article with another article, the system comprising one or more sources of electromagnetic radiation and one or more optical devices, wherein the system is operable to cause the source(s) to irradiate part of the molded article after modifying one or more characteristics of the electromagnetic energy using one or more optical elements, features or devices, thereby to engage, e.g. to movably engage, the molded article with the other article.

Another broad aspect relates to a system for engaging a molded article with another article, the system comprising one or more lasers and one or more optical devices, wherein the system is operable to cause the laser(s) to irradiate part of the molded article after modifying one or more characteristics of a laser beam using one or more optical elements, features or devices, thereby to engage, e.g. to movably engage, the molded article with the other article.

The one or more optical elements, features or devices may be operable or configured to focus and/or spread and/or reflect and/or refract the electromagnetic energy or laser to irradiate one or more, e.g. a plurality of, closures or container necks or tamper evidence feature(s).

The system may comprise using one or more lenses, which may be configured to narrow or broaden the electromagnetic energy or laser. The one or more lenses may comprise a convex or focusing lens, which may be configured to narrow or focus the electromagnetic energy or laser, e.g. toward the tamper evidence feature(s). The one or more lenses may comprise a concave or diverging lens, which may be configured to broaden or spread the electromagnetic energy or laser. The one or more lenses may comprise a convex lens or focusing lens and a concave lens or diverging lens, which may together be configured to provide one or more desired characteristics of the electromagnetic energy or laser.

The system may comprise using one or more prisms, which may be configured to redirect and/or refract the electromagnetic energy or laser. The or each prism may comprise a polygonal prism, for example with three or more sides or faces. The or each prism may comprise a polygonal prism with at least ten sides or faces. In some examples, the polygonal prism includes 18 or more sides. The or at least one prism may comprise a non-polygonal shape or any shape configured to provide the required optical effect. The system may comprise one or more prisms and one or more lenses, which may together be configured to provide one or more desired characteristics of the electromagnetic energy or laser before the electromagnetic energy is directed at or through the tamper evidence feature(s).

The system may comprise one or more reflectors or mirrors, hereinafter mirror(s), which may be configured to reflect the electromagnetic energy or laser to irradiate one or more, e.g. a plurality of, closures or container necks or tamper evidence feature(s). The system may comprise one or more mirrors and one or more lenses and/or one or more prisms, for example to provide one or more desired characteristics of the electromagnetic energy or laser before the electromagnetic energy is directed at or through the tamper evidence feature(s).

The system may comprise a laser or a laser assembly, which may be operable to irradiate part of the or each of a plurality of closures with a substantially planar laser beam. The laser or laser assembly may be operable to irradiate part of the or each of a plurality of closures with a substantially planar laser beam as it is conveyed, e.g. along the conveying direction and/or by the or a conveying means, to cause engagement of the closure with the container neck. The conveying means may be operable to rotate the or each closure and container neck whilst the closure part is irradiated by the substantially planar laser beam.

The substantially planar laser beam may be oriented along the conveying direction.

The conveying means may comprise a rail, e.g. one or more rails, for supporting a radial support flange of the container neck. The or each rail may comprise or provide a support surface, which may be elongate and/or may extend along the conveying direction. The support surface may be horizontal. The one or more rails may comprise a pair of rails, which may be spaced apart, e.g. such that the container necks and closures may be conveyed therebetween and/or therealong. The or each rail may comprise a plate, which may provide the support surface.

The conveying means may comprise a pair of conveyors, which may face one another. The pair of conveyors may comprise a pair of opposed conveyors. The pair of conveyors may be for engaging opposite sides of a container body depending from the container neck. The pair of conveyors may be for conveying the container along the conveying direction and/or for rotating the container and closure, e.g. as it is conveyed along the conveying direction. A first of the conveyors may be spaced further from the rail(s) than a second of the conveyors, e.g. for engaging opposite sides of the container body at a different axial location.

The or at least one mirror may be polygonal. The or at least one mirror may comprise a non-polygonal shape or any shape configured to provide the required optical effect. The mirror may be configured to split the electromagnetic energy or laser into two or more beams each for irradiating a respective molded article, closure or tamper evidence feature. The mirror may be rotatable, e.g. relative to the source. The speed of rotation of the mirror may be configured so as to cause the two or more beams to follow a movement of the molded article, closure or tamper evidence feature. The mirror may be configured to provide a substantially linear or planar beam of electromagnetic energy, e.g. a planar laser beam. The mirror may be rotatable at a speed that generates a substantially continuous or substantially contiguous linear or planar beam of electromagnetic energy, e.g. a planar laser beam. The mirror may be rotatable at a speed that provides a substantially linear or planar beam of electromagnetic energy, e.g. a planar laser beam.

The or at least one lens may comprise a scanning lens. The scanning lens may comprise a flat-field scanning lens or an f-Theta scanning lens. The or at least one lens, e.g. the scanning lens, may be configured to alter one or more characteristics of the beam, e.g. to provide a substantially planar focal point. The scanning lens may be for providing the substantially planar laser beam with a substantially planar focal point along the conveying direction. The or at least one lens, e.g. the scanning lens, may be configured to provide a more continuous resolution and/or intensity across a plane along which irradiated closures lie.

The system may be configured to direct, in use, the beam of electromagnetic energy or laser through the lens or scanning lens prior to irradiating the closure. The system may be configured to direct, in use, the substantially linear or planar beam of electromagnetic energy or planar laser beam through the lens or scanning lens prior to irradiating the closure.

The system may be configured to direct, in use, the laser at a closure passing between the laser and the or at least one mirror.

The or at least one mirror may be concave. The concave mirror may be mounted adjacent to the molded article or closure or tamper evidence feature. The concave mirror may be mounted on an opposite side of the molded article or closure or tamper evidence feature to the source. The concave mirror may be configured to reflect electromagnetic energy, e.g. a laser beam or portion thereof, back toward the molded article or closure or tamper evidence feature. The concave mirror may be configured to move with the molded article or closure or tamper evidence feature, e.g. through the system. The concave mirror may be mounted to the conveying means or conveyor.

The or at least one mirror may be configured to move, in use, with a closure on the conveyor thereby to reflect a portion of a laser beam emitted from the laser toward the closure. The or at least one mirror may be stationary or configured to remain stationary, in use, as a closure on the conveyor moves therepast.

The or at least one mirror may comprise one or more peaks and/or troughs, for example a series of alternating peaks and troughs. At least one or each peak may comprise a pair of opposed flanks. The or at least one or each flank may be substantially flat or planar. Alternatively, the or at least one or each flank may be curved, concave, convex, sinusoidal or have any other suitable shape. The peaks and troughs, or at least some of the peaks and troughs of the series, may be substantially identical. Additionally, or alternatively, the peaks and troughs, or at least some of the peaks and troughs of the series, may vary, for example they may vary in amplitude or any other characteristic.

At least one of the one or more optical devices may comprise a freeform reflective or refractive surface. At least one of the lens, prism or mirror may comprise a freeform lens, prism or mirror. At least one of the freeform surface, lens or prism may be adjustable, e.g. dynamically, to change its optical characteristics. The freeform surface, lens or prism may be for spreading the laser emitted by the source.

In some examples, the optical device is configured to shape or alter or modify the intensity distribution of the electromagnetic energy or laser beam.

Another broad aspect relates to a system, for example a conditioning system such as an article, closure or container or preform conditioning system. The system may comprise a source of electromagnetic radiation, such as a laser. The system may comprise an optical device. The optical device may be configured to shape or alter or modify an intensity distribution of the electromagnetic energy or laser.

Another broad aspect relates to a system, for example a conditioning system, which comprises a source of electromagnetic radiation and an optical device configured to shape or alter or modify an intensity distribution of electromagnetic energy emitted, in use, by the source.

The system may comprise conveying means or a conveyor, and optionally any one or more other features described above in relation to the system.

The optical device may be configured to shape or alter or modify the intensity distribution of the electromagnetic energy along a conveying direction of the conveying means.

The optical device may comprise a freeform mirror or lens. The freeform surface, lens or prism may be for spreading the laser emitted by the source.

The source of electromagnetic energy may comprise a laser.

Another broad aspect relates to a method, for example a method of conditioning an article, such as a closure or container or preform. The method may comprise emitting electromagnetic radiation, such as a laser beam. The method may comprise shaping or altering or modifying an intensity distribution of the emitted electromagnetic energy or laser beam. The method may comprise irradiating the article with the electromagnetic energy or laser beam having a shaped or altered or modified intensity distribution.

Another broad aspect relates to a method, for example a method of conditioning an article, which comprises shaping or altering or modifying an intensity distribution of electromagnetic energy emitted by a source and irradiating the article with the electromagnetic energy having a shaped or altered or modified intensity distribution.

The method may comprise shaping or altering or modifying the intensity distribution of the electromagnetic energy along a conveying direction along which the article is conveyed.

The method may comprise shaping or altering or modifying the intensity distribution of the electromagnetic energy using a freeform mirror or lens.

The source of electromagnetic energy may comprise a laser.

The optical device may be configured to shape or alter or modify the horizontal or vertical intensity distribution of the electromagnetic energy or laser beam. The horizontal intensity distribution may be along the or at least one of the conveying means or conveyor. The horizontal intensity distribution may be along the or a conveying direction or a direction of movement of one or more containers or container necks, which may comprise the closure installed thereon. The optical device may be configured to shape or alter or modify the intensity distribution of the electromagnetic energy or laser beam along the or a conveying direction or a direction of movement of one or more containers or container necks.

The optical device may be configured to shape or alter or modify the intensity distribution of the laser beam to focus it on a predetermined region of the closure or tamper evidence band, for example a lower or free end or end portion thereof. In examples where the laser beam is used to create a securing feature, the optical device may be configured to shape or alter or modify the intensity distribution of the laser beam to focus it on a predetermined region of the cylindrical skirt of the closure.

Alternatively, the or each or at least one source of electromagnetic energy may comprise a microwave emitter. Alternatively, the or each or at least one source of electromagnetic energy may comprise an infrared emitter. The method may comprise directing an infrared or microwave emitter at the part of the closure or container neck to be reshaped or the one or more tamper evidence features. Irradiating the part of the closure or container neck to be reshaped or the one or more tamper evidence features with electromagnetic energy may comprise directing an infrared or microwave emitter thereat.

The method may comprise removing liquid, such as water, or beverage media from a surface to be heated or irradiated. The method may comprise removing liquid, such as water, or beverage media using an air source, such as a fluid flow or airflow inducing means. The fluid flow or airflow inducing means may comprise a fluid or air jetting means or device. The fluid flow or airflow inducing means may comprise an air knife.

The system may comprise means or device for removing liquid, such as water, or beverage media from a surface to be heated or irradiated. The means or device for removing liquid, such as water, or beverage media may comprise a fluid source or air source, such as a fluid flow or airflow inducing means. The means or device for removing liquid, such as water, or beverage media may comprise a fluid or air jetting means or device. The means or device for removing liquid, such as water, or beverage media may comprise an air knife.

Alternatively, the or each or at least one reshaping element may comprise a mechanical deformation means or element or member or mechanism. The or each or at least one reshaping element may be configured to deform, e.g. mechanically, one or more localized regions of the closure or container neck or tamper evidence band, for example to engage the tamper evidence band with the container neck.

The or each or at least one reshaping element may comprise a piercing or perforating means or element or member or mechanism. The or each or at least one reshaping element may be configured to pierce or perforate one or more localized regions of the closure or container neck or tamper evidence band, e.g. thereby to deform part of the closure or container neck or tamper evidence band and/or to engage the tamper evidence band with the container neck.

In other examples, the or each or at least one reshaping element may comprise a source of ultrasound energy or ultrasonic energy. The method may comprise directing ultrasound energy at the part of the closure or container neck to reshape it to cause the one or more tamper evidence features to engage with the container neck.

Additionally, or alternatively, the or each or at least one reshaping element or heating element may comprise a roller, band or wire, which may but need not be heated. The system may be configured to heat the roller, band or wire. The roller, band or wire may be configured to apply heat to the part of the closure or container neck to be reshaped or to the tamper evidence feature(s). In some examples, the roller, band or wire may be heated and positionable adjacent to the part of the closure or container neck to be reshaped or tamper evidence feature(s). In other examples, the roller, band or wire may either be heated or unheated and urged against the part of the closure or container neck to be reshaped or tamper evidence feature(s), e.g. thereby to engage the tamper evidence feature(s) with the container neck.

Additionally, or alternatively, the or each or at least one reshaping element may comprise a source of fluid such as air or water, e.g. an air knife, which may but need not be heated. The method may comprise directing a source of fluid at the part of the closure or container neck, e.g. to reshape it to cause the one or more tamper evidence features to engage with the container neck. The source of fluid may be included in or as part of a conveying means, conveyor or conveying system. Additionally, or alternatively, the source of fluid may be included as a separate or independent station.

The system may be configured to heat air flowing, in use, through the air knife. The source of fluid may be configured to apply heat to the part of the closure or container neck to be reshaped or to the tamper evidence feature(s). In some examples, the source of fluid may be heated and positionable adjacent to the part of the closure or container neck to be reshaped or tamper evidence feature(s). In other examples, the source of fluid may either be heated or unheated and configured to direct fluid at toward the part of the closure or container neck to be reshaped or tamper evidence feature(s), e.g. at a velocity configured to reshape the part of the closure or container neck to be reshaped or tamper evidence feature(s) thereby engage the tamper evidence feature(s) with the container neck.

The method may comprise directing an air knife, which may be heated, at the part of the closure or container neck, e.g. to reshape it to cause the one or more tamper evidence features to engage with the container neck.

The system may comprise a perforating, slitting or cutting means or assembly, e.g. for perforating, slitting or cutting the container neck, closure, cylindrical skirt, tamper evidence feature or a membrane joining the tamper evidence feature to the closure or cylindrical skirt. The perforating, slitting or cutting means or assembly may be upstream, downstream, adjacent or alongside the at least one source of electromagnetic energy. The perforating, slitting or cutting means or assembly may comprise mechanical deformation means or features, such as spikes, to deform the part of the closure or container neck to be reshaped or tamper evidence feature(s) mechanically. The perforating, slitting or cutting means or assembly may comprise heating means, such as a heating element, for applying heat to the part of the closure or container neck to be reshaped or tamper evidence feature(s).

The system may comprise or form part of a packaging system, which may comprise one or more of a visual inspection station, a filling station, a capping station, labelling station, coding station, laser marking station and/or cartoning station. The system may be located before or after one of the aforementioned stations or between two of the aforementioned stations. The system may be integrated within or form part of one of the aforementioned stations.

The method may comprise reshaping part of the closure or container neck at the same time as the container or closure is capped, or thereafter. In cases where the part of the closure or container neck is reshaped at the same time as the container or closure is capped, the timing or sequencing of the reshaping is preferably configured or selected such that the reshaping occurs after the closure reaches a capped position on the container neck.

The method may comprise reshaping part of the closure or container neck at the same time as the container or closure is labelled. The method may comprise reshaping part of the closure or container neck at the same time as the container or closure is coded. The method may comprise reshaping part of the closure or container neck at the same time as the container or closure is laser marked. The method may comprise reshaping part of the closure or container neck at the same time as the container or closure is cartoned.

The system may comprise or form part of a visual inspection station. The visual inspection station may include one or more vision systems or cameras and/or may be operable or configured to identify one or more defects in the closure, container or package, such as a defect in the deformation or reshaping or shrinking or welding of the tamper evidence feature. The system may comprise or form part of a container capping station or system. The container capping station or system may comprise a heating ring, which may be incorporated with a capping chuck or may be coaxial therewith or separate therefrom. Additionally, or alternatively, the system may comprise or form part of a container labelling station or system. Additionally, or alternatively, the system may comprise or form part of a coding station or system. Additionally, or alternatively, the system may comprise a standalone station for incorporation into a packaging system.

Another broad aspect relates to a perforating, slitting or cutting means or assembly for perforating, slitting or cutting the closure, cylindrical skirt, tamper evidence feature or a membrane joining the tamper evidence feature to the closure or cylindrical skirt.

The perforating, slitting or cutting means or assembly may comprise one or more, e.g. a plurality of, spikes or a serrated blade or surface. The perforating, slitting or cutting means or assembly may comprise a slitting bar or plate or member, which may include the spike(s) or serrated blade or surface. The perforating, slitting or cutting means or assembly may comprise a conveying means or assembly, e.g. a conveyor. The conveying means or assembly may comprise one or more, e.g. a plurality of carriages that may be movably mounted thereon, thereto or therealong. The or each carriage may be operable or configured to hold or carry or influence or move the closure or a respective closure, e.g. whilst it is located on a container. At least one or each carriage may include a rolling means, such as a pair of rollers. The rolling means may be operable or configured to urge a closure against the spikes or serrated blade or surface.

Alternatively, the perforating, slitting or cutting means or assembly may comprise a laser or laser cutter. In some examples, the source(s) of electromagnetic energy includes at least one source of electromagnetic energy operable or configured to operate as a laser cutter and/or to perforate or slit the closure, cylindrical skirt, tamper evidence feature or a membrane joining the tamper evidence feature to the closure or cylindrical skirt.

Another broad aspect relates to a package, which may comprise the closure described above installed on a neck of a container.

The tamper evidence feature(s) may be engaged with the container neck. The tamper evidence feature(s) may be engaged with the container neck such that its removal from the container neck is inhibited, e.g. when the closure is removed therefrom. The tamper evidence feature(s) may be engaged with the container neck such that it has one or more other degrees of movement. In some cases, the tamper evidence feature(s) may be engaged with the container neck to allow movement or rotation therebetween, for example to enable the closure to be unscrewed from the container neck or at least rotated relative thereto.

In some examples of the package, a free end of the tamper evidence band is deformed inwardly, e.g. to create a lip for engaging an engaging feature or flange on the container neck. The tamper evidence feature(s) or band may be deformed inwardly about at least part of its circumference. The lip may extend about at least part of its circumference. The lip may enable the closure to rotate about the container neck. The lip may inhibit axial movement of the tamper evidence feature(s), e.g. such that the tamper evidence feature remains on the container neck when the closure is removed therefrom. The lip may enable the closure to rotate relative to the container neck whilst axially engaging the engaging feature or flange, e.g. thereby inhibiting its removal from the container neck.

In some examples of the package, at least part of the tamper evidence feature(s), e.g. the tamper evidence band or panel or the rim of the cylindrical skirt, is welded to the container neck. The tamper evidence feature(s) or band may be welded to the container neck about at least part of its circumference.

At least part of at least one of the tamper evidence features, e.g. the tamper evidence band, tab, rim or panel, may be crystallized or may have a color or opacity indicative of the tamper evidence band having been reshaped to engage the container neck.

Another broad aspect relates to a package comprising a closure, e.g. the aforementioned closure, installed on a neck of a container, wherein at least part of the closure or one or more tamper evidence features is crystallized or has a color or opacity indicative of the tamper evidence band having been reshaped to engage the container neck.

In some examples, the method, or reshaping part of the closure or container neck, may, but need not, comprise reshaping, deforming or shrinking part of the container neck, e.g. to engage the tamper evidence feature(s) therewith.

Another broad aspect relates to a method of installing a closure on a container neck comprising placing the closure over the container neck and reshaping, deforming or shrinking part of the container neck to cause one or more tamper evidence features to engage with the container neck.

The container neck may have a flange with an upstanding annular wall. The method may comprise reshaping, deforming or shrinking part of the upstanding annular wall to engage with one or more tamper evidence features of the closure, for example a tamper evidence band. The tamper evidence band may comprise an engaging feature on its outer surface. The engaging feature may comprise a flange.

Another broad aspect relates to a container or preform comprising a neck having a radial flange with an upstanding wall about its periphery, wherein the wall is configured to be reshaped, in use, to engage with one or more tamper evidence features of a closure installed thereon, for example a tamper evidence band.

Another broad aspect relates to a package or a kit of parts comprising the container or preform and a closure comprising a tamper evidence band with an engaging feature for cooperation with the upstanding wall.

Another broad aspect relates to a package comprising the container or preform and a closure comprising a tamper evidence band with an engaging feature engaged with the upstanding wall.

In other examples, a separate connecting element may be used to connect the tamper evidence feature(s) to the container neck.

Another broad aspect relates to a method of installing a closure on a container neck comprising placing the closure over the container neck and reshaping a connecting element to cause one or more tamper evidence features of the closure to engage with the container neck.

Another broad aspect relates to a package or a kit of parts comprising a container, a closure and a connecting element, wherein the connecting element is configured to be reshaped, in use, to cause one or more tamper evidence features of the closure to engage with the container neck.

Another broad aspect relates to a method of installing a closure on a container neck comprising placing the closure over the container neck and reshaping a connecting element to cause one or more tamper evidence features of the closure or of the connecting element to engage with the container neck.

The connecting element may comprise a connecting ring. The method may comprise deforming or shrinking part of the connecting element to engage with one or more tamper evidence features of the closure, for example a tamper evidence band. The tamper evidence band may comprise an engaging feature on its outer surface. The engaging feature may comprise a flange. The method may comprise deforming or shrinking part of the connecting element to engage with one or more tamper evidence features of the container neck, for example an engaging flange.

The method may comprise installing, deforming or shrinking part of the connecting element to cause one or more tamper evidence features of the closure, for example one or more tamper evidence hooks, to engage with the container neck. The tamper evidence features may comprise a tamper evidence band with one or more, e.g. a plurality of depending hooks. The depending hooks may be splayed outwardly. The connecting ring may urge the depending hooks toward the container neck, for example upon installation and/or on deformation or shrinking of the connecting element or ring on or over the closure.

Another broad aspect relates to a method of installing a closure on a container neck comprising placing the closure over the container neck and installing a connecting element or ring over one or more tamper evidence hooks frangibly connected to the closure to urge them into engagement with the container neck.

Another broad aspect relates to a closure, e.g. for sealingly closing a neck opening of a container, the closure comprising a top wall, a cylindrical skirt depending from the top wall and one or more tamper evidence hooks frangibly connected to the cylindrical skirt, wherein the tamper evidence hooks are configured to be urged, in use, into engagement with the container neck by a connecting element or ring.

The one or more tamper evidence hooks may depend from a tamper evidence band. The tamper evidence band may be frangibly connected to the cylindrical skirt. The one or more tamper evidence hooks frangibly connected to the cylindrical skirt by or via the tamper evidence band. The tamper evidence hooks may be splayed outwardly.

Another broad aspect relates to a combination of the closure of the immediately preceding aspect in combination with a connecting element or ring.

The connecting element or ring may be configured to urge, in use, the tamper evidence hooks toward the container neck, for example upon installation and/or on deformation or shrinking of the connecting element or ring on or over the closure.

In some embodiments, the connecting element may comprise a sleeve. The sleeve may include one or more tamper evidence features.

Another broad aspect relates to a method of installing a closure on a container neck comprising placing the closure over the container neck and reshaping a sleeve to cause one or more tamper evidence features of the closure or of the sleeve to engage with the container neck.

Another broad aspect relates to a package or a kit of parts comprising a container, a closure and a connecting element or sleeve, wherein the connecting element or sleeve is configured to be reshaped, in use, to engage both the closure and the container neck and includes one or more tamper evidence features.

The connecting element or sleeve may comprise an oversleeve. The connecting element or sleeve may comprise a first portion, which may be configured to remain on the closure when it is removed from the container neck. The connecting element or sleeve may comprise a second portion, which may be configured to remain on the container neck when the closure is removed from the container neck. The first portion may be connected to the second portion by a frangible connection. The frangible connection may comprise one or more weakened lines. The weakened line may extend about the circumference of the connecting element or sleeve.

The connecting element or sleeve may be separate from the container and the closure.

Another broad aspect relates to a package or a kit of parts comprising a container and a closure with a connection sleeve, wherein the connection sleeve is configured to be reshaped, in use, to engage the container neck and includes one or more tamper evidence features.

The connection sleeve may comprise or be provided by the tamper evidence band.

The tamper evidence band may comprise or provide the or a connection sleeve.

The connecting element or ring may depend from the tamper evidence band. The connecting element or ring may be configured to be urged, in use, over a profiled outer surface of the tamper evidence band, e.g. when the closure is installed onto a container neck, thereby to cause the tamper evidence band to contract into engagement with a flange of the container neck.

Another broad aspect relates to a closure, e.g. for sealingly closing a neck opening of a container, the closure comprising a top wall, a cylindrical skirt depending from the top wall, a tamper evidence band frangibly connected to the cylindrical skirt and a ring depending from the tamper evidence band, wherein the connecting ring is configured to be urged, in use, over a profiled outer surface of the tamper evidence band when the closure is installed onto a container neck, thereby to cause the tamper evidence band to contract into engagement with a flange of the container neck.

The tamper evidence band may comprise an annular projection, which may project inwardly e.g. prior to the closure being installed on the container neck. The tamper evidence band or annular projection may comprise an inwardly projecting lip, e.g. prior to the closure being installed on the container neck. The inwardly projecting lip may be configured to be contracted into engagement with a flange of the container neck when the closure is installed thereon.

The connecting element or ring may comprise a cam or cam surface. The profiled outer surface of the tamper evidence band may be shaped to cooperate with the cam or cam surface of the connecting ring. The connecting element or ring may be configured to contact, in use, a flange, e.g. a further flange such as a support ring, of the container neck as the closure is installed onto the container neck. The flange or further flange or support ring may force the cam or cam surface of the connecting element or ring against the profiled outer surface of the tamper evidence band. The cam or cam surface of the connecting element or ring may cause an inward deformation of the lower portion of the tamper evidence band, e.g. thereby contracting the annular projection or projecting lip.

Once contracted into engagement with a flange of the container neck, the tamper evidence band may be retained thereon, for example such that subsequent removal of the closure from the container neck severs the bridges and/or separates the tamper evidence band from the rest of the closure.

The container neck or tamper evidence engaging feature may comprise one or more anti-rotation or locking features, e.g. to inhibit rotation or movement of the tamper evidence feature relative to the container neck when they are engaged.

Another broad aspect relates to a container or preform comprising a neck having a tamper evidence engaging feature including one or more anti-rotation or locking features.

The tamper evidence engaging feature may comprise a projection, ring, flange or bead.

The method may comprise reshaping part of the closure, e.g. the tamper evidence band, into mating contact with the or an anti-rotation or locking feature of the closure neck. The mating contact between the anti-rotation or locking feature and the part of the closure or container neck to be reshaped may be configured to inhibit rotation or movement of the tamper evidence feature relative to the container neck. At least one or the or each anti-rotation or locking feature may comprise a notch, rib or non-round or oval shape of part of the container neck. The tamper evidence band may be configured to deform or shrink into mating contact with the anti-rotation or locking feature. The anti-rotation or locking feature may comprise a ratchet.

Another broad aspect relates to a container or preform comprising a neck having a non-round tamper evidence engaging feature.

The tamper evidence engaging feature may be oval and/or may comprise one or more lobes.

Another broad aspect relates to a package comprising the container and a closure comprising one or more tamper evidence features, e.g. a tamper evidence band, engaged with the non-round tamper evidence engaging feature of the container.

The preform or container may comprise a neck, which may include one or more of the features of the container neck described above. The preform or container may comprise a securing feature, e.g. on the neck. The securing feature may comprise a radial feature, for example a radial projection. The securing feature may comprise an annular feature, such as an annular projection. The securing feature may comprise a snap fit feature. Alternatively, the securing feature may comprise a helical feature, such as a screw thread.

The preform or container or the neck may comprise a flange, for example a handling flange or support ledge. The tamper evidence engaging feature may be between the flange and the securing feature. The tamper evidence engaging feature may comprise a recess or groove.

Another broad aspect relates to a container or preform comprising a neck with a securing feature for securing a closure to the neck, a flange below the securing feature and a tamper evidence engaging recess or groove between the flange and the securing feature.

The recess or groove may be annular and/or extend about at least part of the periphery of the preform or container or neck. The container or preform may be featureless and/or devoid of any projections, e.g. radial projections, between the tamper evidence engaging recess or groove and the securing feature. The neck may comprise a root diameter, which comprise or correspond to the smallest outer diameter on, in or associated with the securing feature. The tamper evidence engaging recess or groove may comprise a diameter that is less than the root diameter of the neck.

The method may comprise reshaping the part of the closure or tamper evidence feature(s) such that it or they enter the tamper evidence engaging recess or groove.

Another broad aspect relates to a package comprising the container with a closure installed thereon and one or more tamper evidence features of the closure received within the tamper evidence engaging recess or groove.

The method may comprise reshaping a further part of the closure, for example to provide a securing feature on an inner surface of the closure for cooperating with a securing feature of the container neck. The securing feature may comprise a radial feature, for example a radial projection. The securing feature may comprise an annular feature, such as an annular projection. The securing feature may comprise a snap fit feature. Alternatively, the securing feature may comprise a helical feature, such as a screw thread.

Another broad aspect relates to a kit of parts for assembly into a package, the kit comprising a container and a closure, such as the closure described above. The closure may be for sealingly closing a neck opening of the container. The closure may comprise a top wall. The closure may comprise a cylindrical skirt, which may depend from the top wall. The closure may comprise a tamper evidence band, which may be connected to the cylindrical skirt. The tamper evidence band may be configured to avoid engaging the container when the closure is installed over the neck opening of the container. The tamper evidence band may be configured to be reshaped, in use, with the closure installed on the container, e.g. thereby to engage the tamper evidence band with the container.

Another broad aspect relates to a kit of parts for assembly into a package, the kit comprising a container and a molded closure for sealingly closing a neck opening of the container, the closure comprising a top wall, a cylindrical skirt depending from the top wall and a tamper evidence band connected to the cylindrical skirt, wherein the tamper evidence band is configured to avoid engaging the container when the closure is installed over the neck opening of the container and to be reshaped, in use, with the closure installed on the container, thereby to engage the tamper evidence band with the container.

The container may comprise a neck finish, which may comprise a mating surface. The tamper evidence band may comprise a mating surface. The mating surface of the tamper evidence band may be configured to clear the mating surface of the neck finish, e.g. when the closure is installed over the neck opening of the container. The tamper evidence band may be configured to be reshaped, for example to cause the mating surface thereof to engage with the mating surface of the container neck.

Another broad aspect relates to a kit of parts for assembly into a package, the kit comprising a container and a molded closure for engaging a neck finish of the container to sealingly close the container, the closure comprising a top wall, a cylindrical skirt depending from the top wall and a tamper evidence band connected to the cylindrical skirt, wherein the tamper evidence band comprises a mating surface configured to clear a mating surface of the neck finish of the container when the closure is installed thereon and the tamper evidence band is configured to be reshaped to cause the mating surface thereof to engage with the mating surface of the container neck.

Another broad aspect relates to a packaging system comprising the system described above.

Another broad aspect relates to a mold stack, e.g. for molding the closure described above. The mold stack may comprise a molding configuration, for example in which it includes, describes or defines a cavity for molding the closure described above. The mold stack may comprise a demolding configuration, for example in which components thereof are separated to eject a molded closure.

The mold stack may comprise a stripper sleeve. The stripper sleeve may be movable, in use, to contact the annular tamper evidence band of a molded closure. The stripper sleeve may have a first surface and/or a second surface. The first and second surfaces may be for simultaneously contacting a side and an underside surface of the annular tamper evidence band, respectively, e.g. during the stripping of the molded article.

The stripper sleeve may comprise a pocket. The pocket may define the first surface and/or the second surface. The first surface may comprise a first axial wall. The first axial wall may be configured to engage the side of the tamper evidence band. The first axial wall may provide a stopper. The stopper may delimit an extent of radial travel of the tamper evidence band of the closure during stripping thereof. The second surface may comprise a second traverse wall. The second traverse wall may be configured to engage a bottommost portion of a tamper evidence band.

The mold stack may comprise a core or core part or core insert or core assembly, hereinafter core. The pocket may be associated with a depth. The pocket may have a depth configured such that the tamper band is substantially isolated from a force, e.g. an axially directed force, applied to the closure to remove it from the core. The depth of the pocket may be substantially the same as, or similar or equivalent to, an axial height or length of the tamper evidence band and bridges or membrane, if present. The pocket may have a depth configured such that the stripper sleeve, e.g. a top surface thereof adjacent to the pocket, contacts part of the rim of the cylindrical skirt during ejection, e.g. to transfer an ejection force thereto.

The depth may represent a distance between an edge and the first axial wall. The depth may be selected to allow the portion of the tamper evidence band to deflect in a first direction, e.g. to clear a feature of the molding stack. The depth may be selected to prevent significant damage attributable to "over-deflection" of the portion of the tamper evidence band in the first direction. The depth of the pocket may be selected to accommodate an allowable travel path for the portion of the tamper evidence band.

The mold stack may comprise a cavity or cavity part or cavity insert or cavity assembly, hereinafter cavity. The core may comprise a molding surface describing an internal portion of the resulting closure. The cavity may comprise a molding surface describing an external portion of the resulting closure, for example at least part of an external surface of the top wall and/or at least part of an external surface of the cylindrical skirt thereof. The core may comprise a molding surface describing with a molding surface of the cavity at least part of the resulting closure.

In some examples, the mold stack comprises a split part or split insert or slides, which may comprise a molding surface describing at least part of an external surface of the tamper evidence band and/or the frangible connection or bridges or membrane of the resulting closure. The split part or split insert or slides may comprise a molding surface describing at least part of an external surface of the cylindrical skirt of the resulting closure.

In other examples, the cavity may comprise a molding surface describing at least part of an external surface of the tamper evidence band and/or the frangible connection or bridges or membrane of the resulting closure. In such examples, the tamper evidence band may be larger than the cylindrical skirt. The tamper evidence band may have a diameter that is larger than that of the cylindrical skirt. The tamper evidence band may be connected, for example frangibly connected, to the cylindrical skirt by a membrane or frangible connection or one or more bridges that extend radially and/or axially. The membrane or frangible connection or one or more bridges may extend at an angle relative to both the radial and axial directions. The tamper evidence band may be connected, for example frangibly connected, to the cylindrical skirt by a radial membrane or one or more radial bridges. The tamper evidence band may be connected to the cylindrical skirt by a conical or frustoconical membrane.

Another broad aspect relates to a mold comprising a plurality of mold stacks as described above.

Another broad aspect relates to a molding system comprising the aforementioned mold. The molding system may comprise a molding machine, which may but need not be an injection molding machine. The molding machine may comprise a clamp to which the mold may be mounted. The clamp may include a pair of platens, which may be movable toward and away from one another. The mold may comprise two parts, each of which may include part of each mold stack. Each mold part may be mounted to one of the platens. The platens may be movable to move the mold stacks between their molding and demolding configurations.

The molding system may comprise a perforating, slitting or cutting means or assembly closures described above. Additionally, or alternatively, the molding system may comprise the system for installing or engaging closure tamper evidence features with a container neck as described above.

Another broad aspect relates to a method of installing a thermoplastic closure on a container neck comprising placing the closure over the container neck and plastically reshaping part of the closure to cause formation of a securing feature thereon that conforms to a complementary securing feature on the container neck.

The method may comprise plastically reshaping the part of the closure by applying heat. The method may comprise applying heat to a cylindrical skirt depending from a top wall of the closure, for example to reshape a selected portion of the cylindrical skirt to conform with a securing feature of the container neck.

The heat may be applied by any of the aforementioned means. The heat may be applied such that the plastically reshaped part of the closure at least partially crystallizes. The method may comprise applying heat to the cylindrical skirt such that at least part of the closure or cylindrical skirt, e.g. the plastically reshaped part, at least partially crystallizes. Heat may be applied to the entire closure, for example such that the entire closure at least partially crystallizes.

Another broad aspect relates to a thermoplastic closure for sealingly closing a neck opening of a container, the closure comprising a top wall, a cylindrical skirt depending from the top wall and an annular tamper evidence band connected to the cylindrical skirt, wherein an inner surface of the cylindrical skirt is a substantially cylindrical and devoid of a securing feature for enabling the closure to be received on the container neck in an unencumbered manner.

The tamper evidence band comprises a substantially cylindrical inner surface devoid of engaging features for enabling a flange of the container neck to be received therein an unencumbered manner.

Another broad aspect relates to a package comprising a thermoplastic closure on a container neck, wherein the closure comprises a securing feature formed by plastically reshaping part of the closure by heat such that it both conforms to a complementary securing feature on the container neck and at least the securing feature is at least partially crystallized.

Another broad aspect relates to a method of installing a closure on a container neck comprising placing the closure over the container neck and irradiating part of the closure with a laser to engage the closure with the container neck, wherein at least the irradiated part of the closure comprises a polyethylene terephthalate (PET) material.

Irradiating part of the closure with a laser may comprise directing a substantially planar laser beam at the part of the closure or container neck.

Another broad aspect relates to a method of installing a closure on a container neck comprising placing the closure over the container neck and irradiating part of the closure with a substantially planar laser beam to engage the closure with the container neck.

The method may comprise rotating the closure whilst the closure part is irradiated by the substantially planar laser beam.

The method may comprise modifying one or more characteristics of a laser emitted, for example by a source, using one or more optical devices to provide, alter or redirect the substantially planar laser beam.

The one or more optical devices may comprise a rotating polygonal mirror, e.g. for spreading the laser emitted by the source.

The one or more optical devices may comprise a freeform mirror, e.g. for spreading the laser emitted by the source.

The method may comprise conveying, e.g. along a conveying direction, a plurality of closures each on a respective container neck. The method may comprise irradiating part of each closure simultaneously, e.g. with the substantially planar laser beam.

The one or more optical devices may comprise one or more mirrors. The one or more mirrors may be on an opposite side of the closures to the source. At least part of the substantially planar laser beam may travel around or between the closures. At least part of the substantially planar laser beam may be reflected back at the closures, e.g. by the one or more mirrors.

The one or more mirrors on the opposite side of the closures to the source may comprise a series of alternating peaks and troughs.

At least some of the peaks and troughs of the series may be substantially identical.

At least some of the peaks and troughs of the series may vary in amplitude.

Each peak may comprise a pair of opposed flanks. At least one or each flank may be substantially flat or planar.

The one or more mirrors on the opposite side of the closures to the source may comprise a concave mirror, which may be associated with each closure.

The concave mirror(s) may move with the closures, e.g. along the conveying direction.

The one or more optical devices may comprise a scanning lens. The scanning lens may be for providing the substantially planar laser beam with a substantially planar focal point, which may be along the conveying direction.

The method may comprise supporting a radial support flange of the container neck. The method may comprise engaging opposite sides of a container body depending from the container neck, for example to convey the container along the conveying direction and/or to rotate the container and closure as it is conveyed along the conveying direction.

The method may comprise engaging opposite sides of a container body using a pair of conveyors. Each conveyor may engage the container body at a different axial location.

The substantially planar laser beam may be directed along part of the circumference of a tamper evidence band of the closure, e.g. to engage the tamper evidence band with a flange of the container neck.

A mating surface of the tamper evidence band may be configured to clear the flange when the closure is placed over the container neck. A mating surface of the tamper evidence band may be configured to engage the flange if the closure is removed from the container neck, e.g. after the tamper evidence band is irradiated by the substantially planar laser beam.

The tamper evidence band may have a substantially cylindrical inner surface, which may be molded by a substantially cylindrical outer surface of a core, e.g. for inhibiting internal stresses within the molded tamper evidence band.

The substantially cylindrical inner surface of the tamper evidence band may be devoid of any engaging features.

The tamper evidence band may have a substantially constant wall thickness. The wall thickness may be between 0.3 mm and 0.8 mm. The wall thickness may be between 0.35 mm and 0.8 mm, for example between 0.4 mm and 0.75 mm.

Additionally, or alternatively, the tamper evidence band may have a radial wall thickness which between 10% and 25% of its axial length, for example between 12% and 23% of its axial length. In some examples, the tamper evidence band has a radial wall thickness which is between 14% and 21% of its axial length, for example between 15% and 20% of its axial length.

The closure part may be irradiated so as to create a predetermined temperature differential between an outer surface of the closure part and an inner surface thereof.

Irradiating the closure part may comprise generating a visual indicator. Generating the visual indicator may comprise crystallizing the closure part. Generating the visual indicator may comprise changing a color or opacity of the closure part.

The closure part may comprise an additive. The additive may be configured to change color when exposed to a predetermined heat for a predetermined period.

The closure may comprise a multimodal PET material. The multimodal PET material may comprise or be formed of a first PET, e.g. having a first molecular weight. The multimodal PET material may comprise or be formed of a second PET, e.g. having a second molecular weight that may be higher than the first molecular weight.

The closure may comprise PET having an intrinsic viscosity of less than 0.8 dL/g, for example less than 0.7 dL/g.

The method may comprise molding the closure from PET having an intrinsic viscosity of between 0.4 dL/g and 0.8 dL/g. The method may comprise molding the closure from PET having an intrinsic viscosity of between 0.3 dL/g and 0.7 dL/g.

The method may comprise perforating, slitting or cutting a membrane joining the tamper evidence feature to the closure, e.g. whilst the closure is installed on the container neck, thereby to provide a frangible connection therebetween.

Another broad aspect relates to a system for engaging a closure to a container neck, the system comprising conveying means for conveying along a conveying direction one or more containers each with a closure on a neck thereof and a laser assembly operable to irradiate part of the or each closure with a substantially planar laser beam as it is conveyed along the conveying direction to cause engagement of the closure with the container neck.

The conveying means may be operable to rotate the closure and container neck, e.g. whilst the closure part is irradiated by the substantially planar laser beam.

The system may comprise one or more optical devices. The one or more optical devices may be for modifying one or more characteristics of a laser emitted by a source, e.g. to provide, alter or redirect the substantially planar laser beam.

The one or more optical devices may comprise a rotating polygonal mirror, e.g. for spreading the laser emitted by the source.

The one or more optical devices may comprise a freeform mirror, e.g. for spreading the laser emitted by the source.

The one or more optical devices may comprise one or more mirrors, which may be on an opposite side of the closures or conveying means to the source. The one or more mirrors may be for reflecting at least part of the substantially planar laser beam which travels around or between the closures back at the closures.

The one or more mirrors on the opposite side of the closures to the source may comprise a series of alternating peaks and troughs. At least some of the peaks and troughs of the series may be substantially identical or may vary in amplitude.

At least one or each peak may comprise a pair of opposed flanks. The or each flank may be substantially flat or planar.

The one or more mirrors on the opposite side of the closures to the source may comprise a concave mirror associated with each closure.

The concave mirrors may move with the closures, e.g. along the conveying direction.

The one or more optical devices may comprise a scanning lens, e.g. for providing the substantially planar laser beam with a substantially planar focal point along the conveying direction.

The conveying means may comprise a rail, e.g. for supporting a radial support flange of the container neck. The conveying means may comprise one or more, e.g. a pair of conveyors. The pair of conveyors may engage opposite sides of a container body depending from the container neck. The pair of conveyors may engage the opposite sides of a container body to convey the container along the conveying direction and/or to rotate the container and closure as it is conveyed along the conveying direction.

A first of the conveyors may be spaced further from the rail than a second of the conveyors, e.g. for engaging opposite sides of the container body at a different axial locations.

The substantially planar laser beam may be oriented along the conveying direction.

The laser assembly may be configured to irradiate the closure part so as to create a predetermined temperature differential between an outer surface thereof and an inner surface thereof.

The system may comprise a perforating, slitting or cutting means for perforating, slitting or cutting a membrane joining a tamper evidence feature of the closure to the rest of the closure, e.g. whilst it is installed on the container neck, thereby to provide a frangible connection therebetween.

Another broad aspect relates to a closure comprising a polyethylene terephthalate (PET) material having an intrinsic viscosity of less than 0.8 dL/g and an engaging portion that is adapted to be reshaped upon irradiation by a laser.

The PET may comprise an intrinsic viscosity of between 0.3 dL/g and 0.7 dL/g.

The PET may comprise a multimodal PET material. The multimodal PET material may comprise or be formed of a first PET, which may have a first molecular weight. The multimodal PET material may comprise or be formed of a second PET, which may have a second molecular weight that may be higher than the first molecular weight.

The engaging portion may comprise a mating surface. The mating surface may be configured to clear a flange of a container neck when the closure is placed thereover. The mating surface may be configured to engage the flange if the closure is removed from the container neck after the engaging portion is irradiated by a laser.

The closure may comprise a top wall. The closure may comprise a cylindrical skirt. The cylindrical skirt may depend from the top wall. The engaging portion may comprise an annular tamper evidence band. The tamper evidence band may be connected to the cylindrical skirt.

Another broad aspect relates to a closure comprising a top wall, a cylindrical skirt depending from the top wall and an annular tamper evidence band connected to the cylindrical skirt that is adapted to be reshaped upon irradiation by a laser, wherein the closure is formed of a polyethylene terephthalate (PET) material and the tamper evidence band comprises a substantially cylindrical mating surface configured to clear a flange of a container neck when the closure is placed thereover but is configured to engage the flange if the closure is removed from the container neck after the engaging portion is irradiated by a laser.

The tamper evidence band may be substantially free of residual hoop stress.

Another broad aspect relates to a closure comprising a polyethylene terephthalate (PET) material comprising a top wall and a cylindrical skirt depending from the top wall and a tamper evidence band connected to the cylindrical skirt, wherein the tamper evidence band substantially free of residual hoop stress and adapted to be reshaped upon irradiation by a laser.

The tamper evidence band may comprise a free edge portion. The free edge portion may be configured to deform, shrink or curl, e.g. radially, upon irradiation by a laser, for example to form a radial lip for engaging a flange of a container neck.

The tamper evidence band may comprise a substantially cylindrical inner surface, which may be devoid of engaging features.

The tamper evidence band may have a substantially constant wall thickness. The wall thickness may be between 0.3 mm and 0.8 mm. The wall thickness may be less than 25% of its axial length. The wall thickness may be less than 20% of its axial length. The wall thickness may be less than 15% of its axial length.

At least part of the connection between the tamper evidence band and the cylindrical skirt may be frangible.

The tamper evidence band may be connected to the cylindrical skirt by a membrane. The membrane may have a radial wall thickness that is less than that of the tamper evidence band and the cylindrical skirt.

The tamper evidence band may comprise a first annular portion. The first annular portion may be connected to the cylindrical skirt of the closure. The tamper evidence band may comprise a second annular portion. The second annular portion may depend from the first annular portion. The second annular portion may have a radial wall thickness that is less than that of the first annular portion.

The closure may comprise a tether, which may connect the tamper evidence band to the cylindrical skirt.

The engaging portion may comprise an additive. The additive may be configured to change color when exposed to a predetermined heat for a predetermined period.

The engaging portion may comprise a reheat agent, e.g. for increasing its heat absorption. Another broad aspect relates to a mold stack comprising a molding configuration in which it describes a cavity for molding a closure. The closure may be a closure as described above.

The mold stack may comprise a stripper sleeve. The stripper sleeve may be movable, in use, to contact the tamper evidence band of a molded closure. The stripper sleeve may have a first surface and a second surface for simultaneously contacting a side and an underside surface of the tamper evidence band, respectively, during the stripping of the molded closure.

The stripper sleeve may comprise a pocket. The pocket may define the first and second surfaces. The pocket may have a depth, which may be configured such that a top surface of the stripper sleeve, adjacent to the pocket, contacts part of a rim of the cylindrical skirt during ejection for transferring an ejection force thereto.

The mold stack may comprise a cavity insert or assembly. The cavity insert or assembly may have a molding surface describing at least part of an external surface of at least one or each of the cylindrical skirt and the tamper evidence band.

Another broad aspect relates to a mold comprising a plurality of mold stacks as described above.

Another broad aspect relates to a molding system comprising the mold described above.

Another broad aspect relates to a packaging system comprising the system described above and one or more of a visual inspection station, a capping station, labelling station, coding station, laser marking station and/or cartoning station.

Another broad aspect relates to a kit of parts for assembly into a package, the kit comprising a container and a molded closure for sealingly closing a neck opening of the container, the closure comprising an engaging portion configured to avoid engaging the container when the closure is installed over the neck opening of the container and to be reshaped, in use, upon irradiation by a laser with the closure installed on the container, thereby to engage the engaging portion with the container.

The closure may comprise a closure as described above.

Another aspect relates to a computer program element comprising and/or describing and/or defining a three-dimensional design for use with a simulation means or a three-dimensional additive or subtractive manufacturing means or device, e.g. a three-dimensional printer or CNC machine, the three-dimensional design comprising a closure, mold stack, mold or any one or more other mold components described above.

A further aspect relates to a computer program element comprising computer readable program code means for causing a processor to execute a procedure to implement one or more steps of any one of the aforementioned methods.

A yet further aspect relates to the computer program element embodied on a computer readable medium.

A yet further aspect relates to a computer readable medium having a program stored thereon, where the program is arranged to make a computer execute a procedure to implement one or more steps of the aforementioned method.

A yet further aspect relates to a control means or control system or controller comprising the aforementioned computer program element or computer readable medium.

For the avoidance of doubt, any of the features described herein apply equally to any aspect of the invention. Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed.

The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which:

FIG. 28 depicts a schematic top view of rollers of a closure conditioning system according to another example, in operation;

FIG. 29 depicts a schematic side view of the arrangement of FIG. 28, with the body of the container omitted;

FIG. 30 depicts a schematic top view of a wire of a closure conditioning system according to another example, in operation;

FIG. 31 depicts a schematic side view of the arrangement of FIG. 30, with the body of the container omitted;

DETAILED DESCRIPTION OF THE INVENTION

Figure 1:
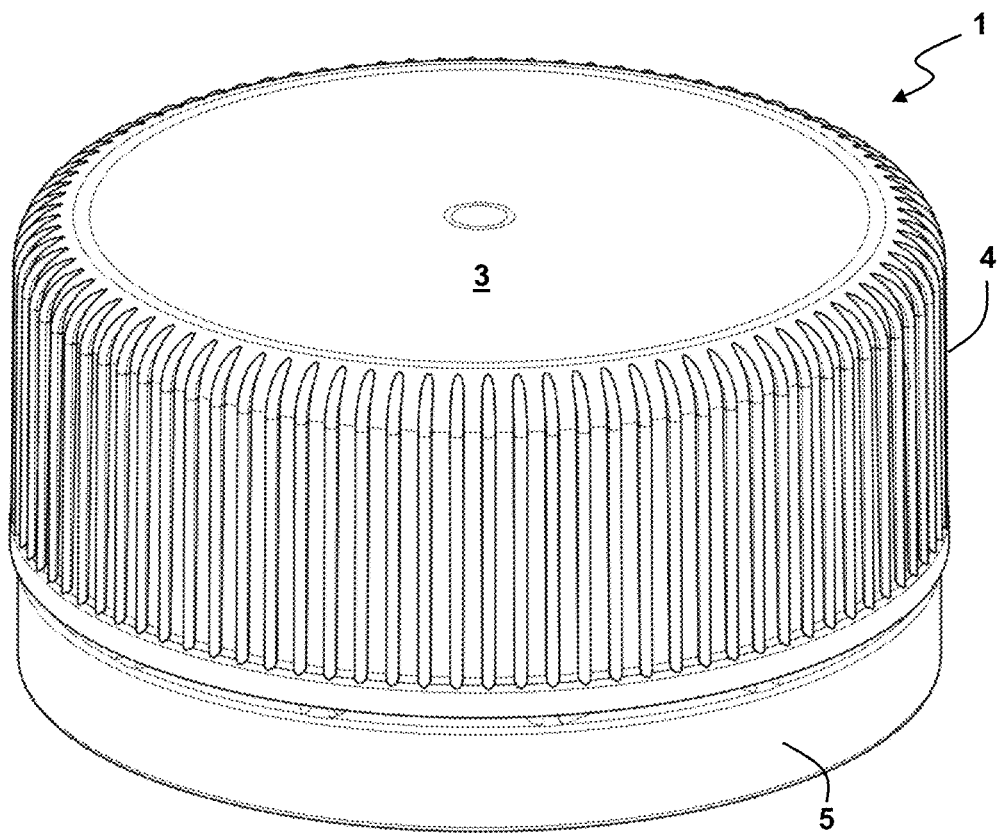
FIG. 1 depicts a perspective view of a closure according to a first example.
Figure 2:
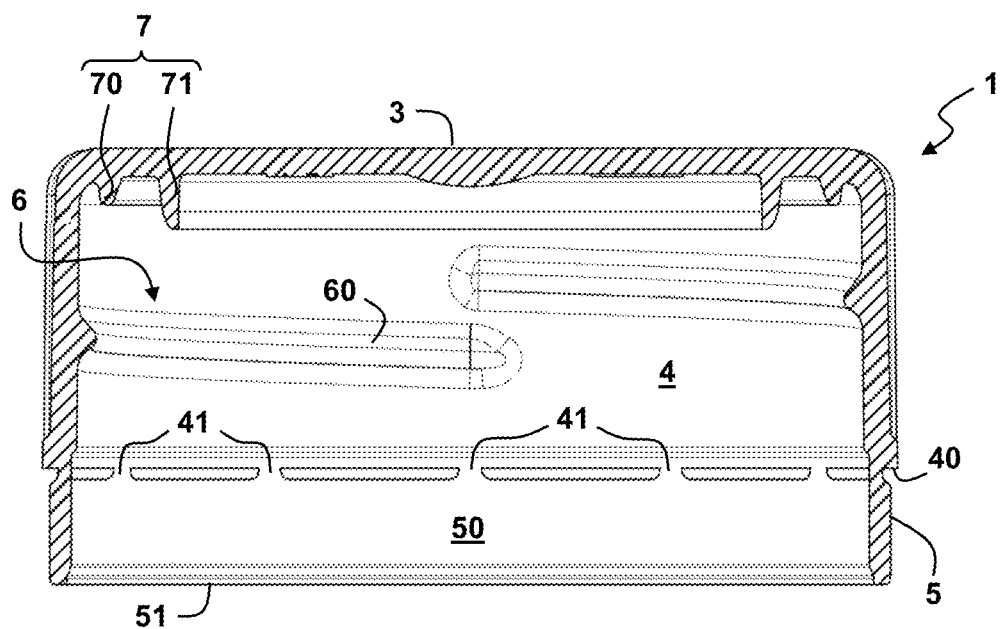
FIG. 2 depicts a cross-sectional view of the closure of FIG. 1.
Figure 7:
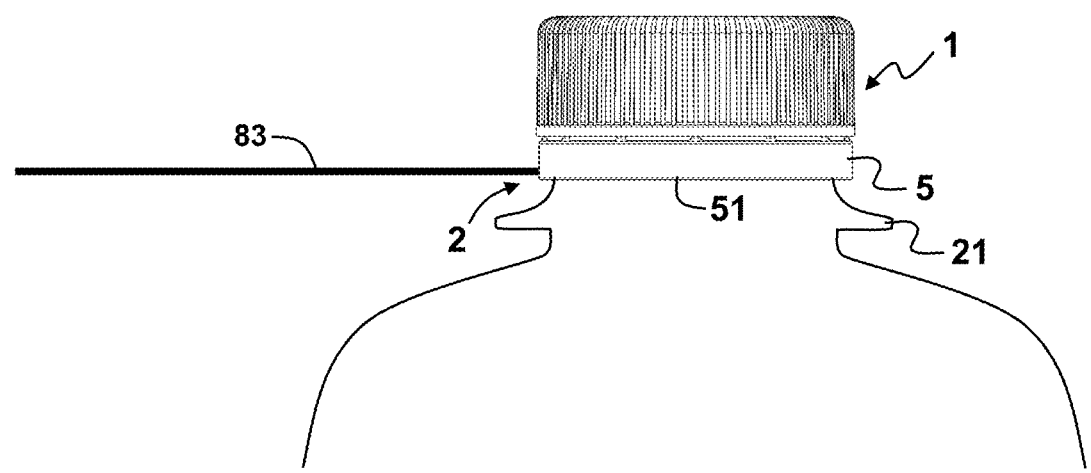
FIG. 7 depicts the closure of FIGS. 1 and 2 installed on a container neck while the container is at an early stage of conditioning by the closure conditioning system of FIG. 6.
Figure 8:
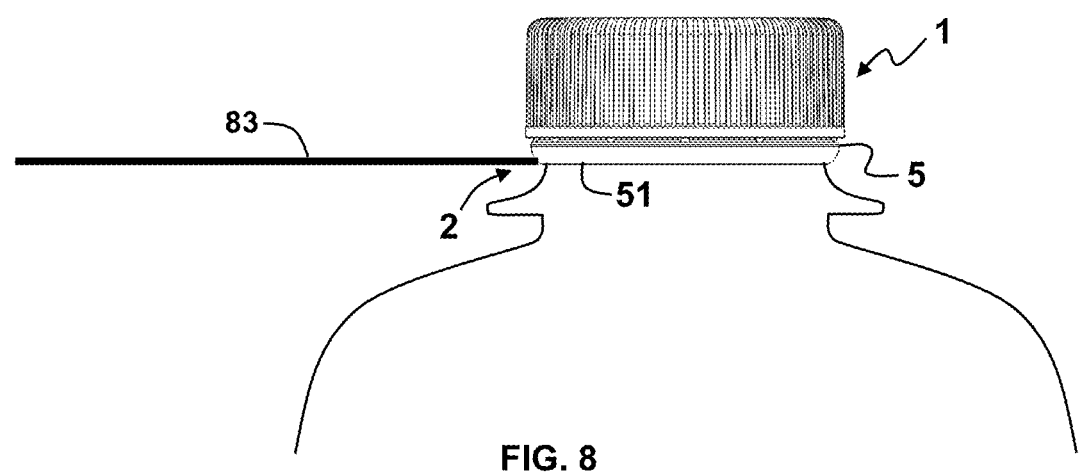
FIG. 8 depicts a similar view to FIG. 7 during a later stage of conditioning by the closure conditioning system of FIG. 6.
Figure 9:
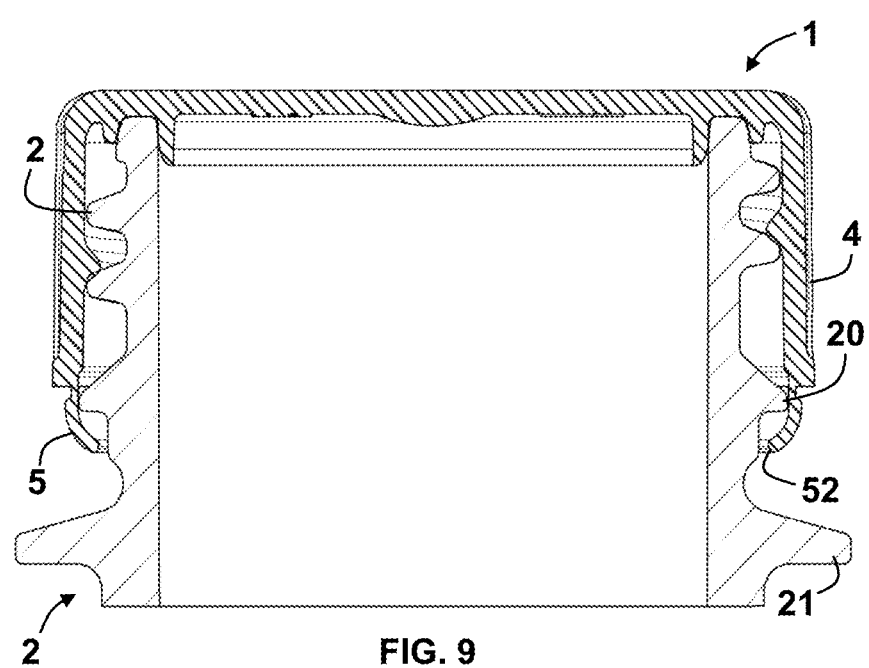
FIG. 9 depicts a section view of the arrangement shown in FIG. 8.

With reference to FIGS. 1 and 2, there is shown a closure 1 for sealingly closing the opening of a container neck 2 (shown in FIGS. 7 to 9). In this example, both the closure 1 and the container neck 2 to which it is to be installed are formed of polyethylene terephthalate (PET). It is, however, envisaged that the closure 1 could be formed of another material, such as high density polyethylene (HDPE). In fact, all of the closures described below may be formed of either PET or HDPE.

The closure 1 includes a top wall 3, a side wall or cylindrical skirt 4 depending from the top wall 3 and having a substantially planar rim 40 describing an open end of the closure 1. The closure 1 also includes an annular tamper evidence band 5 frangibly connected to the planar rim 40 of the cylindrical skirt 4 by a plurality of bridges 41.

The tamper evidence band 5 in this example includes a substantially cylindrical inner surface 50, which is smooth, featureless and devoid of engaging features. As such, an engaging feature or flange 20 of the container neck 2 (shown in FIG. 9) can be inserted therein in an unencumbered manner. The tamper evidence band 5 also has a substantially uniform radial wall thickness, but tapers toward its open end 51. In this example, the substantially uniform radial wall thickness of the tamper evidence band 5 is approximately 0.4 mm, However, it is envisaged that this could be thinner, for example 0.3 mm, or thicker, but it is preferably 0.5 mm or less.

The closure 1 in this example includes a securing feature 6 in the form of a screw thread 60 which is protrudes from an inner surface of the cylindrical skirt 4 and is formed integrally therewith. The closure 1 also includes sealing features 7 in the form of inner and outer annular sealing elements 70, 71, which depend from the top wall 3 and are formed integrally therewith. It will be appreciated that one or more screw threads 60 may be included, or a snap on feature may be included instead of the screw thread 60.

Figure 3:
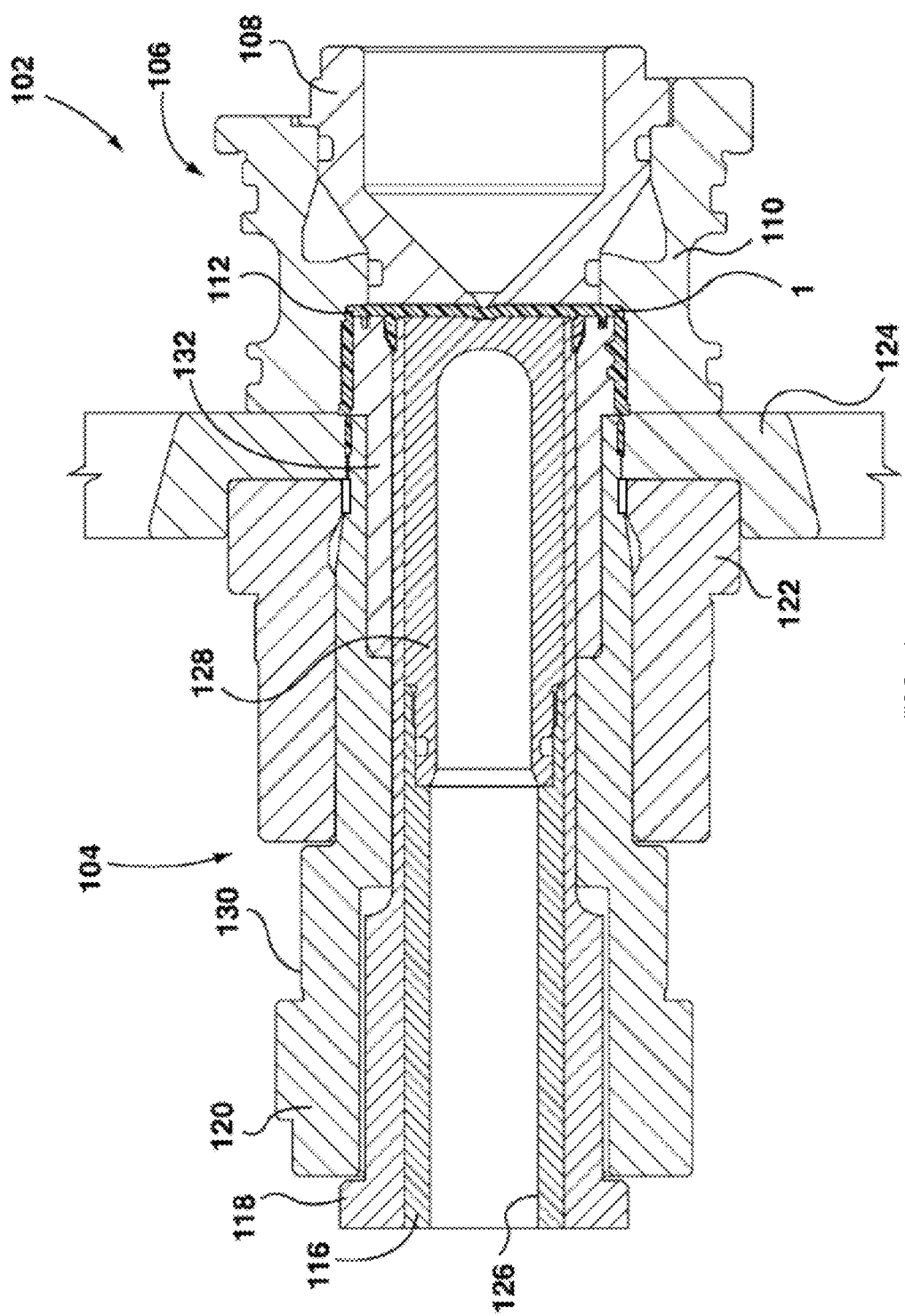
FIG. 3 depicts a schematic representation of a cross-section of a mold stack portion of a mold assembly, taken along operational axis thereof, for molding the closure of FIGS. 1 and 2.
Figure 4:
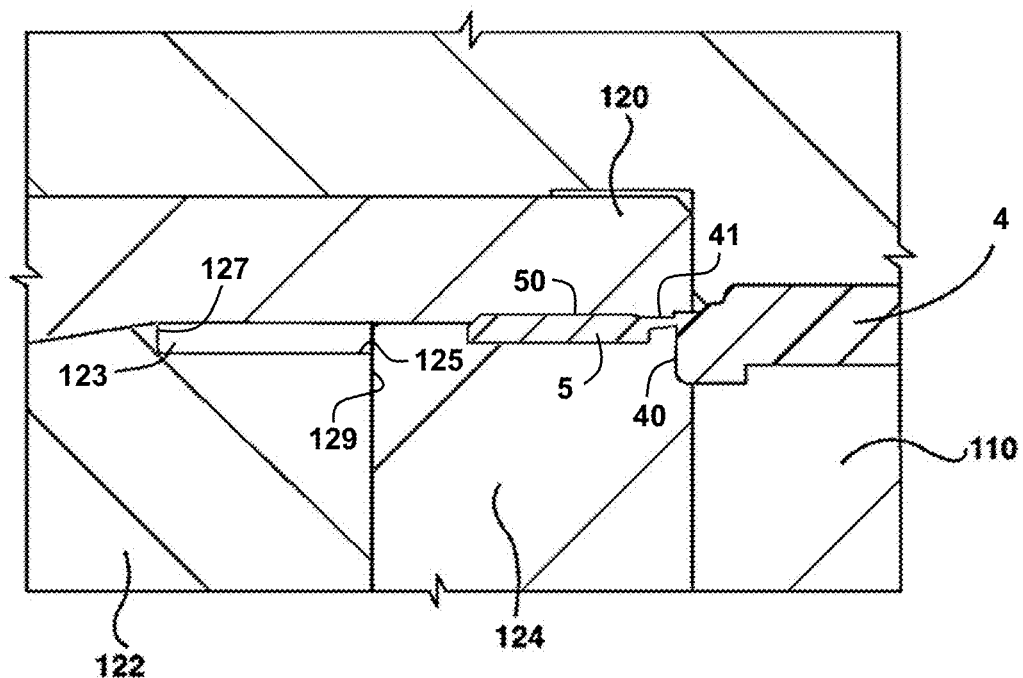
FIG. 4 depicts a portion of the mold stack of FIG. 3 in greater detail.
Figure 5:
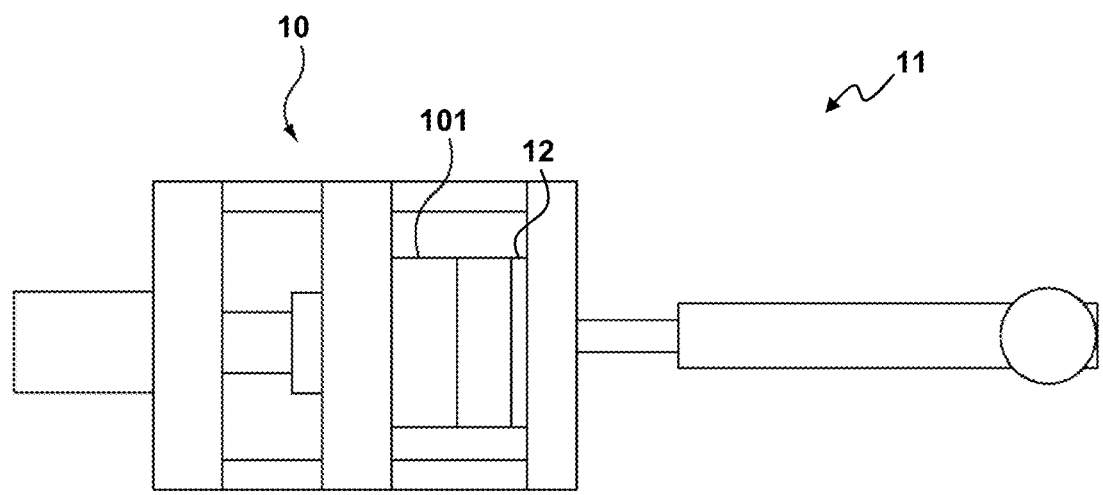
FIG. 5 depicts an injection molding system including a mold incorporating a plurality of mold stacks as shown in FIGS. 3 and 4.

Referring now to FIGS. 3 to 5, there is shown a portion of a mold stack 102, taken along operational axis thereof, for molding the closure 1 of FIGS. 1 and 2. The mold stack 102 can be part of a mold 101, shown in FIG. 5, that is positionable within a clamp 10 of an injection molding machine 11. It is noted that the implementation of the mold 101, the clamp 10 and the injection molding machine 11 can be typical to that of prior art implementations and, as such, will not be described here at any length. The mold 101 need not be an injection mold. It may instead be an injection-compression mold, a compression mold, a transfer-molding mold and the like (as well, as the associated machines).

The mold stack 102 includes a core assembly 104 and a cavity assembly 106. The cavity assembly 106 comprises a gate insert 108 and a cavity insert 110. The general purpose for the gate insert 108 is to receive, in use, a nozzle (not depicted) of a hot runner 12 and for providing a path for molten material into a molding cavity 112. The cavity insert 110 defines a portion of the molding cavity 112 and, more specifically, an outside wall of the top wall 3 and the cylindrical skirt 4 of the closure 1, which is defined within the molding cavity 112. The cavity insert 110 also includes cooling channels through which an appropriate coolant media (such as water and the like) can be circulated during appropriate portions of the molding cycle.

The core assembly 104 includes a first inner core 116, a second inner core 118, an outer core 120, a stripper sleeve 122 and a pair of split inserts 124. Since the general function of the components of the core assembly 104 is known to those skilled in the art, only a brief description thereof will be presented here.

The purpose of the first inner core 116 is to define an inner portion of the top wall 3 of the closure 1. In this example, the first inner core 116 includes a first inner core portion 126 and a second inner core portion 128. The first inner core portion 126 and the second inner core portion 128 can be made of different materials, such as materials with different thermal conductivity, materials with different wear resistance and the like. The first inner core portion 126 and the second inner core portion 128 can be made of different materials to improve heat dissipation between portions thereof. The first inner core portion 126 could, for example, be made of stainless steel (DIN: 1.4528) and the second inner core portion 128 could be made of AMPCOLOY 940. Other materials are also envisaged.

The first inner core 116 can be made up of more than two portions or could be a unitary structure. The first inner core 116 is configured, under motive of an actuator (not depicted), to move in an axial direction. The first inner core 116 includes an inner cooling channel (not separately numbered) through which an appropriate coolant media (such as water and the like) can be circulated during appropriate portions of the molding cycle.

The purpose of the second inner core 118 is to define a portion of the top wall 3 of the closure 1. The second inner core 118 also defines a portion of a plug seal (not separately numbered), which plug seal depends from the top wall 3 of the closure 1. The second inner core 118 is stationary in this example.

The purpose of the outer core 120 is to define (i) another portion of the plug seal and the top wall 3 of the closure 1 (including the centering ring thereof), (ii) an inner portion of the cylindrical skirt 4 of the closure 1 including the thread 60 and (iii) an innermost and bottommost portion of a tamper evidence band 5 of the closure 1. In this example, the outer core 120 includes a first outer core portion 130 and a second outer core portion 132. The first outer core portion 130 and the second outer core portion 132 can be made of different materials, such as materials with different thermal conductivity, materials with different wear resistance and the like. In some examples, the first outer core portion 130 and the second outer core portion 132 can be made of different materials to improve heat dissipation between portions thereof. The first outer core portion 130 may, but need not, be made of stainless steel (DIN: 1.2767) and the second outer core portion 132 can be made of AMPCOLOY 940. The outer core 120 may, but need not, be made up of more than two portions or be of unitary structure.

The first outer core portion 130 is configured to define the innermost and bottommost portion of the tamper evidence band 5 of the closure 1. As explained above, the tamper evidence band 5 has a substantially cylindrical inner surface 50, which is smooth, featureless and devoid of engaging features. As a result, demolding from the outer core 120, specifically the first outer core portion 130, is simpler and puts less strain on the bridges 41 and the tamper evidence band 5. As a result, these features can be thinner, saving even more weight. The first outer core portion 130 may also describe part of the inner portion of the cylindrical skirt 4, but this is not the case in this example.

The second outer core portion 132 is configured to define the portion of the plug seal, the inner surfaces of the skirt 4 and the aforementioned portion of the top wall 3 of the closure 1. The outer core 120 is configured, under motive of an actuator (not depicted) to move in an axial direction.

The split inserts 124 are configured to define part of the outer portion of the skirt 4 of the closure 1, including but not limited to a tamper evidence band 5 and bridges 41 connecting the tamper evidence band 5 to the remainder of the skirt 4 of the closure 1. The pair of split inserts 124 are configured, under motive of an actuator (not depicted) to move in a traverse direction.

The stripper sleeve 122 is configured to assist in stripping the closure 1 off the mold stack 102, as will be described in detail below. The stripper sleeve 122 is configured, under a motive of an actuator (not depicted) to move in an axial direction, i.e. left and right as viewed in FIG. 3. More specifically, the stripper sleeve 122 is configured to move between a "retracted configuration" depicted in FIG. 3 and an "extended configuration", which is not depicted, but which is generally located axially towards right, as viewed in FIG. 3.

FIG. 4 depicts a portion of the mold stack 102 in greater detail. The stripper sleeve 122 includes a pocket 123. The pocket 123 is defined by a first axial wall 125 and a second traverse wall 127. In use, during the part ejection function, the stripper sleeve 122 is extended, under the motive of an actuator (not depicted) towards the extended configuration, in which extended configuration the stripper sleeve 122 engages the bottom-most portion of the closure 1. More specifically, the pocket 123 engages the bottom-most portion of the tamper evidence band 5 of the closure 1.

Even more specifically, the second traverse wall 127 engages the underside of the bottom-most portion of the tamper evidence band 5 of the closure 1 and, effectively, pushes it, with further movement of the stripper sleeve 122. At the same time, the first axial wall 125 engages a side portion of the taper evident band 5 and provides a stopper (i.e. a physical stop) which delimits the extent of radial travel of the tamper evidence band 5, which radial travel occurs as the closure 1 is stripped off the mold stack 102 and, especially, as portions of the closure 1 clear portions of the outer core 120 (such as portions of the first outer core portion 130). For the avoidance of doubt, the term "radial travel" means travel in a direction that is traverse to the axis of the mold stack 102.

Whilst the first axial wall 125 and the second traverse wall 127 are inter-disposed at a 90 degree angle therebetween, this may be varied. As such, the first axial wall 125 and the second traverse wall 127 can be inter-disposed at a different angle therebetween.

In this example, the pocket 123 has a depth which isolates the tamper band 5 from an axially directed ejection force applied to the closure 1 to remove it from the core assembly 104. More specifically, the depth of the pocket is substantially the same as a combined axial height or length of the tamper evidence band 5 and bridges 41. As a result, a top surface 129 of the stripper sleeve 122, adjacent to the pocket 123, contacts part of the rim 40 of the cylindrical skirt 4 during ejection, thereby transferring the ejection force thereto.

Accordingly, the stripper sleeve 122 is movable to contact a closure 1 after the closure 1 has been molded or, in other words, the stripper sleeve 122 does not define any portion of the molding cavity 112 during molding of the closure 1. The stripper sleeve 122 includes a first surface (i.e. the first axial wall 125) and a second surface (i.e. the second traverse wall 127), which engage simultaneously, during stripping of the closure 1, a side surface and an underside of the closure 1 (and more specifically, the underside and the side portion of the bottom-most portion of the closure 1, i.e. the tamper evidence band 5 of the closure 1). At the same time, the top surface 129 of the stripper sleeve 122 contacts part of the rim 40 of the cylindrical skirt 4, thereby transferring the majority of the ejection force thereto and inhibiting damage or excessive deformation of the tamper evidence band 5 and the bridges 41.

In this example, the molding process starts with urging the mold stack 102 into a mold closed position, as is depicted in FIG. 3. The mold stack 102 is actuated into and maintained in the mold closed configuration by the clamp 10 of the injection molding machine 11 under sufficient clamp tonnage (i.e. tonnage sufficient to withstand injection pressure of the molding material). More specifically, the core assembly 104 and the cavity assembly 106 are urged in the mold closed configuration, whereby the molding cavity 112 is defined and is available for acceptance of the molding material.

Then, in the mold closed configuration, molding material is injected, under pressure, into the molding cavity 112 via an orifice (not separately numbered) in the gate insert 108. The molding material is then allowed to cool down and, typically, as the molding material solidifies and cools down it shrinks. As such, a packing function may be executed, whereby extra molding material is injected into the molding cavity 112 to compensate for the molding material shrinkage.

The molding material is allowed to cool down to a temperature whereby it is safe to eject the closure 1 without significant structural damage thereto. At this point, where the molding material has sufficiently cooled down and the closure 1 has sufficiently solidified for safe ejection thereof, the process of molded article ejection commences.

First, clamp tonnage is released. Next, a core plate (not depicted) accommodating the core assembly 104 is urged away from a cavity plate (not depicted) accommodating the cavity assembly 106 or vice versa, the cavity plate can be urged away from the core plate. Since the closure 1 tends to shrink as it cools down and due to the number of undercuts associated with the closure 1, the closure 1 tends to stay associated with the core assembly 104. Once the closure 1 has sufficiently cleared the portion of the molding cavity 112 associated with the cavity insert 110, the split inserts 124, under control of the appropriate actuator (not depicted) are urged transversely away from the outer core 120, thus releasing the tamper evidence band 5 of the closure 1.

Next, under the motive of the appropriate actuator (not depicted), the stripper sleeve 122 is actuated into the extended configuration, whereby the pocket 123 engages the bottom-most portion of the tamper evidence band 5 of the closure 1.

Next, the first inner core 116, the outer core 120 and the stripper sleeve 122 move in unison to effectively release the plug seal of the closure 1 from in-between the second inner core 118 and the outer core 120 (recalling that in such examples, the second inner core 118 is stationary).

Once the plug seal of the closure 1 is released, the outer core 120 becomes immobile (for example, by means of actuator stopping it or by means of a physical stop), and the first inner core 116 and the stripper sleeve 122 continue to move. The first inner core 116 and the stripper sleeve 122 may, but need not, continue to move in unison until the closure 1 is stripped off the first inner core 116. In other examples, the first inner core 116 can, at some point, become immobile (for example, by means of an actuator stopping it or by means of a physical stop), and the stripper sleeve 122 completing the stripping action.

Effectively, at this point, the closure 1 is released (or stripped off) the mold stack 102.

Figure 6:
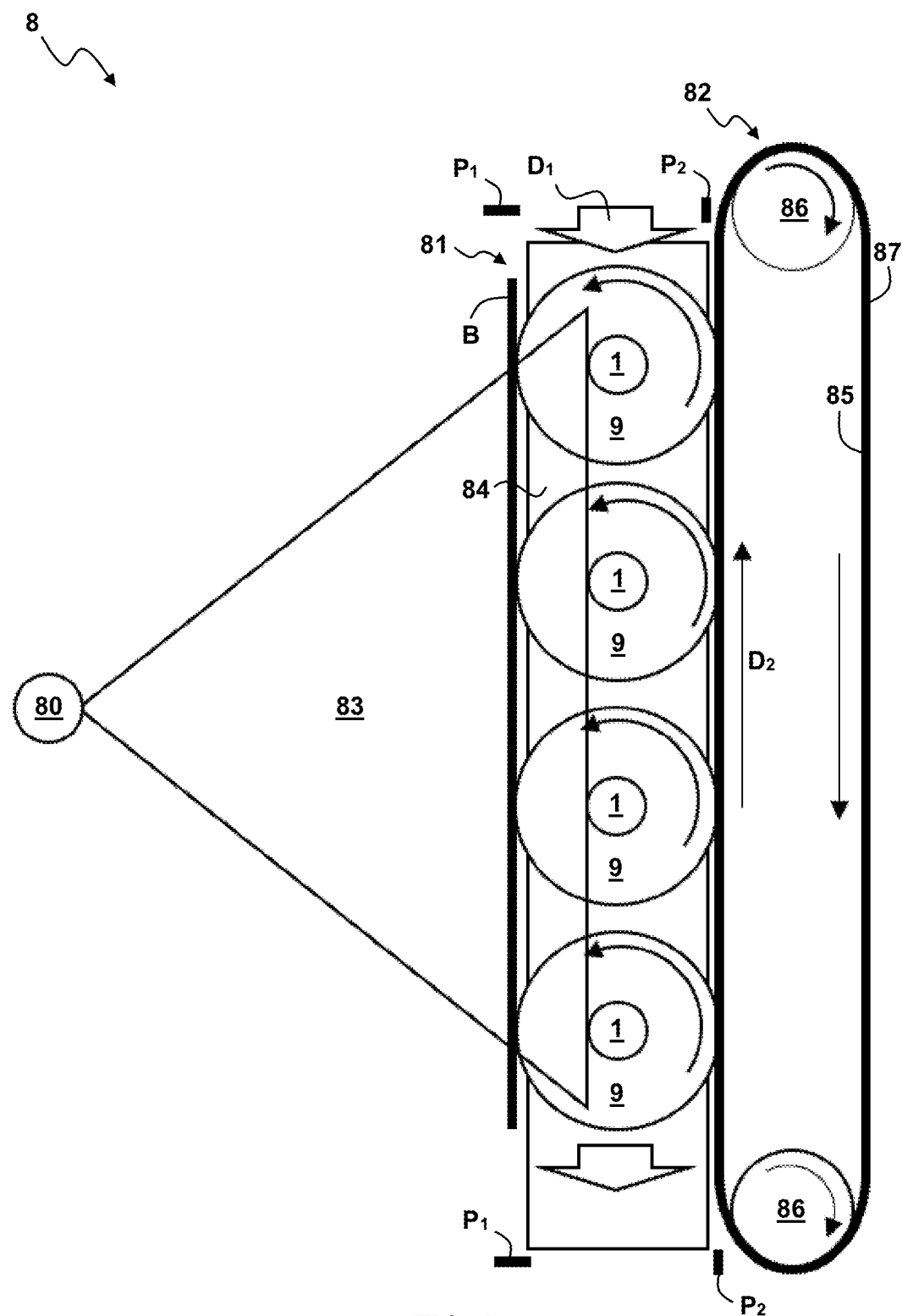
FIG. 6 depicts a schematic representation of a closure conditioning system according to a first example.

Referring now to FIG. 6, a closure conditioning system 8 is shown schematically as it engages the tamper evidence band 5 of each of a plurality of the closures 1 to a respective container 9. The system 8 includes a source of electromagnetic radiation, in the form of a laser emitter 80, and a conveying means, in the form of first and second conveyors 81, 82, for conveying and rotating the containers 9 in a single file through the system 8. The containers 9 in this example are substantially cylindrical.

The laser emitter 80 is operable to emit laser light, e.g., a planar laser beam 83, toward the tamper evidence bands 5 as they are conveyed by the conveyors 81, 82. The first conveyor 81 provides a moving horizontal surface 84, which may be provided by a belt or chain link arrangement, as is generally known in the art. The second conveyor 82 includes an endless belt 85, which extends between a pair of vertically oriented rollers 86 at least one of which is driven to cause the endless belt to move, thereby providing a moving vertical surface 87 that is substantially perpendicular to the moving horizontal surface 84 of the first conveyor 82.

A bumper B on the opposite side of the first conveyor 81 to the second conveyor 82 slidingly engages the containers 9 to enable them to rotate whilst maintaining their engagement with the second conveyor, as they move along the first conveyor 81. Of course, the bumper B may be replaced with a further conveyor moving in the same direction as the first conveyor 81 and at an appropriate to enable or encourage the containers 9 to rotate at the desired speed.

The conditioning system 8 also includes a photoelectric emitter $P_1$ and reflector $P_2$ both upstream and downstream of the conveyors 81, 82 for providing photoelectric barriers to detect the presence of containers 9 being conveyed therealong. These photoelectric barriers are used to selectively activate and deactivate the laser emitter 80 at appropriate times.

As the containers 9 are conveyed along the first conveyor 81 in a first direction $D_1$, their cylindrical sides contact the moving vertical surface 87 of the second conveyor 82, which travels in a second direction $D_2$, opposite the first direction. As a result, the containers 9 rotate as they move along the first conveyor 81, thereby irradiating at least part of the tamper evidence band 5 about its entire circumference as it travels through the system 8 along direction $D_1$.

As illustrated in FIGS. 7 and 8, the planar laser beam 83 is directed at a lower portion of the tamper evidence band 5 of the closure 1, adjacent its open end 51. The laser beam 83 is configured to irradiate the tamper evidence band 5 for approximately 0.5 seconds with a laser having a power of approximately 150 W. This causes the heated region to contract, which creates an internal lip 52, or undercut, having an internal diameter that is smaller than the outer diameter of the flange 20 of the container neck 2.

Without wishing to be bound by any particular theory, it is believed that the contraction of the heated region of the tamper evidence band 5 of the closure is due to the heat being applied differentially. More specifically, by directing such a laser beam 83 for such a period of time to the external surface of the tamper evidence band, that external surface is heated whilst the surface on the opposite, inner side of the tamper evidence band 5 remains at a much lower temperature. Without wishing to be bound by any particular theory, it is believed that this, differential temperature creates the 'curling' effect that generates the lip 52 shown in FIG. 9. It is also believed that this 'curling' effect is linked to the coefficient of thermal expansion of the material. As such, the material may be selected or modified to have a particular or desired coefficient of thermal expansion.

FIG. 9 shows the closure 1 installed on the neck 2 of the container 9. As shown, the neck 2 includes the tamper evidence flange 20, a support ledge 21 below the tamper evidence flange 20 and threads 22 above the tamper evidence flange 20, for engagement with the screw thread 60 of the closure 1. The internal lip 52 projects toward the container neck 2, below the tamper evidence flange 20.

In this example the system 8 is preferably configured to ensure that the internal lip 52 of the closure is formed, or reshaped, with a larger internal diameter than the outer diameter of the neck 2 between the flange 20 and the support ledge 21 beneath it, thereby allowing the tamper evidence band 5 of the closure 1 to rotate relative to the flange 20 of the container neck 2. This rotation may assist the removal of the closure 1 of FIGS. 1 and 2. However, it may be advantageous to configure the system 8 to cause the internal lip 52 to contract to the point of engaging the outer diameter of the neck 2 below the flange, preventing or inhibiting rotation of the closure. The foregoing approach of ensuring tamper evidence may be similarly applied to closures that do not need to rotate, for example snap on closures.

It is also envisaged that the tamper evidence band 5 of the closure 1 may, in some cases, be provided with cams or tabs, not shown, such as those that well known in the art. However, in contrast to a traditional package, i.e., container and molded closure, the cams and/or tabs of the closure are configured to preclude or minimize physical interaction with the complementary features, e.g., flange (also referred to as a "pilfer bead"), of the neck finish during initial application of the closure. It is only after capping with reshaping of the tamper evidence band, at least in part, that the cams and/or tabs positioned so as to interact/engage with the flange on the neck finish to secure the tamper evidence band on the neck finish. In contrast, in a traditional package, the cams and/or tabs of the closure are configured to physically interact, i.e., snap engage, with the complementary features, e.g., flange (or pilfer bead), of the neck finish with initial application of the closure.

Figure 10:
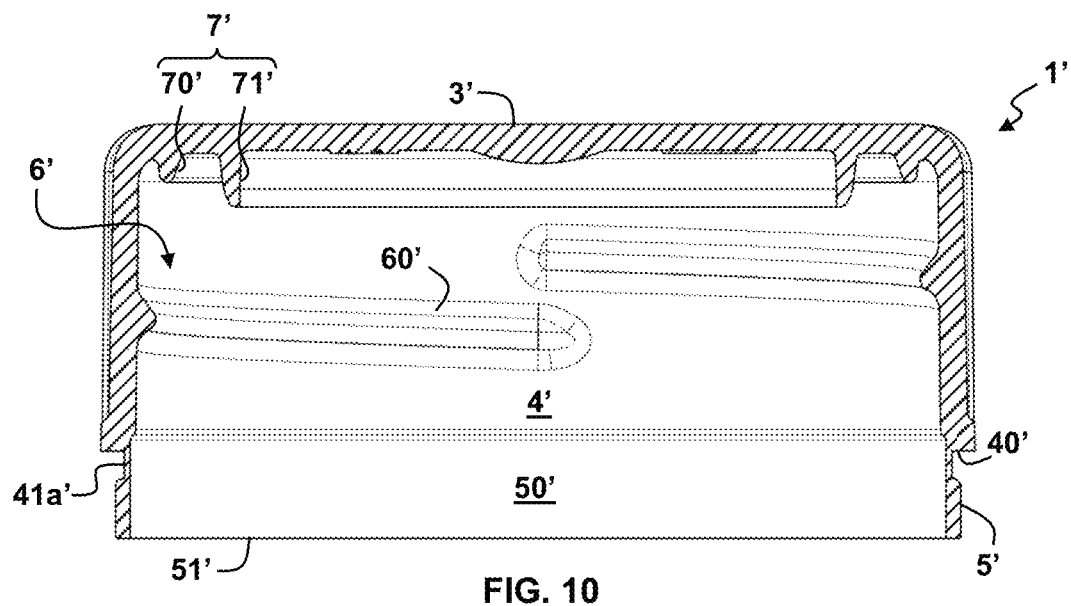
FIG. 10 depicts a cross-sectional view of a closure according to another example.

Turning now to FIG. 10, there is shown a closure 1' according to another example which is similar to the closure 1 described above, wherein like features are depicted with like references with the addition of a'. These features will therefore not be described further. The closure 1' according to this example is essentially identical to that of FIGS. 1 and 2 but differs therefrom in that it is molded with a continuous membrane 41a' joining the tamper evidence band 5' to the cylindrical skirt 4'. In this example, the outer surface of the membrane 41a' is recessed with respect to the outer surface of the tamper evidence band 5', such that the thickness of the membrane 41a' is reduced. This simplifies the mold stack 102 firstly because the features that define the bridges 41 can be omitted and secondly because the resulting molded connection between the tamper evidence band 5' and the cylindrical skirt 4' is stronger, making the closure 1' less fragile and thereby simplifying demolding.

A frangible connection between the cylindrical skirt 4' and the tamper evidence band 5' is formed by slitting, or otherwise cutting, the membrane 41a' post-molding. This may be done prior to its installation on the container neck 2, in which case the resulting, post-slit closure 1' would be substantially identical to the closure 1 of FIGS. 1 and 2.

Preferably, however, the closure 1' is slit after being installed on the container neck 2. Furthermore, the slitting may be performed either before or after the tamper evidence band 5' is irradiated by the flat laser beam 83 of the closure conditioning system 8 described above. In some advantageous examples, slitting is performed after.

It is also envisaged that the tamper evidence band 5' of the closure 1' may, in some cases, be provided with cams or tabs, not shown, such as those that well known in the art.

Figure 11:
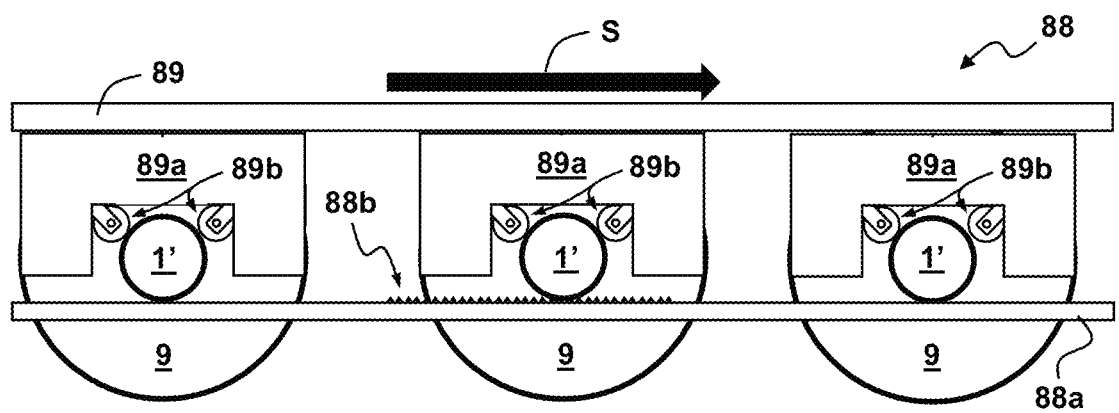
FIG. 11 depicts a schematic representation of a slitting machine for slitting the closure of FIG. 10.

FIG. 11 shows schematically a slitting machine 88 for slitting the closure 1' of FIG. 10. The slitting machine 88 includes a slitting bar 88a, which includes a serrated blade 88b for making perforations in the membrane 41a' of the closure 1'. The slitting machine 88 also includes a conveyor 89 with a plurality of carriages 89a movably mounted thereon. Each carriage 89a includes a pair of rollers 89b, which urge one of the closures 1' against the slitting bar 88a.

The carriages 89a may be configured to support the weight of the containers 9, for example by surrounding and supporting a lower surface of the support ledge 21, or the slitting machine 88 could include a linear conveyor, similar to the first conveyor 84 of the system 8 of FIG. 6, upon which the containers 9 may be supported.

In use, the carriages 89a travel along the conveyor 89 in direction S whilst urging the closures 1' against the slitting bar 88a. As a result, the closures 1' roll along the slitting bar 88a and the serrated blade 88b perforate the membrane 41a' to create a frangible line. In an alternative, not shown, the slitting bar may include an elongate blade with interruptions defined therealong to form uncut portions that define the bridges of the closure.

The slitting machine 88 may be incorporated into the closure conditioning system 8. As mentioned above, the slitting may be performed either before or after the tamper evidence band 5' is reshaped, e.g. through irradiation by the flat laser beam 83 of the system 8. As such, the slitting machine 88 may be upstream or downstream of the laser 80. In some examples, the slitting machine 88 may be incorporated in the same section of the closure conditioning system 8 as the laser 80.

For example, the carriages 89a may engage the cylindrical skirt 4' of the closure 1' on the same side as the laser 80, such that the flat laser beam 83 irradiates the tamper evidence band 5' beneath the carriage 89a while the slitting bar 88a simultaneously perforates the membrane 41a' to create the frangible line.

Other arrangements are also envisaged. In particular, the slitting machine 88 may incorporate a laser or laser cutter, for example instead of the arrangement described. In some examples, the laser emitter 80 of the system 8 may be operable to emit a laser capable of perforating or slitting the membrane 41a'.

It is also envisaged that the tamper evidence band 5' of the closure 1' may, in some cases, be provided with cams or tabs, since the additional rigidity provided by the membrane 41a' mitigates some of the issues associated with molding PET closures where the tamper evidence band is connected to the closure by bridges.

Figure 12:
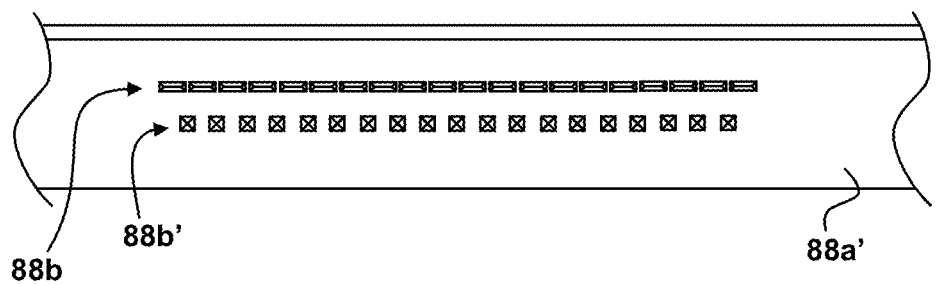
FIG. 12 depicts an alternative slitting bar for use in the slitting machine of FIG. 11.

FIG. 12 illustrates a slitting bar 88a' similar to the slitting bar 88a of the slitting machine 88 of FIG. 11, and can be used interchangeably therewith, in this example. The slitting bar 88a' according to this example differs from that of the slitting machine 88 of FIG. 11 in that it includes a plurality of spikes 88b' immediately below the serrated blade 88b. Each spike 88b' is aligned with an interruption in the serrated blade 88b, such that localised regions of the tamper evidence band 5' are perforated and/or deformed inwardly below each bridge formed by the serrated blade 88b.

This means of deforming the tamper evidence band 5' can be used instead of, or in addition to, applying heat to deform the tamper evidence band 5', as set out above. It is further envisaged that some other means of mechanical deformation may be used, such as an annular ledge that compresses the open end of the tamper evidence band 5' to curl it inward and upward to provide the lip 52 or any other suitable mechanical deformation mechanism.

In other examples, the slitting bar 88a, 88a' may be provided with a heating element, for example instead of the spikes 88b', thereby to reshape part of the closure 1' or tamper evidence band 5'.

Figure 13:
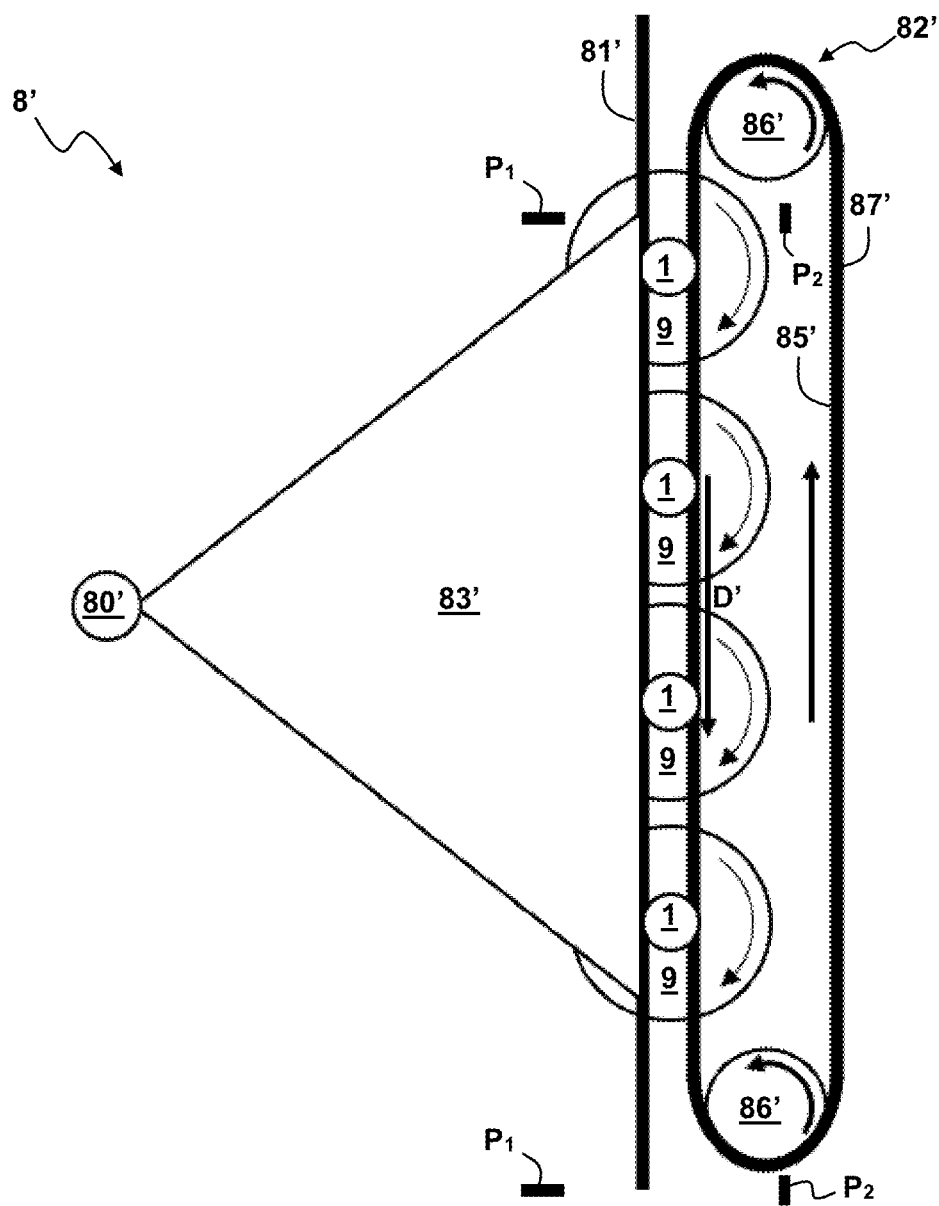
FIG. 13 depicts a schematic representation of a variation of the closure conditioning system of FIG. 6.

FIG. 13 illustrates a closure conditioning system 8' which is a variation of the system 8 of FIG. 6, wherein like references depict like features with the addition of a'. The closure conditioning system 8' differs from that of FIG. 6 in that the second conveyor 82' engages one side of the container neck 2, immediately below the flange 20, and the first conveyor 81 is replaced with a stationary part 81' that engages the opposite side of the container neck 2.

The second conveyor 82' operates in direction D', which also corresponds to the direction of travel of the containers 9. More specifically, the containers 9 travel along direction D' as they are rotated by the second conveyor 82' and roll along the stationary part 81', whilst being irradiated by the laser emitter 80' in a similar fashion to that which is described above. This approach can be advantageous, since location of the closure 1 is more precise, and is not susceptible to variations in the height of the containers 9.

Figure 14:
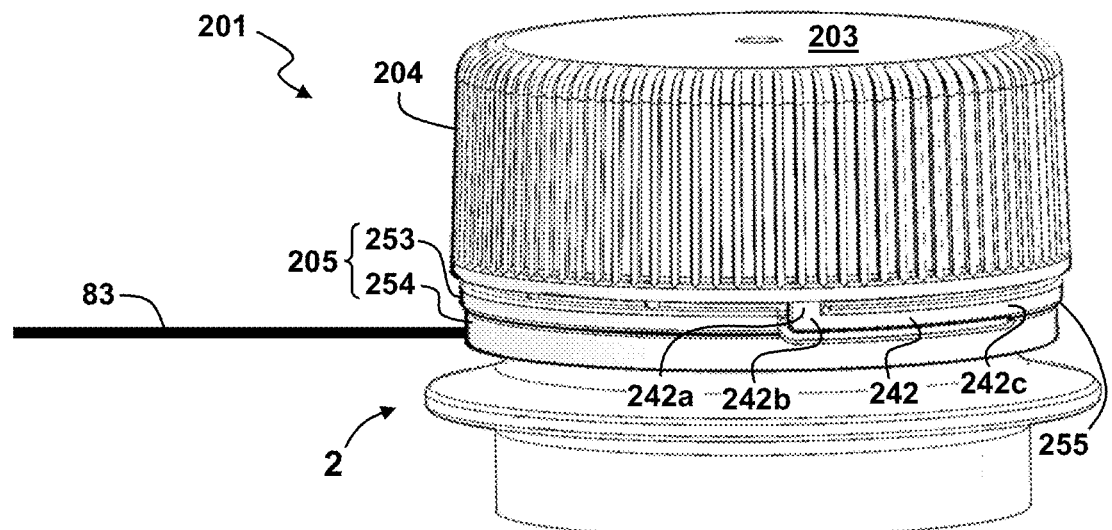
FIG. 14 depicts a closure according to another example installed on a container neck as it is conditioned by the closure conditioning system of FIG. 6.
Figure 15:
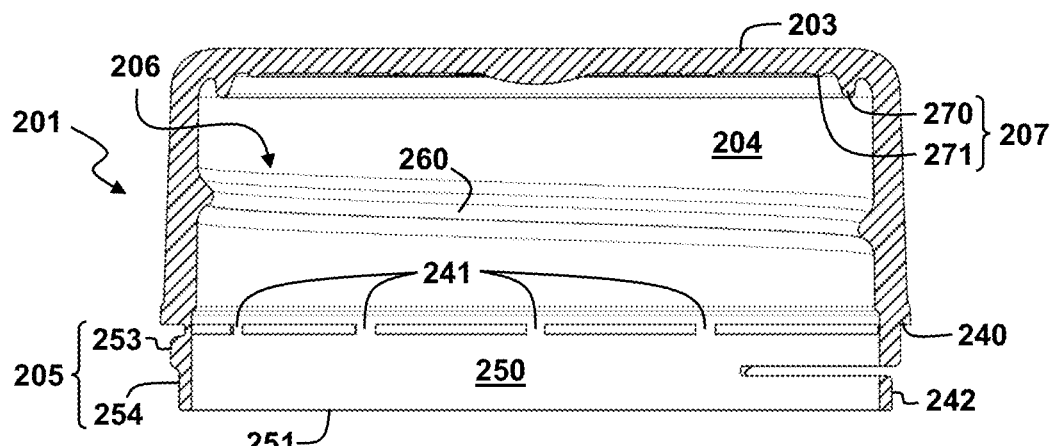
FIG. 15 depicts a cross-sectional view of the closure of FIG. 14.

Turning now to FIGS. 14 and 15, there is shown a closure 201 according to another example which is similar to the closure 1 described above, wherein like features are depicted with like references incremented by 200 and will therefore not be described further. The closure 201 according to this example differs from the closure 1 of FIGS. 1 and 2 in that it includes a tether 242 connecting the tamper evidence band 205 to the cylindrical skirt 204.

In this example, the tamper evidence band 205 includes a first annular portion 253 connected to the rim 240 of the cylindrical skirt 204 and a second annular portion 254 depending from the first annular portion 253. The second annular portion 254 has a radial wall thickness that is less than that of the first annular portion 253, thereby providing a radial step 255 on an external surface of the tamper evidence band 205.

By way of example, the radial wall thickness of the second annular portion 254 may, but need not, be 0.3 mm or less, since the first portion 253 imparts some rigidity to the tamper evidence band 205. It will be appreciated by those skilled in the art that the tamper evidence band 5 of the closure 1 of FIGS. 1 and 2 may also have a stepped radial wall thickness. This would also enable the radial thickness of the lowermost annular portion to be reduced, saving on material and reducing the requisite time for it to deform when irradiated by the closure conditioning system 8.

The tether 242 is described within the first annular portion 253, such that its radial thickness corresponds to that of the thicker, first annular portion 253. The tether 242 has a first end 242a connected to the lower rim of the cylindrical skirt 204, from which the tether 242 depends to a 90° elbow 242b, although this angle is not critical. The tether 242 extends from the elbow 242b circumferentially, along the tamper evidence band 205 and is connected thereto at a second end 242c. In this example, the bridges 241 frangibly connecting the tamper evidence band 205 to the cylindrical skirt 204 are interrupted by the tether 242, such that there is no frangible connection between the tether 242 and either the tamper evidence band 205 or the cylindrical skirt 204. However, it is envisaged that bridges 241 may be included, thereby to provide a frangible connection between the tether 242 and one or both of the tamper evidence band 205 and the cylindrical skirt 204.

As with the closure 1 of FIGS. 1 and 2, the planar laser beam 83 is directed at a lower portion of the tamper evidence band 205 of the closure 201, the second annular portion 254 in this case. As the second annular portion 254 is irradiated, the residual hoop stresses therewithin cause it to contract, creating an internal lip (not shown), similar to the lip 52 shown in FIG. 9. The internal lip (not shown) has an internal diameter that is smaller than the outer diameter of the flange 20 of the container neck 2 and a larger internal diameter than the outer diameter of the neck 2 below the flange 20, thereby to ensure that the closure 201 is able to rotate for unscrewing.

Figure 16:
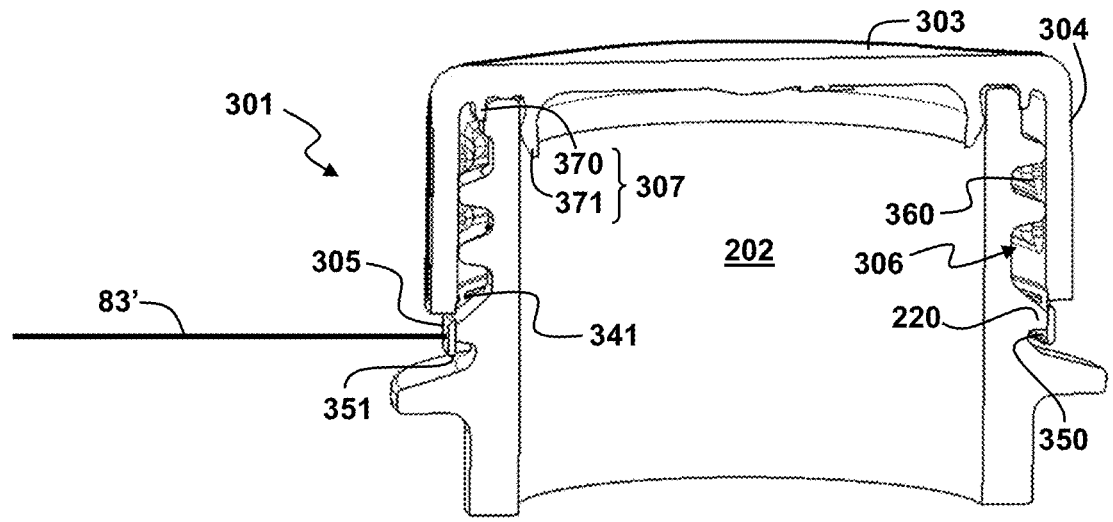
FIG. 16 depicts a closure according to another example installed on a container neck as it is conditioned by the closure conditioning system of one of FIG. 6 using a welding setup.

Turning now to FIG. 16, there is shown a closure 301 according to another example which is mounted to a container neck 202. The closure 301 according to this example is similar to the first closure 1 described above, wherein like features are depicted with like references incremented by 300 and will therefore not be described further. The closure 301 according to this example differs from the closure 1 of FIGS. 1 and 2 in that it is formed of HDPE and the tamper evidence band 305 is shorter and thinner. By way of example, the tamper evidence band 305 may be less than 0.3 mm.

In order to engage the tamper evidence band 305 with the container neck 202, the characteristics of the planar laser beam 83' emitted from the conditioning system 8 are modified as compared with that described above. In particular, the planar laser beam 83' is configured to weld the HDPE tamper evidence band 305 of the closure 301 to the flange 220 of the PET container neck 202. More specifically, the frequency of the laser beam 83' is selected to provide a wavelength that is readily absorbed by PET but not HDPE, thereby to allow the laser beam 83' to pass through the tamper evidence band 305 but to generate heat at the contact interface between the tamper evidence band 305 and the flange 220 of the container neck 202.

When the closure 301 is unscrewed for removal from the container neck 202, the bridges 341 frangibly connecting the tamper evidence band 305 to the cylindrical skirt 304 are broken to sever the tamper evidence band 305 from the cylindrical skirt 304. The tamper evidence band 305 remains on the flange 220 of the container neck 202, thereby to provide evidence of removal of the closure 301.

Figure 17:
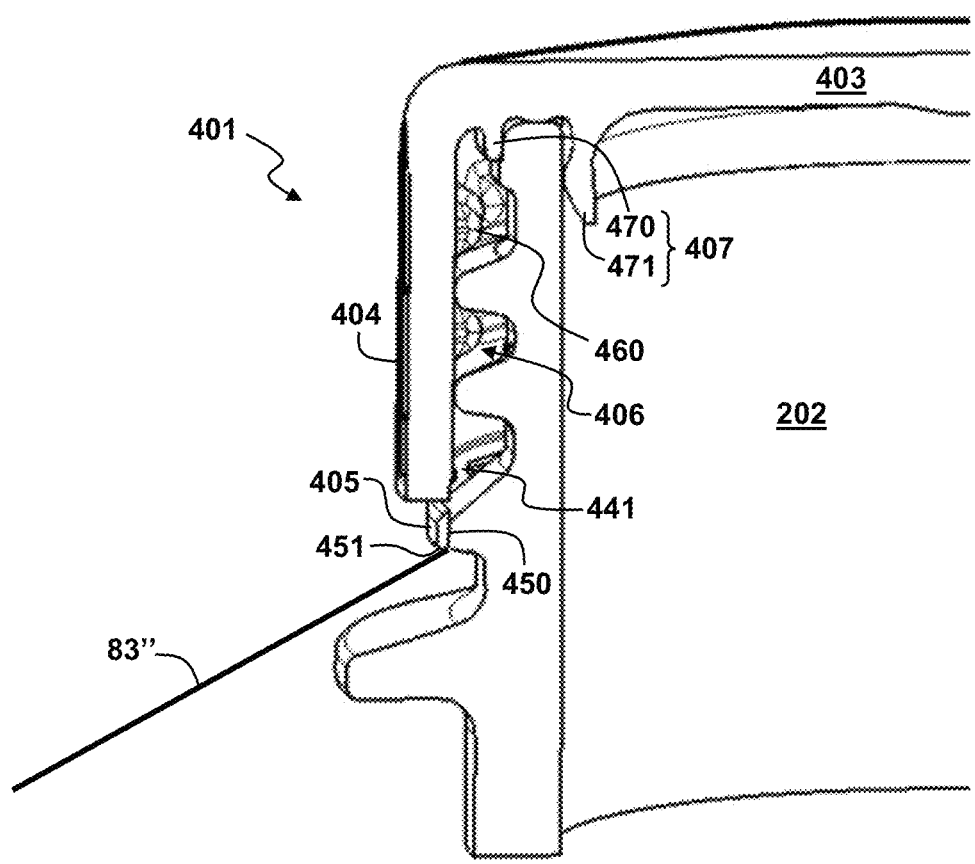
FIG. 17 depicts a closure according to another example installed on a container neck as it is conditioned by the closure conditioning system of one of FIG. 6 using a welding setup.

FIG. 17 shows a closure 401 according to another example which is similar to the closure 301 of the immediately preceding example, wherein like features are depicted with like references incremented by 100 and will therefore not be described further. The closure 401 according to this example differs from the closure 301 of FIG. 16 in that it is formed of PET.

In order to weld the tamper evidence band 405 with the container neck 202, the angle of the planar laser beam 83" emitted from the conditioning system 8 is modified such that it is directed to the contact interface between the PET tamper evidence band 405 of the closure 401 and the flange 220 of the container neck 202, thereby welding the tamper evidence band 405 to the flange 220.

Figure 18:
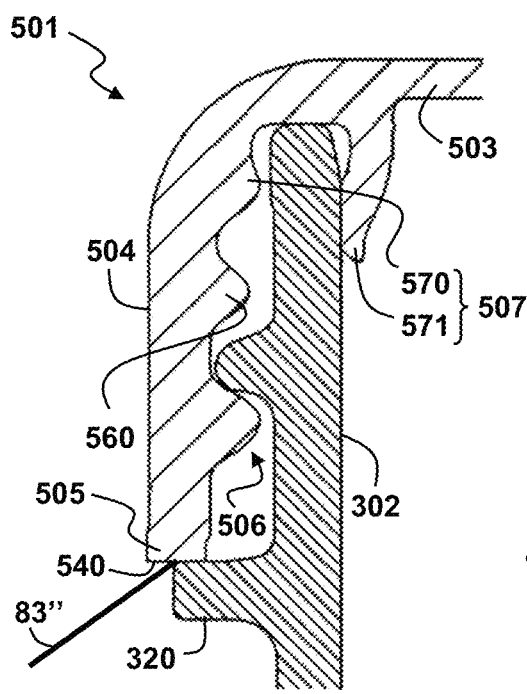
FIG. 18 depicts a closure according to another example installed on a container neck as it is conditioned by the closure conditioning system of FIG. 6 using a welding setup.

FIG. 18 shows a closure 501 according to another example which is similar to the closure 401 of the immediately preceding example, wherein like features are depicted with like references incremented by 100 and will therefore not be described further. The closure 501 according to this example differs from the closure 401 of FIG. 17 in that the tamper evidence band 405 is omitted.

Instead, the planar laser beam 83" emitted from the conditioning system 8 is directed to the contact interface between the lower rim 540 of the cylindrical skirt 504 and the flange 320 of the container neck 302. In this example, the rim 540 of the cylindrical skirt 504 projects beyond the flange 320 of the container neck 302, and the planar laser beam 83" is angled to more accurately impinge upon the contact interface therebetween.

The resulting weld between the cylindrical skirt 504 and the flange 320 creates a frangible connection between the flange 320 and the closure 501. When the closure 501 is unscrewed for removal from the container neck 302, the weld retains a small portion 505 of the cylindrical skirt 504 to the flange 320. The presence of this small portion 505 of the cylindrical skirt 504 remaining on the flange 320 provides evidence of removal of the closure 501.

It is also envisaged that a lower portion of the cylindrical skirt 504 of this closure 501 may be slit, for example using the slitting machine 88, to provide a tamper evidence band before or, preferably after, the lower rim 540 is welded to the flange 320. However, this need not be the case.

Figure 19:
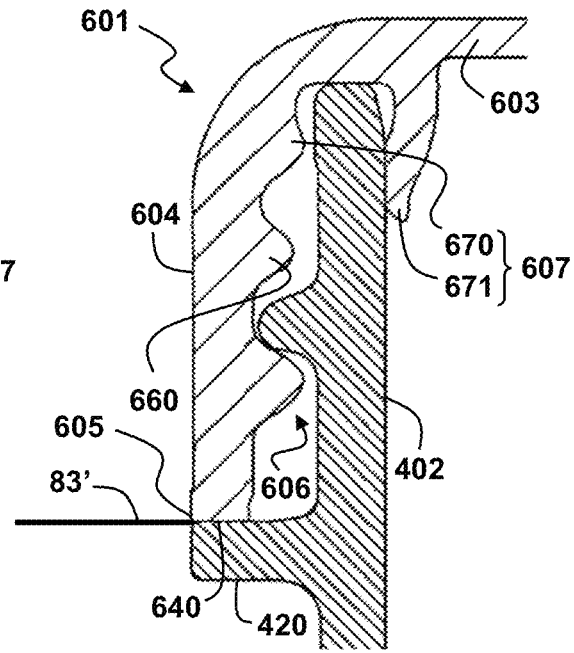
FIG. 19 depicts a closure according to another example installed on a container neck as it is conditioned by the closure conditioning system of FIG. 6 using a welding setup.

FIG. 19 shows a closure 601 according to another example which is similar to the closure 501 of the immediately preceding example, wherein like features are depicted with like references incremented by 100 and will therefore not be described further. The closure 601 according to this example differs from the closure 501 of FIG. 18 in that the diameter of the flange 420 of the container neck 402 is substantially the same as that of the lower rim 640 of the closure 601.

This arrangement facilitates the use of a planar laser beam 83' emitted from the conditioning system 8 which is perpendicular to the axis of the closure 601 and container neck 420, similar to that used for the closure 301 of FIG. 16. The planar laser beam 83' is directed to the contact interface between the lower rim 640 of the cylindrical skirt 604 and the flange 420 of the container neck 402.

As with the closure 501 of FIG. 18, the resulting weld between the cylindrical skirt 604 and the flange 420 creates a frangible connection between the flange 420 and the closure 601. When the closure 601 is unscrewed for removal from the container neck 402, the weld retains a small portion 605 of the cylindrical skirt 604 to the flange 420. The presence of this small portion 605 of the cylindrical skirt 604 remaining on the flange 420 provides evidence of removal of the closure 601.

Again, it is envisaged that a lower portion of the cylindrical skirt 604 of this closure 601 may be slit, such as using the slitting machine 88 of FIG. 11, to provide a tamper evidence band before or, preferably after, the lower rim 640 is welded to the flange 420.

Figure 20:
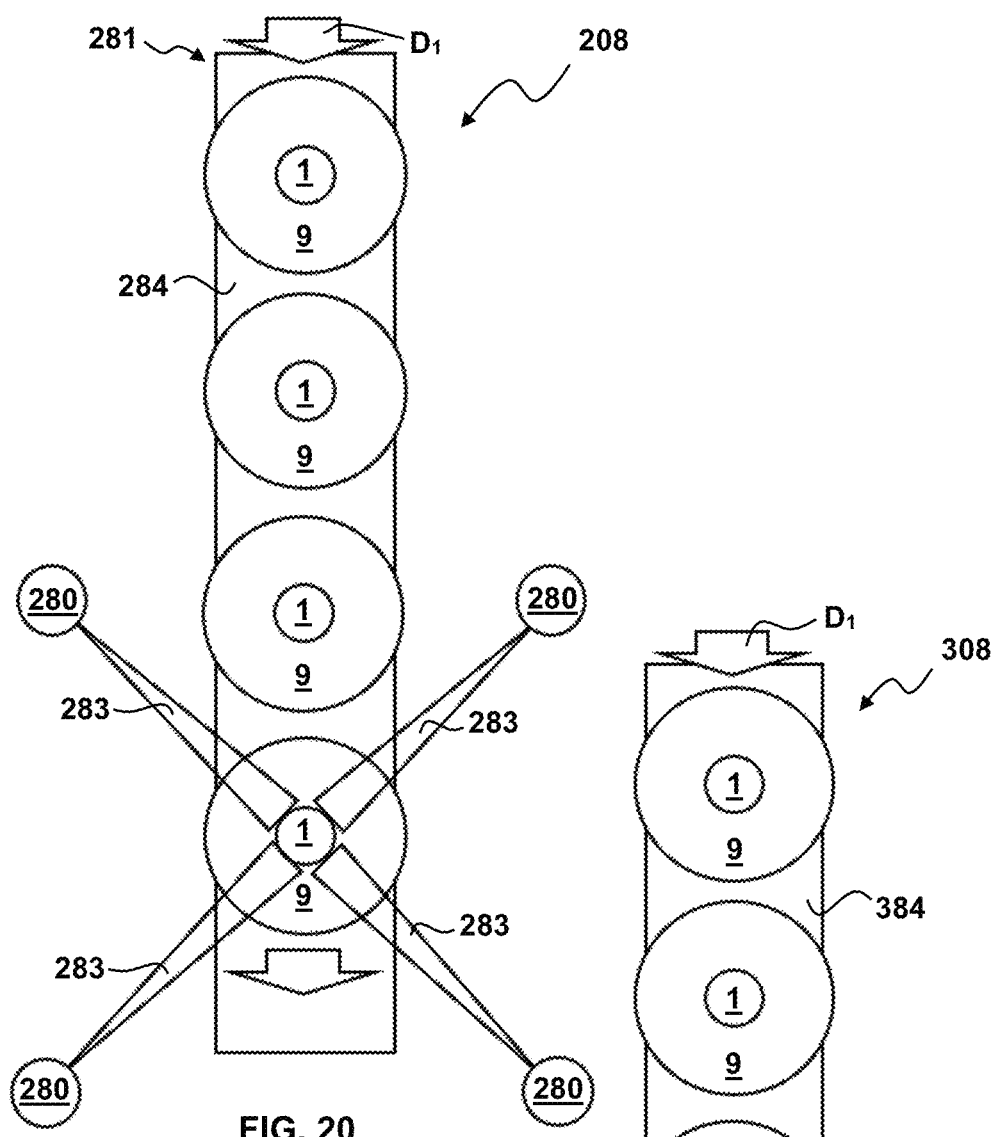
FIG. 20 depicts a schematic representation of a closure conditioning system according to another example.

Referring now to FIG. 20, there is shown schematically an alternative closure conditioning system 208 which is similar to the system 8 of FIG. 6, wherein like features are depicted with like references incremented by 200 and will therefore not be described further. The system 208 according to this example differs from that of the previous system 8 in that the second conveyor 82 is omitted and four sources of electromagnetic radiation, in the form of laser emitters 280, are included. For simplicity, the containers 9 are shown fitted with the closure 1 of FIGS. 1 and 2, but it will be appreciated that the system 208 may be used with any of the closures 1, 201, 301, 401, 501, 601 described above.

The laser emitters 280 are all directed to, and distributed evenly about, one of the closures 1 on one of the containers 9 conveyed by only the first conveyor 281 in a single file through the system 208. This irradiates substantially the entire circumference of the tamper evidence band 5 of the closure 1 simultaneously, without the need to rotate the containers 9, as in the system 8 of FIG. 6. The skilled person will appreciate that some variation to the heat applied across each of four quadrants of the tamper evidence band 5 will vary and, as such, the lip 52 may be interrupted or its radial depth may vary.

However, the four regions of the tamper evidence band 5 aligned directly with the laser emitters 280 will provide four lip segments 52 effective to retain the tamper evidence band 5 on the container neck 2. Similarly, the closures 301, 401, 501, 601 which are welded to the flange 220, 320, 420 will be welded in four regions, which the skilled person will appreciate will also be effective to perform the aforementioned tamper evidence functions.

Figure 21:
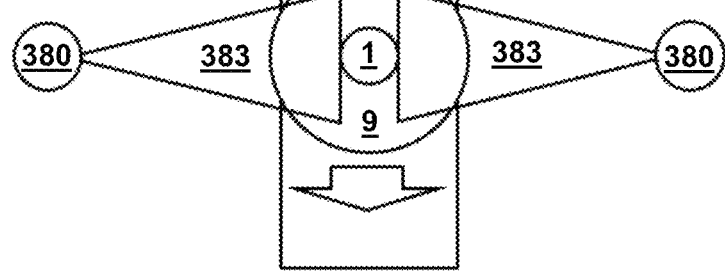
FIG. 21 depicts a schematic representation of a closure conditioning system according to another example.

Referring now to FIG. 21, there is shown schematically an alternative closure conditioning system 308 which is similar to the system 208 described immediately above, wherein like features are depicted with like references incremented by 100 and will therefore not be described further. The system 308 according to this example differs from that of the previous system 208 in that it includes two laser emitters 380 instead of four, which are on opposite sides of one of the closures 1.

As such, the heat will be applied across each of two sides of the tamper evidence band 5 and will vary as described above in relation to the quadrants. The lip 52 will therefore be interrupted, and its radial depth will vary. However, the two regions of the tamper evidence band 5 aligned directly with the laser emitters 280 will provide opposed lip segments 52, which are effective to retain the tamper evidence band 5 on the container neck 2. Similarly, the closures 301, 401, 501, 601 which are welded to the flange 220, 320, 420 will be welded in two regions, which the skilled person will appreciate will also be effective to perform the aforementioned tamper evidence functions.

Figure 22:
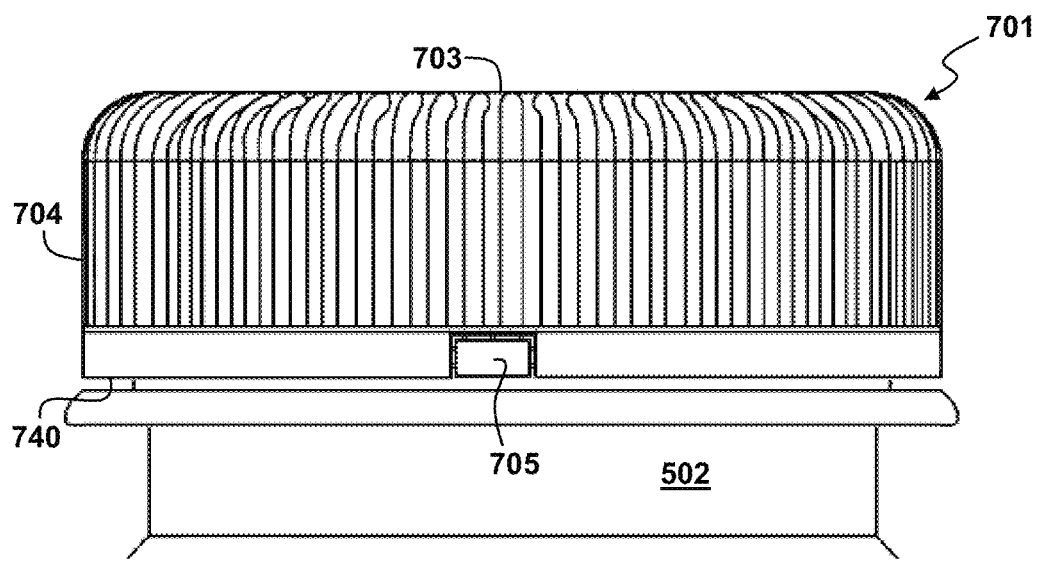
FIG. 22 depicts a closure according to another example installed on a container neck.
Figure 23:
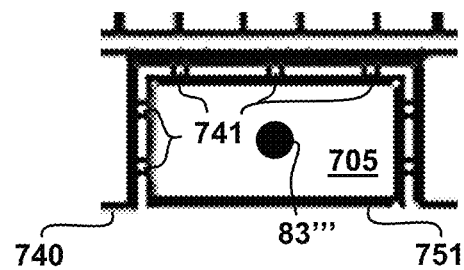
FIG. 23 is an enlarged view of the tamper evidence feature of the closure of FIG. 22.

Turning now to FIGS. 22 and 23, there is shown a closure 701 according to another example which is similar to the closure 301 of FIG. 16, wherein like features are depicted with like references incremented by 400 and will therefore not be described further. The closure 701 according to this example is also formed of HDPE but differs from the closure 301 of FIG. 16 in that it includes a tamper evidence panel 705 instead of the tamper evidence band 305.

In this example, the tamper evidence panel 705 has a bottom edge 751 that describes part of the rim 740 and is frangibly connected at three of its sides to a surrounding portion of the cylindrical skirt 704 by a plurality of bridges 741. The tamper evidence panel 705 has a radial wall thickness that is less than that of a surrounding portion of the cylindrical skirt 704. By way of example, the radial wall thickness of the tamper evidence panel may, but need not, be 0.3 mm or less and the radial wall thickness of the cylindrical skirt may, but need not, be 0.5 mm or more.

In order to engage the tamper evidence panel 705 with the container neck 502, the planar laser beam 83' emitted from the conditioning system 8 must be modified to provide a focused laser beam 83''' so as to avoid irradiating the surrounding portion of the cylindrical skirt 704. The focused laser beam 83''' is configured to weld the tamper evidence panel 705 to the container neck 502.

When the closure 701 is unscrewed for removal from the container neck 502, the bridges 741 frangibly connecting the tamper evidence panel 705 to the cylindrical skirt 304 are broken to sever the tamper evidence panel 705 from the cylindrical skirt 704. The tamper evidence panel 705 remains on the flange (not shown) of the container neck 502, thereby to provide evidence of removal of the closure 701.

Figure 24:
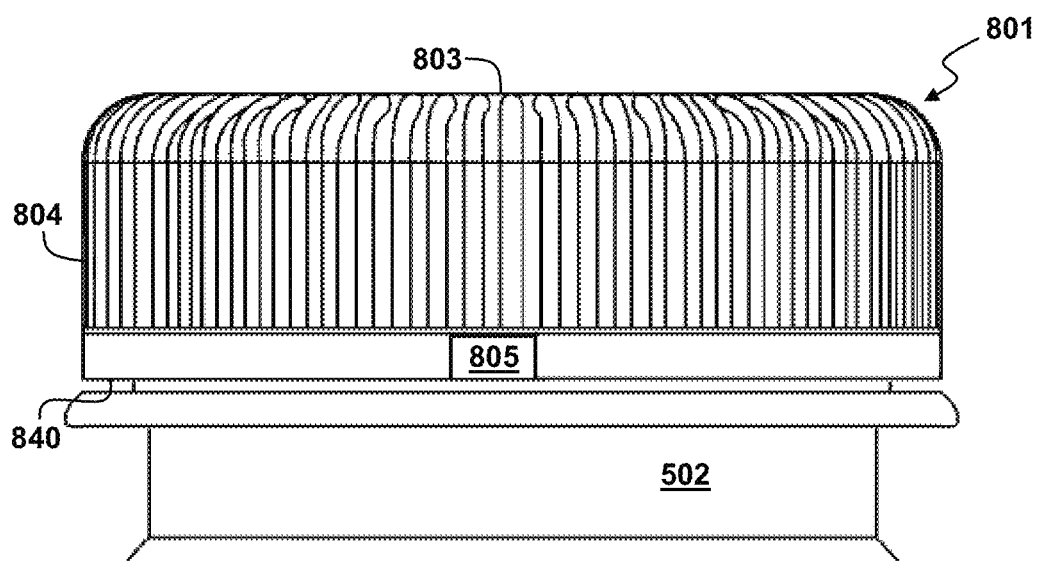
FIG. 24 depicts a closure according to another example installed on a container neck.

FIG. 24 shows a closure 801 according to another example which is similar to the closure 701 of FIGS. 22 and 23, wherein like features are depicted with like references incremented by 100 and will therefore not be described further. The closure 801 according to this example is also formed of HDPE but differs from the closure 701 of FIGS. 22 and 23 in that the tamper evidence panel 805 is joined directly to the surrounding portion of the cylindrical skirt 804.

It is preferable that the radial wall thickness of the tamper evidence panel 805 in this example is even less than that of the previous example, since the panel 805 itself is severed on removal of the closure 801 from the container neck 502. By way of example, the radial wall thickness of the tamper evidence panel may, but need not, be 0.2 mm or less and the radial wall thickness of the cylindrical skirt may, but need not, be 0.5 mm or more. As in the previous example, a focused laser beam 83''' is configured to weld the tamper evidence panel 805 to the container neck 502.

Figure 25:
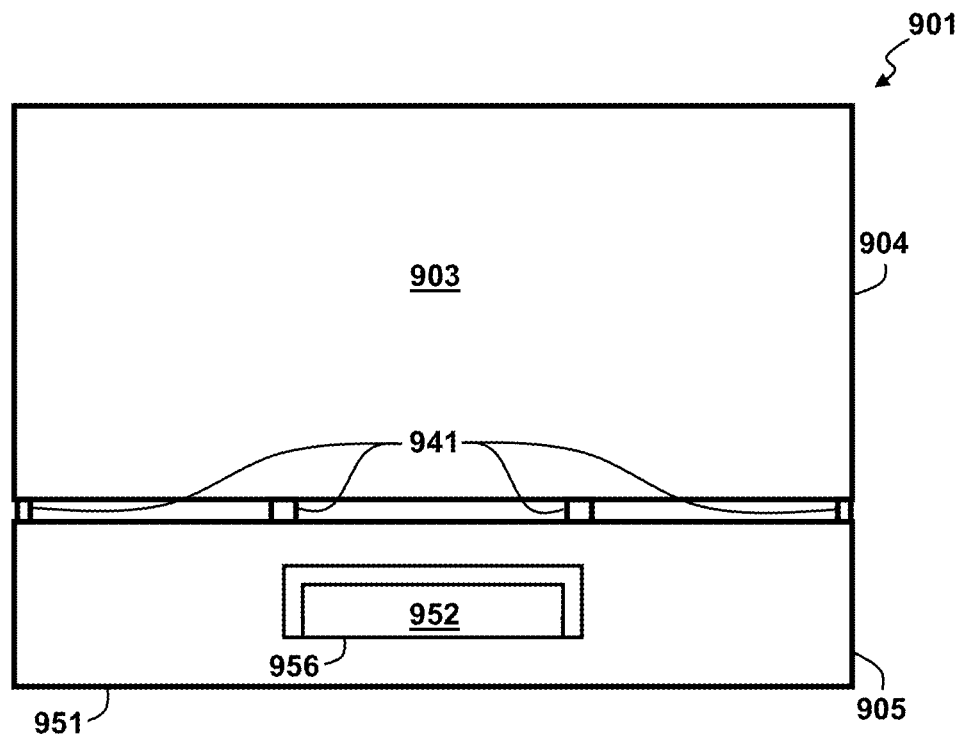
FIG. 25 depicts a side view of a closure according to another example.
Figure 26:
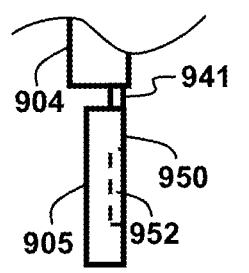
FIG. 26 depicts a partial section view of a lower portion of the cylindrical skirt and tamper evidence band of the closure of FIG. 25.
Figure 27:
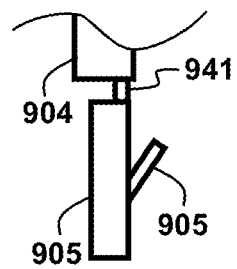
FIG. 27 is a similar view to that of FIG. 26 with the tamper evidence tab deformed inwardly.

FIGS. 25 and 26 show a closure 901 according to another example which is similar to the closure 1 of FIGS. 1 and 2, wherein like features are depicted with like references incremented by 900 and will therefore not be described further. The closure 901 according to this example differs from the closure 1 of FIGS. 1 and 2 in that it includes a series of tabs 952 included, described or defined in the tamper evidence band 905 and spaced about its periphery. Each tab 952 is connected to the tamper evidence band 905 by a hinge 956. The other three sides describing the tab 952 are not connected to the tamper evidence band 905, enabling the tab 952 to pivot about the hinge 956. The inner surface of each tab 952 is contiguous with the surrounding inner surface of the tamper evidence band 905, such that they together provide a substantially cylindrical inner surface 950, which is smooth, featureless and devoid of engaging features.

The thickness of the tab 952 is substantially less than the thickness of the tamper evidence band, approximately half in this example. As a result, when heat is applied to the tamper evidence band 905, the tab 952 is susceptible to deform inwardly before the surrounding portion of the tamper evidence band 905. This enables the closure conditioning systems 8, 8' of FIGS. 6 and 13 to be used with this closure 901. However, it is also possible to use the closure conditioning systems 208, 308 of FIGS. 20 and 21, with the laser emitters 280, 380 directed to the tabs 952.

Irradiating the tabs 952 causes them to pivot inwardly about their hinges 956, for engaging the flange 220 in a similar manner to the internal lip 52 of the closure 1 of FIGS. 1 and 2. In this way, a series of tabs 952 provide a discontinuous lip that provides a similar function to the internal lip 52 of the closure 1 of FIGS. 1 and 2. The provision of tabs 952 can also reduce the irradiation time required to engage the closure 901 with the container neck 2. Of course, any combination of features suited to provide a predetermined deformation are envisaged, for example the tamper evidence band 905 can be stepped, such that it has a thinner portion that also deforms with the tabs 952.

FIGS. 28 and 29 show rollers 480 of a closure conditioning system 408 according to another example, in operation and as they reshape the closure 1 of FIGS. 1 and 2 on the neck 2 of the container 9. Each of the rollers 480 includes an annular flange 483 that contacts the tamper evidence band 5 to deform it inwardly, thereby to rotatably engage the flange 20 of the container neck.

In some examples, the rollers 480 are heated, thereby to deform the lower portion of the tamper evidence band 5 of the closure 1 in a similar manner to that which is described above. However, in other examples, the rollers 480 may be used to mechanically deform a lower portion of the tamper evidence band 5, which may be preheated, to provide the aforementioned lip 52.

FIGS. 30 and 31 show a wire 580 of a closure conditioning system 508 according to another example, in operation and as it reshapes the closure 1 of FIGS. 1 and 2 on the neck 2 of the container 9. In this example, the wire 580 contacts the tamper evidence band 5 as the closure 1 and container 9 roll along the wire 580.

As with the rollers 480, the wire 580 may be heated to deform the lower portion of the tamper evidence band 5 of the closure 1 in a similar manner to that which is described above, but can alternatively be unheated and simply mechanically deform a lower portion of the tamper evidence band 5 to provide the aforementioned lip 52.

Figure 32:
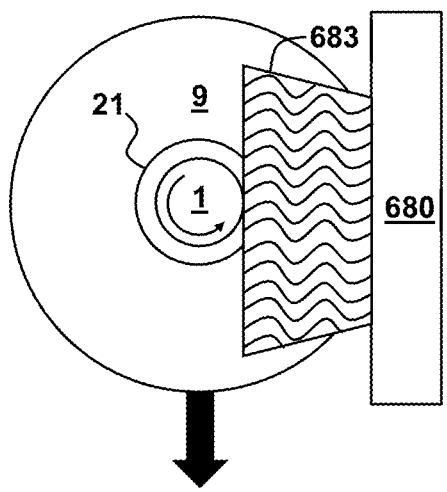
FIG. 32 depicts a schematic top view of an infrared emitter of a closure conditioning system according to another example, in operation.
Figure 33:
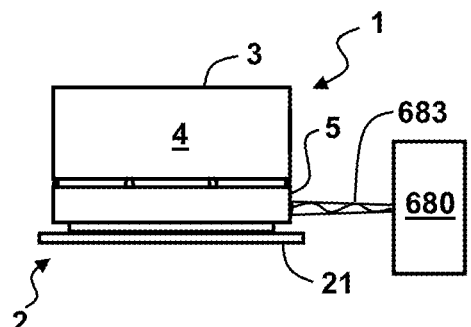
FIG. 33 depicts a schematic side view of the arrangement of FIG. 32, with the body of the container omitted.

FIGS. 32 and 33 show an infrared emitter 680 of a closure conditioning system 608 according to another example, in operation and as it reshapes the closure 1 of FIGS. 1 and 2 on the neck 2 of the container 9. The infrared emitter 680 emits a flat infrared beam 683, which irradiates a lower portion of the tamper evidence band 5 in a similar manner to the laser beam 83 described above.

Whilst not shown, the closure conditioning system 608 also includes a conveying mechanism similar those shown in FIGS. 6 and 13, which induces rotation of the closure 1 and container 9 as the tamper evidence band 5 is irradiated by the infrared beam 683.

Figure 34:
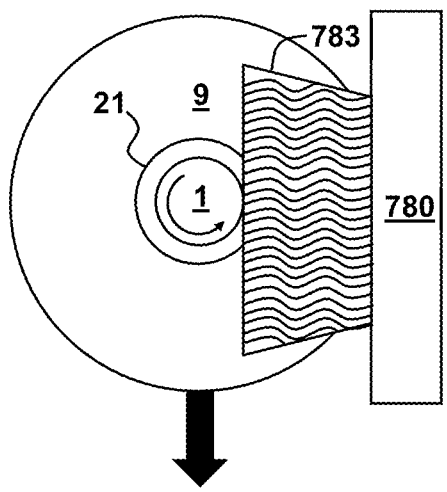
FIG. 34 depicts a schematic top view of a microwave emitter of a closure conditioning system according to another example, in operation.
Figure 35:
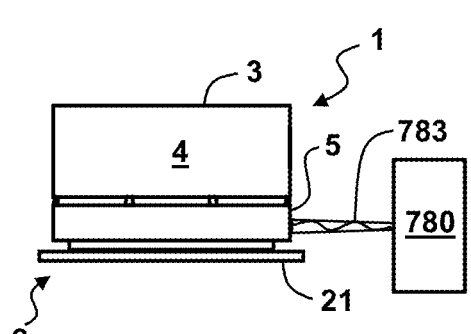
FIG. 35 depicts a schematic side view of the arrangement of FIG. 34, with the body of the container omitted.
Figure 36:
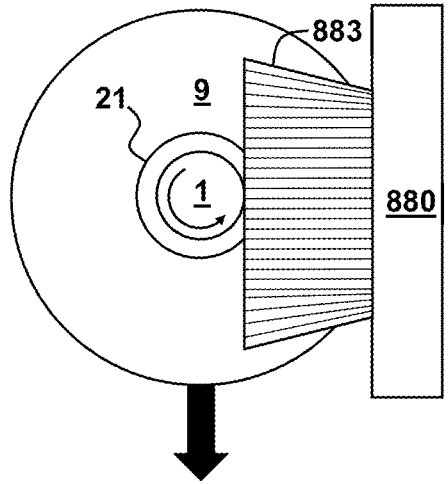
FIG. 36 depicts a schematic top view of an air knife of a closure conditioning system according to another example, in operation.
Figure 37:
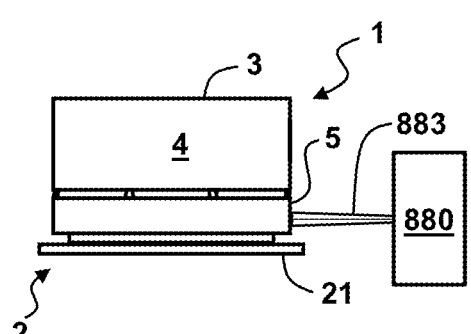
FIG. 37 depicts a schematic side view of the arrangement of FIG. 36, with the body of the container omitted.

FIGS. 34 and 35 show a microwave emitter 780 of a closure conditioning system 708 according to yet another example, in operation and as it reshapes the closure 1 of FIGS. 1 and 2 on the neck 2 of the container 9. The microwave emitter 780 emits a flat microwave beam 783, which irradiates a lower portion of the tamper evidence band 5 in a similar manner to the laser beam 83 and infrared beam 683 described above. The closure conditioning system 708 also includes a conveying mechanism that induces rotation of the closure 1 and container 9 as the tamper evidence band 5 is irradiated by the microwave beam 783, FIGS. 36 and 37 show an air knife 880 of a closure conditioning system 808 according to yet another example, in operation and as it reshapes the closure 1 of FIGS. 1 and 2 on the neck 2 of the container 9. The air knife 880 emits a flat jet 883 of air, which impinges on a lower portion of the tamper evidence band 5. As with the closure conditioning systems 608, 708 of FIGS. 32 to 36, the closure conditioning system 808 according to this example also includes a conveying mechanism that induces rotation of the closure 1 and container 9 as the tamper evidence band 5 is irradiated by the microwave beam 783.

Preferably, the flat jet of air 883 is heated before exiting the air knife 880, thereby to deform the lower portion of the tamper evidence band 5 of the closure 1 in a similar manner to that which is described above. However, it is also envisaged that the air could be at room temperature and that the air jet 883 is provided at a velocity that mechanically deforms a lower portion of the tamper evidence band 5 to provide the aforementioned lip 52.

Figure 38:
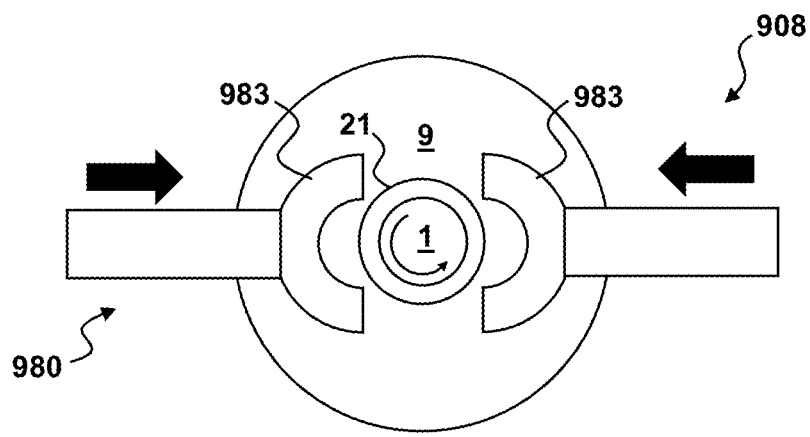
FIG. 38 depicts a schematic top view of an ultrasonic device of a closure conditioning system according to another example, in operation.

FIG. 38 shows an ultrasonic device 980 of a closure conditioning system 908 according to yet another example, shown immediately before it reshapes the closure 1 of FIGS. 1 and 2 on the neck 2 of a container 9. The ultrasonic device 980 includes a pair of opposed ultrasound emitters 983 which are brought into contact with the tamper evidence band 5 and emit ultrasonic waves to heat the tamper evidence band 5 such that it deforms inwardly to engage with the neck 2.

Figure 39:
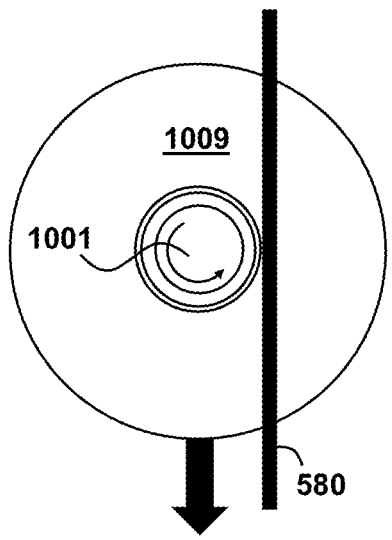
FIG. 39 depicts a schematic top view of the wire of FIG. 30 reshaping another closure and container neck combination.
Figure 40:
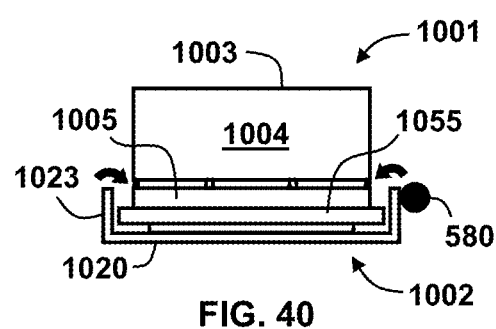
FIG. 40 depicts a schematic side view of the arrangement of FIG. 39, with the body of the container omitted.

FIGS. 39 and 40 show a closure 1001 according to another example, which is similar to the closure 1 of FIGS. 1 and 2, wherein like features are depicted with like references incremented by 1000 and will therefore not be described further. This closure 1001 differs from the closure 1 of FIGS. 1 and 2 in that the tamper evidence band 1005 includes an engaging flange 1055 projecting outwardly.

The closure 1001 is configured to be installed on the neck 1002 of a container 1009 according to another example. The container 1009 includes a flange 1020 having an upstanding annular wall 1023 (alternatively radially extending) about its periphery, which surrounds the engaging flange 1055 of the tamper evidence band 1005. With the closure 1001 installed on the neck 1002, the wire 580 of the closure conditioning system 508 of FIGS. 30 and 31 can be used to deform the annular wall 1023 inwardly, in a similar manner to the way it causes the tamper evidence band 5 of the closure 1.

Inward deformation of the annular wall 1023 causes it to engage the engaging flange 1055 of the tamper evidence band 1005, whilst allowing relative rotation therebetween. As a result, the tamper evidence band 1005 is retained on the container neck 1002 when the closure 1001 is first removed therefrom.

Figure 41:
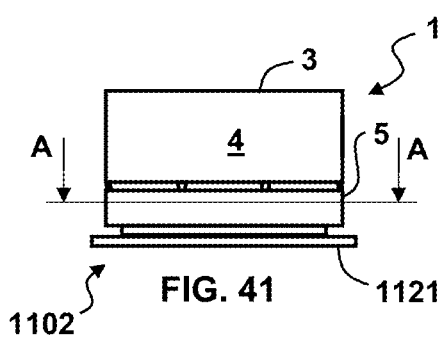
FIG. 41 depicts a schematic side view of another closure and container neck combination, with the body of the container omitted.
Figure 42:
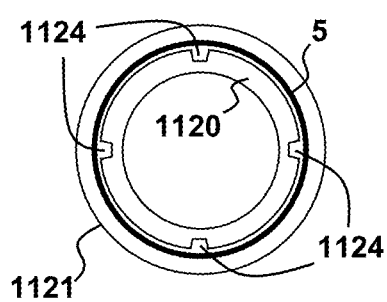
FIG. 42 depicts a section view along line A-A of FIG. 41.

FIGS. 41 and 42 show the closure 1 of FIGS. 1 and 2 on the neck 1102 of a container 1109 according to yet another example. The engaging flange 1120 of the container neck 1102 according to this example includes four notches 1124 spaced about its periphery. With the closure 1 installed on the neck 1102, the wire 580 heats the tamper evidence band 5 to cause it to shrink onto the engaging flange 1120. As a result, the regions of the tamper evidence band that contract over the notches 1124 are deformed therein. This prevents relative rotation between the tamper evidence band 5 and the container neck 1102, thereby causing the bridges 41 to shear on first removal of the closure 1 from the container neck 1102.

Figure 43:
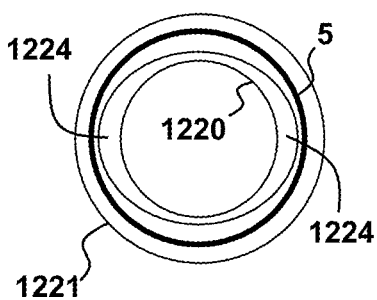
FIG. 43 depicts a similar view to FIG. 42 but showing an alternative arrangement.

FIG. 43 shows the cross-section similar to that of FIG. 42, showing the tamper evident band 5 of the closure 1 of FIGS. 1 and 2 on the neck 1202 of a container 1209 according to yet another example. In this example, the engaging flange 1220 of the container neck 1202 is oval, thereby providing a pair of diametrically opposed lobes 1224. With the closure 1 installed on the neck 1202, the wire 580 (or other reshaping means) heats the tamper evidence band 5 to cause it to shrink onto the engaging flange 1220. As a result, the regions of the tamper evidence band that contract over the oval engaging flange 1220. This prevents relative rotation between the tamper evidence band 5 and the container neck 1202, thereby causing the bridges 41 to shear on first removal of the closure 1 from the container neck 1202.

Figure 44:
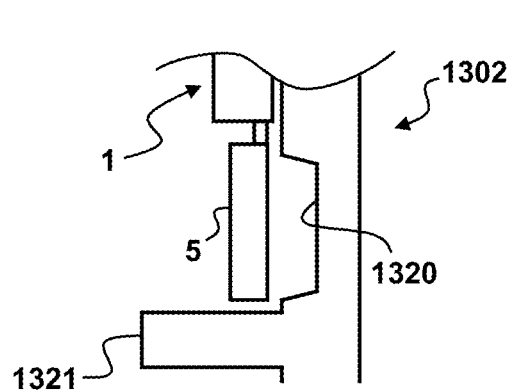
FIG. 44 depicts a partial section view of a lower portion of another closure and container neck combination.
Figure 45:
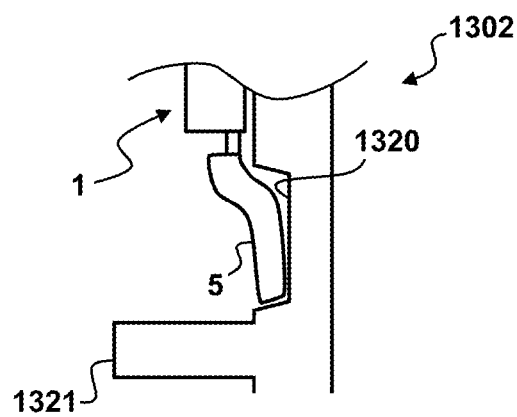
FIG. 45 is a similar view to that of FIG. 44 with the tamper evidence band deformed inwardly.

FIGS. 44 and 45 show the closure 1 of FIGS. 1 and 2 on a container neck 1302 according to yet another example. In this example, the container neck 1302 includes a circumferential engaging groove 1320 extending into the neck 1302 above the support ledge 1321, instead of an external radial flange 20. As a result, deforming the tamper evidence band 5 using one of the aforementioned closure conditioning systems 8, 8', 208, 308, 408, 508, 608, 708, 808, 908 causes it to deform into the circumferential engaging groove 1320 of the neck 1302. This provides a rotatable engagement between the tamper evidence band 5 and the container neck 1302 similar to that which is provided with an engaging flange 20.

Figure 46:
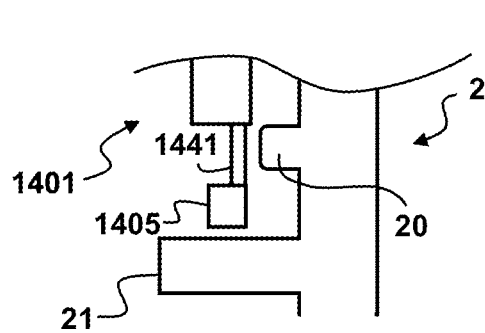
FIG. 46 depicts a partial section view of a lower portion of another closure and container neck combination.
Figure 47:
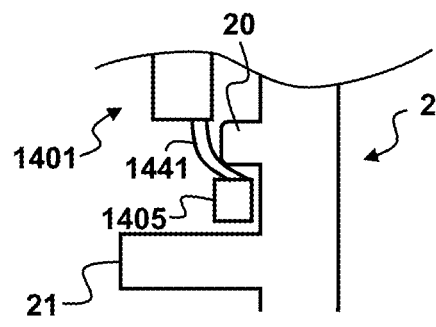
FIG. 47 is a similar view to that of FIG. 46 with the tamper evidence band shrunk inwardly.

FIGS. 46 and 47 show a closure 1401 according to another example, which is similar to the closure 1 of FIGS. 1 and 2, wherein like features are depicted with like references incremented by 1400 and will therefore not be described further. This closure 1401 differs from the closure 1 of FIGS. 1 and 2 in that the bridges 1441 are longer. The bridges 1441 in this example are also aligned with the engaging flange 20 when the closure 1401 is on the container neck 2. The tamper evidence band 1405 is also shorter and is configured to be heated by one of the mechanisms described above across its entire height so that it contracts and stretches the bridges 1441 around the engaging flange 20, as illustrated in FIG. 47. This enables the closure 1401 to be even lighter than the closure 1 of FIGS. 1 and 2.

Figure 48:
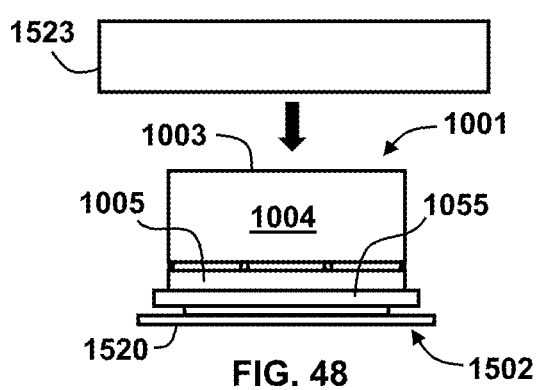
FIG. 48 depicts a schematic side view of another closure and container neck combination, with a separate connecting ring and with the body of the container omitted.
Figure 49:
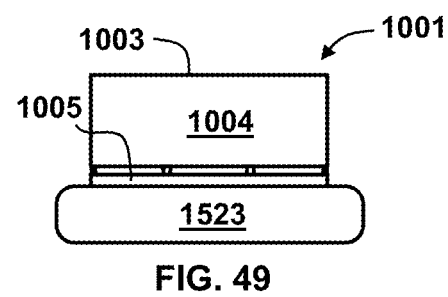
FIG. 49 depicts the closure and container neck combination of FIG. 48 with the connecting ring reshaped to engage the tamper evidence band of the closure with the container neck.

FIGS. 48 and 49 show the closure 1001 of FIGS. 39 and 40 on a container neck 1502 according to another example, and a connecting ring 1523 for engaging the tamper evidence band 1005 of the closure 1001 with a flange 1520 of the container neck 1502. With the closure 1001 on the container neck 1502, the connecting ring 1523 is placed around tamper evidence band 1005 and the flange 1520, and heat is applied to the connecting ring 1523 so that it shrinks around the engaging flange 1055 of the tamper evidence band 1005 and the flange 1520 of the container neck 1502. This creates a rotatable engagement between the tamper evidence band 1005 of the closure 1011 and the flange 1520 of the container neck 1502.

Of course, it is also envisaged that the connecting ring 1523 may be replaced with a sleeve or oversleeve, which may be thinner and/or longer than the connecting ring 1523. The sleeve or oversleeve may engage the tamper evidence band 1005 in a similar manner to the connecting ring 1523. Alternatively, the sleeve or oversleeve may itself include a tamper evidence feature. For example, it may include a first portion configured to remain on the closure 1001 when it is removed from the container neck, a second portion configured to remain on the container neck 1502 when the closure is removed from the container neck and a frangible connection connecting the first and second portions, which is configured to be severed on first removal of the closure 1001.

Figure 50:
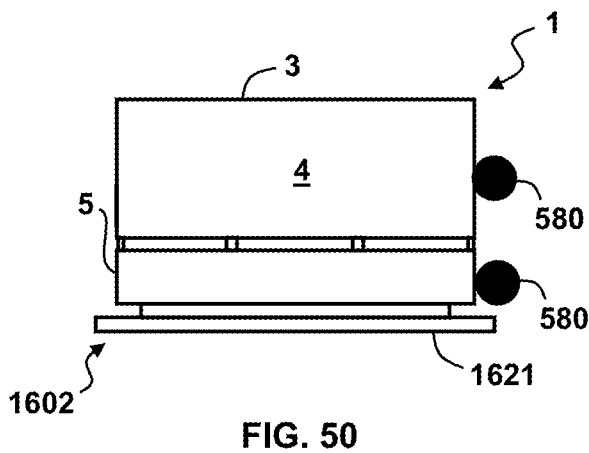
FIG. 50 depicts a schematic side view of a pair of wires of a closure conditioning system according to another example, in operation.
Figure 51:
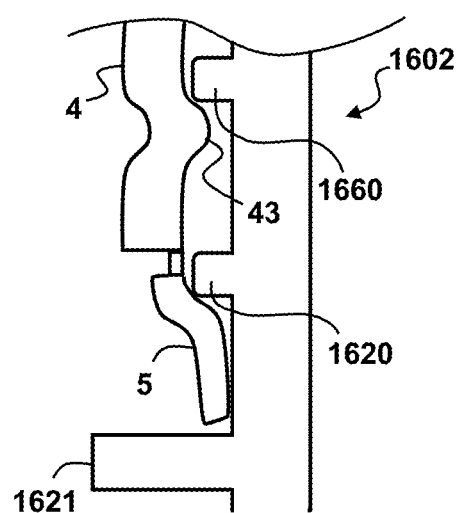
FIG. 51 depicts a partial section view of a lower portion of a closure and container neck combination after it has been conditioned using the arrangement of FIG. 50.

FIGS. 50 and 51 show the closure 1 of FIGS. 1 and 2 on a container neck 1602 according to yet another example. The container neck 1602 according to this example includes a securing feature 1606 in the form of an annular projection 1660 for providing a snap fit connection with the closure 1. With the closure 1 installed on the neck 1602, a pair of wires 580 of the closure conditioning system 508 of FIGS. 30 and 31 can be used to deform simultaneously both the tamper evidence band 5 and a portion of the cylindrical skirt 4 of the closure 1, immediately below the snap fit projection 1660. As a result, the tamper evidence band 5 shrink into the space between the support ledge 1621, and the engaging flange 1620 and the annular portion of the cylindrical skirt 4 below the snap fit projection 1660 deforms inwardly to form a radial snap fit projection 43. The resulting radial projection 43 on the cylindrical skirt 4 releasably engages the snap fit projection 1660 of the container neck 1602 to enable it to be opened and reclosed.

Figure 52:
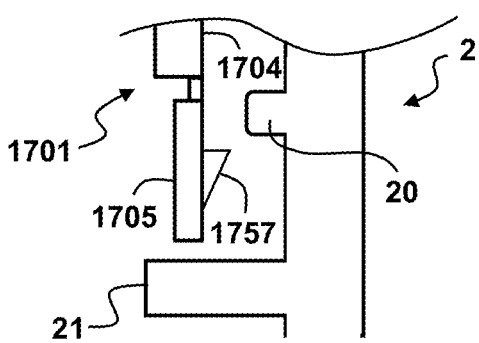
FIG. 52 depicts a partial section view of a lower portion of another closure and container neck combination before it has been conditioned.
Figure 53:
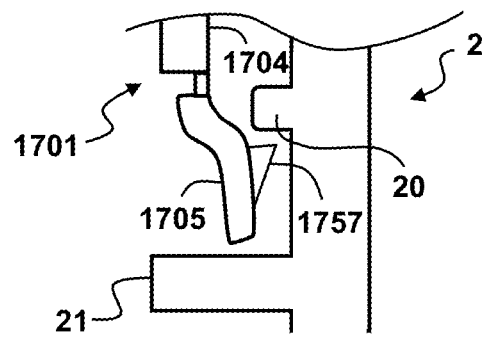
FIG. 53 is a view similar to that of FIG. 52 showing the tamper evidence band of the closure after it has been reshaped.

FIGS. 52 and 53 show a closure 1701 according to another example, which is similar to the closure 1 of FIGS. 1 and 2, wherein like features are depicted with like references incremented by 1700 and will therefore not be described further. This closure 1701 differs from the closure 1 of FIGS. 1 and 2 in that the tamper evidence band 1705 includes engaging cams 1757 on its inner surface.

The tamper evidence band 1705 has a diameter that is sufficiently large that the cams 1757 pass freely over the engaging flange 20 of the container neck 2. With the closure 1701 installed on the neck 2, the tamper evidence band 5 is heated to shrink into the space between the support ledge 1621. As a result, the cams 1757 are aligned with the engaging flange 20 of the container neck 2 so that they engage on first removal of the closure 1701 from the container neck 2, thereby separating the tamper evidence band 5 from the cylindrical skirt 1704 of the closure 1701.

Figure 54:
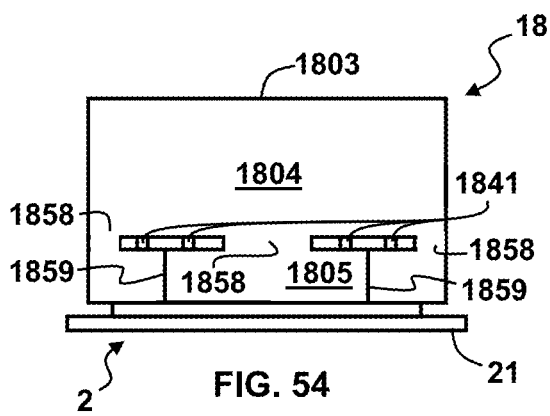
FIG. 54 depicts another closure and container neck combination, with the body of the container omitted and in which the tamper evidence band includes a non-frangible connection to the cylindrical skirt.

FIG. 54 shows a closure 1801 according to another example, which is similar to the closure 1 of FIGS. 1 and 2, wherein like features are depicted with like references incremented by 1800 and will therefore not be described further. This closure 1801 differs from the closure 1 of FIGS. 1 and 2 in that the tamper evidence band 1805 is segmented, with each of three parts connected to the cylindrical skirt 1804 by a non-frangible connection 1858, in addition to the frangible bridges 1841. The tamper evidence band 1805 includes frangible lines 1859 across its height, which separate it into the three parts.

With the closure 1801 installed on the neck 2, the tamper evidence band 1805 is deformed in a similar way to the closure 1 of FIGS. 1 and 2. However, on first removal of the closure 1801 from the container neck 2, the bridges 1841 break and the frangible lines 1859 causes the tamper evidence band 1805 to separate into the three parts and from the cylindrical skirt 1804 of the closure 1801, breaking the tamper evidence band 1805 open and releasing it from the container neck 2. As such, the segmented tamper evidence band 1805 remains connected to the cylindrical skirt 1804 of the closure 1801 by the non-frangible connection 1858.

Figure 55:
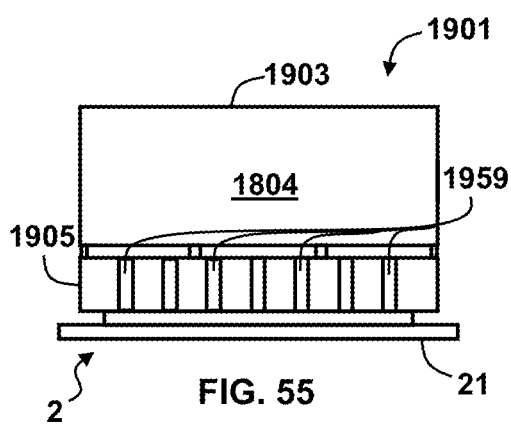
FIG. 55 depicts another closure and container neck combination, with the body of the container omitted and in which the tamper evidence band includes a plurality of axial ribs.

FIG. 55 shows a closure 1901 according to another example, which is similar to the closure 1 of FIGS. 1 and 2, wherein like features are depicted with like references incremented by 1900 and will therefore not be described further. This closure 1901 differs from the closure 1 of FIGS. 1 and 2 in that the tamper evidence band 1905 includes a plurality of axial ribs 1959.

With the closure 1901 installed on the neck 2, the tamper evidence band 1905 is deformed in a similar way to the closure 1 of FIGS. 1 and 2. However, it is believed that the axial ribs 1959 create internal stresses when the closure 1901 is cooled during the molding process. Without wishing to be bound by any theory, these internal stresses are believed to result in more deformation when the tamper evidence band 1905 is reheated, and to provide greater stiffness to the undercut created by the deformed tamper evidence band 1905.

Figure 56:
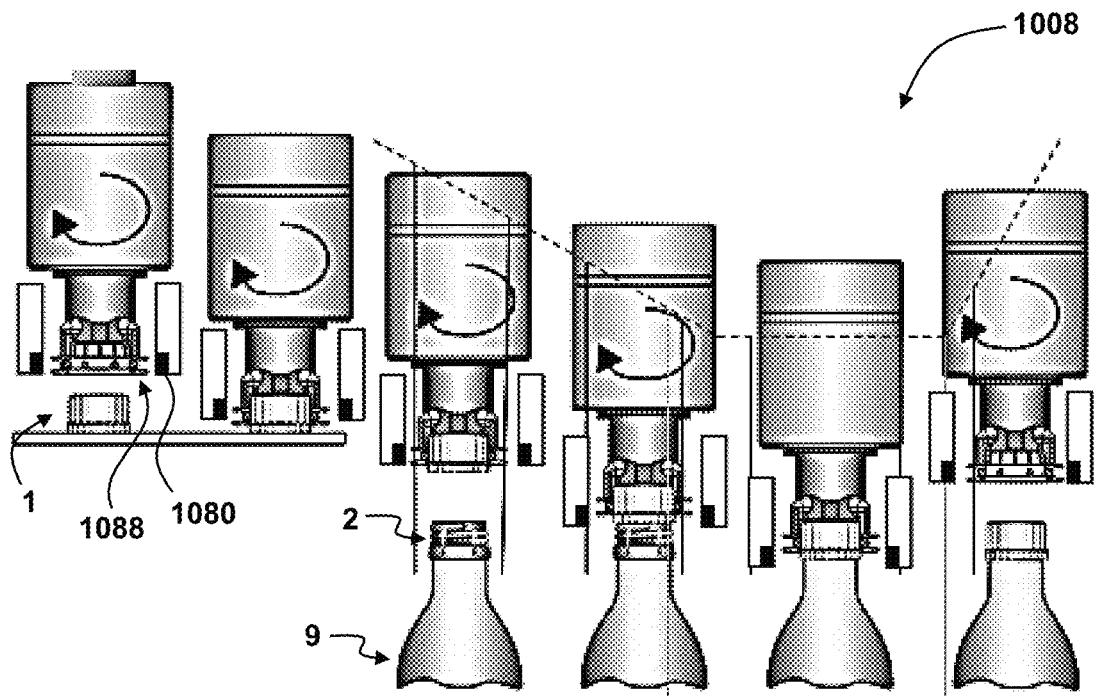
FIG. 56 depicts a schematic representation of a capper incorporating a heating ring for conditioning closures as they are installed onto the necks of containers.

FIG. 56 shows a capper 1008 incorporating a heating ring 1080 surrounding a lower portion of each capping chuck 1088. In use, as the closures 1 are installed on the necks 2 of the containers 9, the heating rings 1080 apply heat to the tamper evidence band 5, causing it to shrink around the container neck 2. As a result, the capper 1008 incorporates a closure conditioning system integrated therein.

Figure 57:
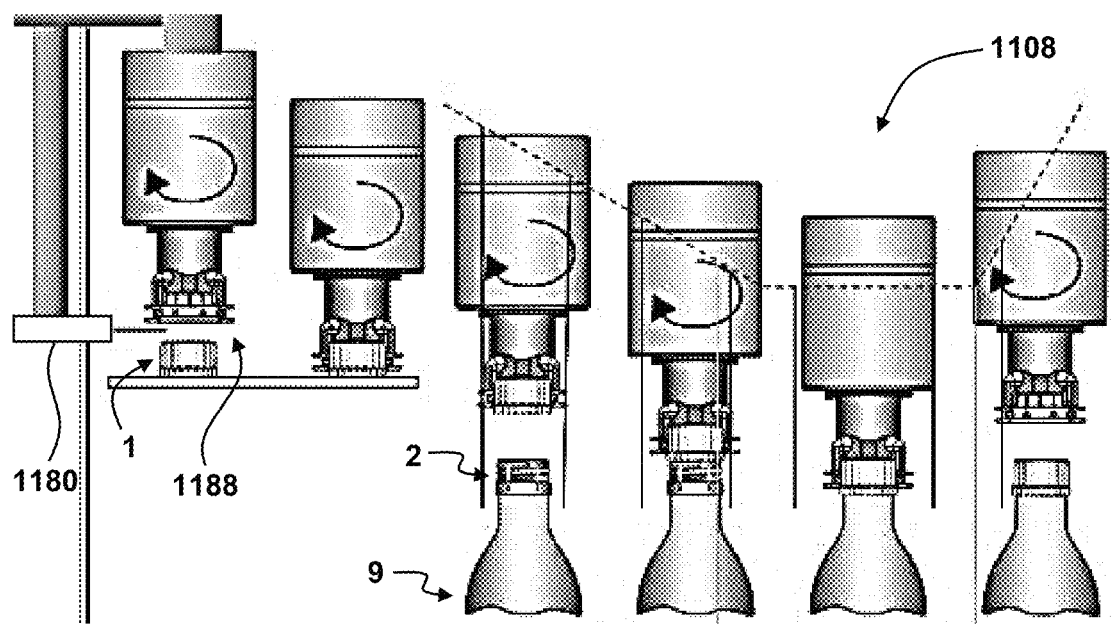
FIG. 57 depicts a schematic representation of a capper incorporating a laser for conditioning closures as they are installed onto the necks of containers.

Similarly, FIG. 57 shows a capper 1108 incorporating a laser 1180 aligned with a lower end of the capping chucks 1188. For simplicity, only one laser 1180 is shown in FIG. 57. In use, as the closures 1 are rotated to screw them onto the necks 2 of the containers 9, the lasers 1180 irradiate the tamper evidence band 5 as it rotates, causing it to shrink around the container neck 2. As a result, the capper 1108 also incorporates a closure conditioning system integrated therein.

It will be appreciated that the timing or sequencing of the application of heat to the tamper evidence band 5 in both cappers 1008, 1108 is configured to shrink the tamper evidence band 5 only after the closure 1 reaches a capped position on the container neck 2.

Figure 58:
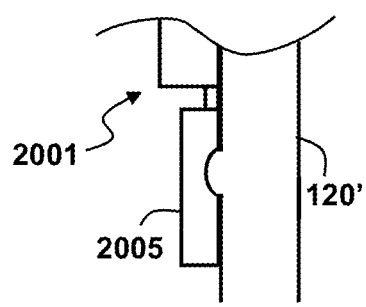
FIG. 58 depicts a partial section view of a lower portion of another closure on a mold core immediately after molding.
Figure 59:
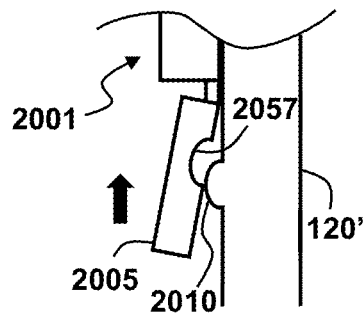
FIG. 59 is a similar view to that of FIG. 58 illustrating the tamper evidence band being deformed outwardly as it is ejected off the mold core.

FIGS. 58 and 59 show a closure 2001 according to another example, which is similar to the closure 1 of FIGS. 1 and 2, wherein like features are depicted with like references incremented by 2000 and will therefore not be described further. This closure 2001 differs from the closure 1 of FIGS. 1 and 2 in that the tamper evidence band 2005 includes a circumferential recess 2057 on its inner surface, which is formed by an annular bead 2010 on the circumference of the outer mold core 120'.

When the closure 2001 is ejected from the outer mold core 120', as shown in FIG. 59, it stretches outwardly as it is urged over the annular bead 2010. As a result, internal stresses are created during demolding. Without wishing to be bound by any theory, these internal stresses are believed to result in more deformation when the tamper evidence band 2005 is reheated, and to provide greater stiffness to the undercut created by the deformed tamper evidence band 2005.

Figure 60:
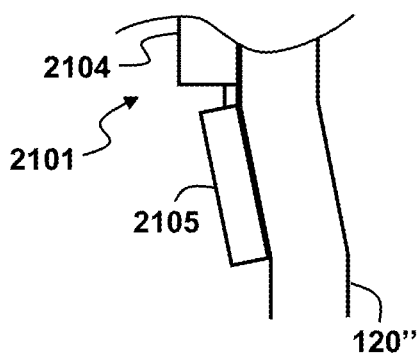
FIG. 60 depicts a partial section view of a lower portion of another closure on a mold core immediately after molding.
Figure 61:
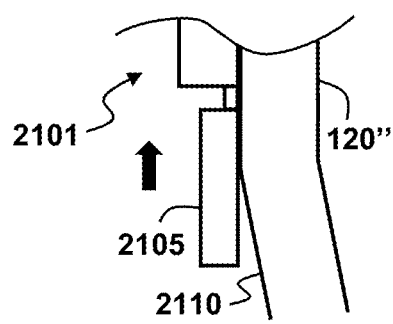
FIG. 61 is a similar view to that of FIG. 60 illustrating the tamper evidence band being deformed outwardly as it is ejected off the mold core.

FIGS. 60 and 61 show a closure 2101 according to another example, which is similar to the closure 1 of FIGS. 1 and 2, wherein like features are depicted with like references incremented by 2100 and will therefore not be described further. This closure 2101 differs from the closure 1 of FIGS. 1 and 2 in that the tamper evidence band 2105 is molded with an inward incline, as illustrate in FIG. 60. This incline is formed by a conical portion 2110 of the outer mold core 120".

When the closure 2101 is ejected from the outer mold core 120", as shown in FIG. 61, it stretches outwardly as it is urged over the straight cylindrical surface forming the cylindrical skirt 2104 of the closure 2101. As a result, internal stresses are created during demolding. These internal stresses are believed to result in more deformation when the tamper evidence band 2105 is reheated, and to provide greater stiffness to the undercut created by the deformed tamper evidence band 2105.

Figure 62:
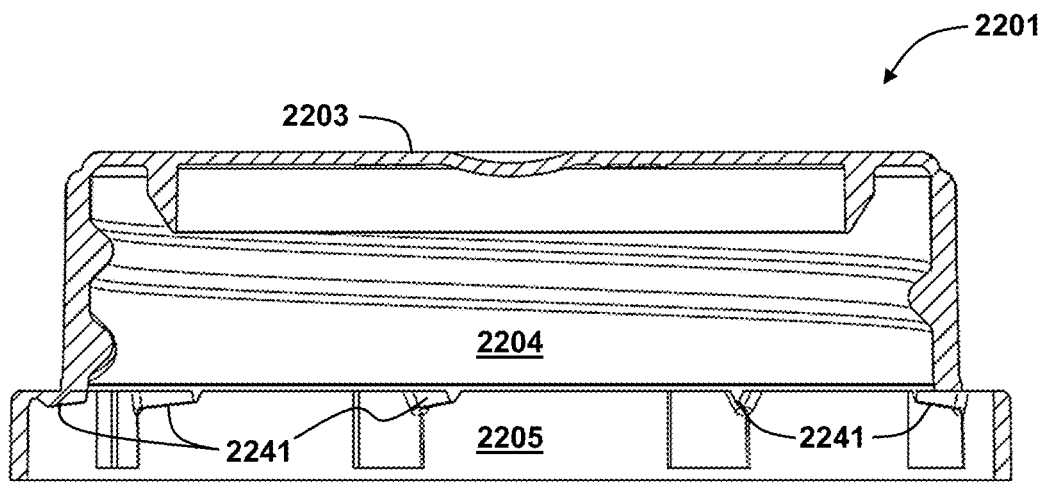
FIG. 62 depicts a cross-sectional view of a closure according to another example.

FIG. 62 show a closure 2201 according to another example, which is similar to the closure 1 of FIGS. 1 and 2, wherein like features are depicted with like references incremented by 2200 and will therefore not be described further. This closure 2201 differs from the closure 1 of FIGS. 1 and 2 in that the diameter of the tamper evidence band 2205 is greater than that of the cylindrical skirt 2204 and is joined thereto by a series of bridges 2241 which extend radially between the cylindrical skirt 2204 and the tamper evidence band 2205. It is also envisaged that the bridges 2241 may extend axially, such that they are angled relative to the radial direction.

This arrangement avoids the need for split inserts 124 in the mold stack 102, since the bridges 2241 can be described by the core and cavity assemblies 104, 106. The container neck (not shown) would also include an engaging feature, such as a flange, having a diameter and axial length that are both similar, but smaller, than the inner diameter of the tamper evidence band 2205. With the closure 2201 installed on the neck (not shown), the tamper evidence band 2205 is deformed in a similar way to the closure 1 of FIGS. 1 and 2.

Figure 63:
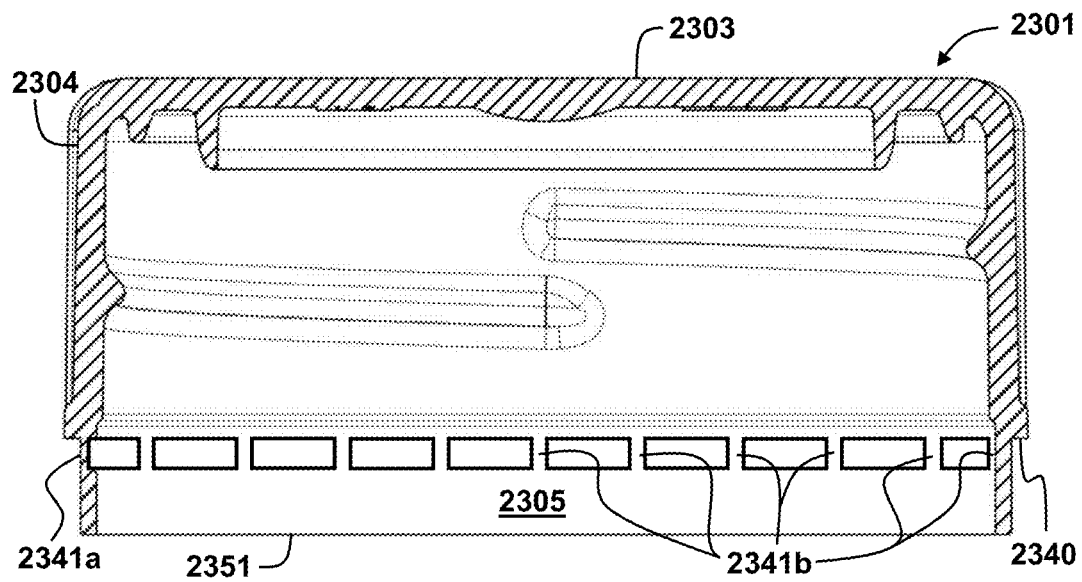
FIG. 63 depicts a closure according to another example.

FIG. 63 shows a closure 2301 according to another example, which is similar to the closure 1' of FIG. 10, wherein like features are depicted with like references incremented by 2300 and will therefore not be described further. This closure 2301 differs from the closure 1' of FIG. 10 in that the outer surface of the continuous membrane 2341a is recessed internally relative to the tamper evidence band 2305 and includes a series of axial ribs 2341b, which project from an inner surface of the membrane 2341a and across its width. The membrane 2341a has an outer surface that is flush with the outer surface of the tamper evidence band 2305, and an inner surface that is recessed relative to the inner surface of the tamper evidence band 2305. The inner surfaces of the axial ribs 2341*b* are contiguous with the inner surface of the tamper evidence band 2305 in this example, such that the thickness of the axial ribs 2341*b* is substantially the same as the thickness of the tamper evidence band 2305.

As a result, the mold core (not shown) for forming the closure 2301 would have a series of projections about its circumference, which would form recesses between the axial ribs 2341*b*. The skilled person will appreciate that the tamper evidence band 2305 would expand as it is forced, in use, over these projections on removal of the closure 2301 from the mold core.

Advantageously, the slitting machine 88 of FIG. 11 may be configured to slit the membrane 2341*a* of the closure 2301 about its entire circumference but at a depth only sufficient to cut the membrane 2341*a*, leaving the axial ribs 2341*b* intact, such that they provide frangible bridges joining the tamper evidence band 2305 to the cylindrical skirt 2304. The serrated blade 88*b* need not be serrated and may instead be continuous to provide a clean cut of the membrane 2341*a* between the axial ribs 2341*b*. These axial ribs 2341*b* can improve the molding process, since they provide flow paths for molten plastic to fill the tamper evidence band 2305, whilst enabling the thickness of the membrane 2341*a* to be minimised. With the closure 2301 installed on the neck 2, the tamper evidence band 2305 is deformed in a similar way to the closure 1' of FIG. 10.

It should be appreciated that the inner surface of the axial ribs 2341*b* together define a circle having a diameter smaller than the inner diameter of the membrane 2341*a*, but equal to the inner diameter of the tamper evidence band 2305 in this case. In some examples, the inner surface of the axial ribs 2341*b* is recessed relative to the inner surface of the tamper evidence band 2305, such that their thickness is less than that of the tamper evidence band 2305. By way of example, the axial ribs 2341*b* may project from the inner surface of the membrane 2341*a* by 1 mm. However, these examples are not intended to be limiting in any way, and other configurations are also envisaged.

It is also envisaged that the membrane 2341*a* could be provided with a single, wide axial rib 2341*b* which may have a thickness equivalent to that of the tamper evidence band 2305. In such an example, the membrane 2341*a* could be slit in the same manner as the closure 1' of FIG. 10 to provide a plurality of bridges having a thickness equivalent to the membrane 2341*a*. As a result, the axial rib 2341*b* could function as a tether to retain the closure 2301 on the container neck 2.

It is also envisaged that the tamper evidence band 2305 of the closure 2301 may, in some cases, be provided with cams or tabs, not shown, such as those that well known in the art.

Figure 64:
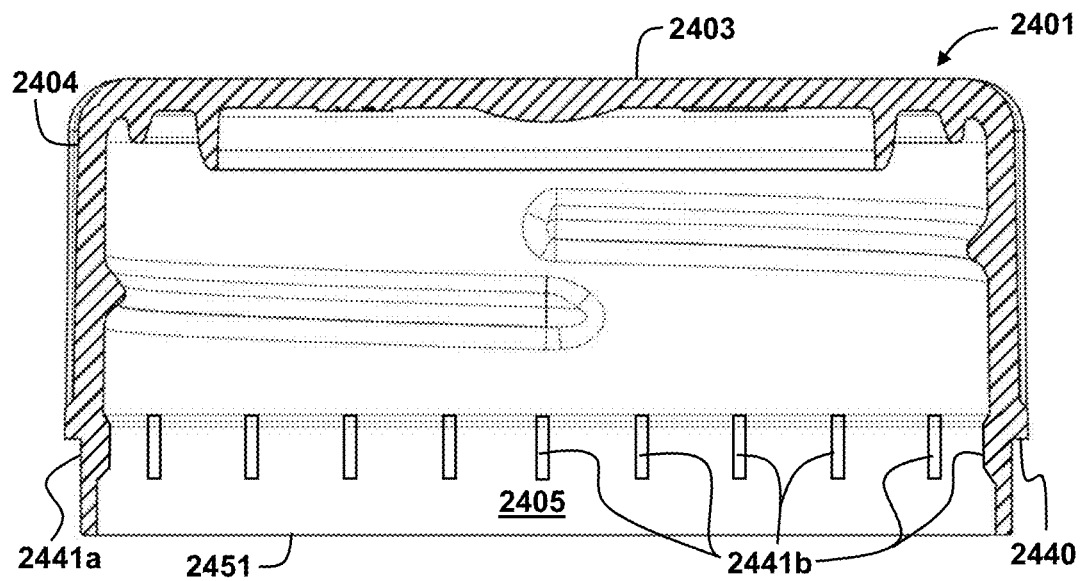
FIG. 64 depicts a closure according to yet another example.

FIG. 64 shows a closure 2401 according to yet another example, which is similar to the closure 2301 of FIG. 63, wherein like features are depicted with like references incremented by 100 and will therefore not be described further. This closure 2401 differs from the closure 2301 of FIG. 63 in that the thickness of the continuous membrane 2441*a* is substantially the same as the thickness of the tamper evidence band 2405, and the axial ribs 2441*b* project beyond the inner surface of the tamper evidence band 2405.

The skilled person will appreciate that the mold core (not shown) for forming the closure 2401 will therefore have a series of axial recesses instead of projections, thereby avoiding the need to expand the tamper evidence band 2405 on removal of the closure 2301 from the mold core.

Figure 65:
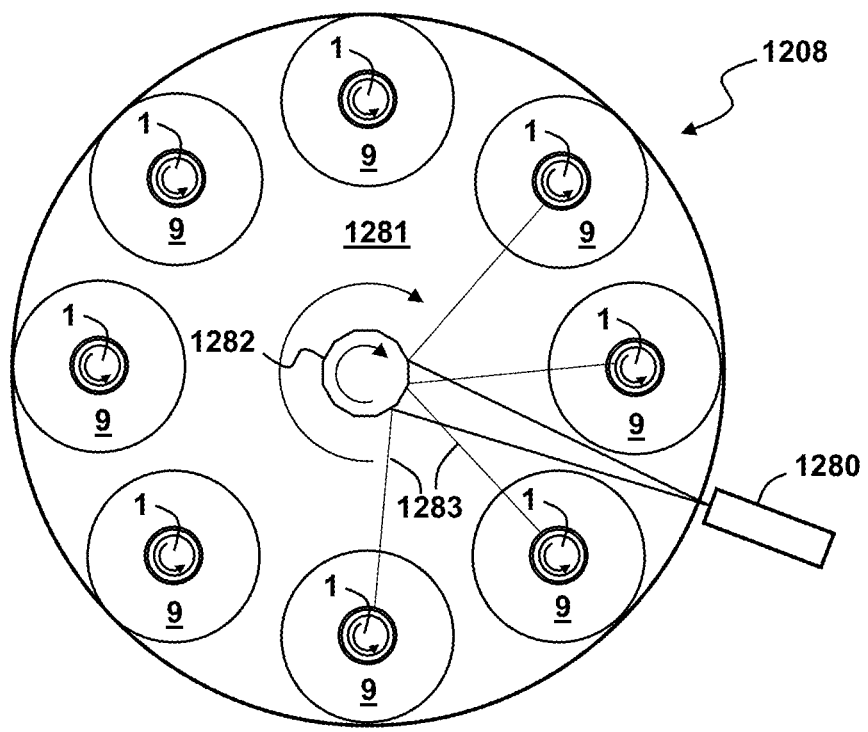
FIG. 65 depicts a schematic representation of another closure conditioning system incorporated into a labeller or capper.

FIG. 65 shows schematically another closure conditioning system 1208 incorporated into either a labeller or a capper. The system 1208 includes a carousel 1281 with a polygon mirror 1282 at its centre and a laser 1280 directed at the polygon mirror 1282 from a fixed position outside the carousel 1281. The containers 9 are spaced equally about the carousel 1281 at respective stations, where they pass through the labelling or capping process. As the containers 9 pass through the positions adjacent the laser 1280, beams 1283 are reflected from the polygon mirror 1282 and onto the tamper evidence bands 5 of the closures 1 installed on the necks 2 of the containers 9, thereby to cause the tamper evidence bands 5 to shrink around and engage the container necks 2.

It is also envisaged that the tamper evidence band 2405 of the closure 2401 may, in some cases, be provided with cams or tabs, not shown, such as those that well known in the art.

Figure 66:
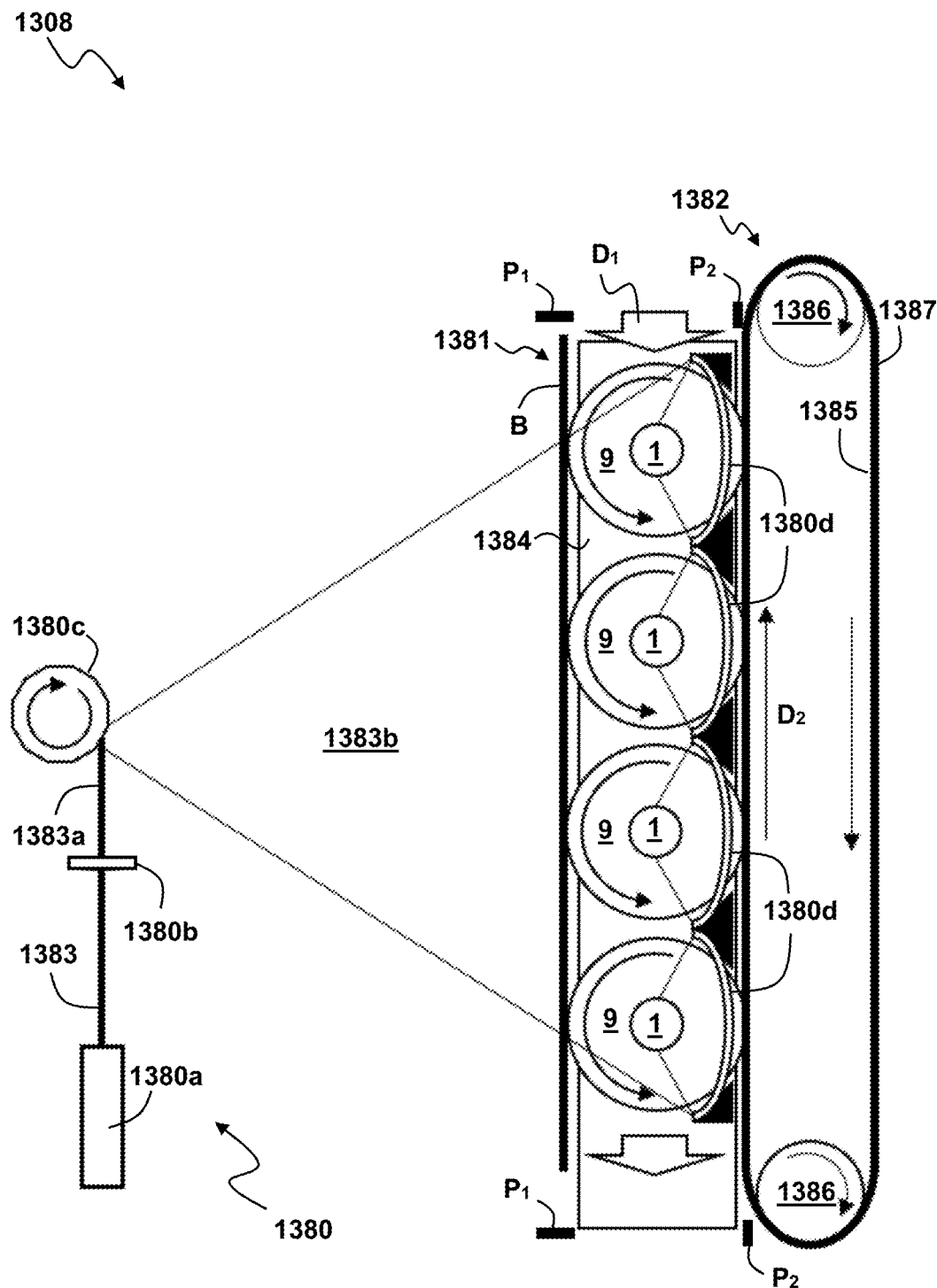
FIG. 66 depicts a schematic representation of a closure conditioning system according to another example.

FIG. 66 illustrates a closure conditioning system 1308 which is a variation of the system 8 of FIG. 6, wherein like features are depicted by like references, incremented by 1300. The closure conditioning system 1308 differs from that of FIG. 6 in that the planar laser source 80 is replaced with a laser assembly 1380. The laser assembly 1380 includes a source 1380*a*, a beam shaping optical device 1380*b*, in this case a focusing lens or telescope, a rotating polygonal mirror 1380*c* and a series of concave mirrors 1380*d*, which are elliptical in this example. The polygonal mirror 1380*c* is shown with twelve sides, but it may have more or less than twelve sides.

The source 1380*a* emits a laser beam 1383 through the beam shaping optical device 1380*b*, which narrows the vertical height (parallel to the axis of the container 9) of the laser beam 1383 to provide a focused height laser beam 1383*a*. The focused height laser beam 1383*a* is then reflected by the rotating polygonal mirror 1380*c*, which rotates at a speed configured to provide a substantially continuous planar laser beam 1383*b* directed toward the tamper evidence bands 5 of the closures 1 on the containers 9 travelling along the conveyor 1381.

This irradiates the tamper evidence bands 5 in a similar manner to the planar laser 83 in the system 8 of FIG. 6. However, this conditioning system 1308 includes a plurality of concave mirrors 1380*d*, each mounted to the conveyor 1381, adjacent a respective one of the closures 1 on its opposite side to the polygonal mirror 1380*c*. As a result, the portion of the substantially continuous planar laser beam 1383*b* that passes between adjacent closures 1 on the conveyor 1381 is reflected by the concave mirrors 1380*d* back toward the tamper evidence bands 5. This irradiates the opposite side of the tamper evidence bands 5 simultaneously, thereby improving the efficiency of the conditioning system 1308.

It will be appreciated by those skilled in the art that such concave mirrors 1380*d* can be incorporated into the conditioning systems 8, 8' of FIGS. 6 and 9 to create a similar improvement.

Figure 67:
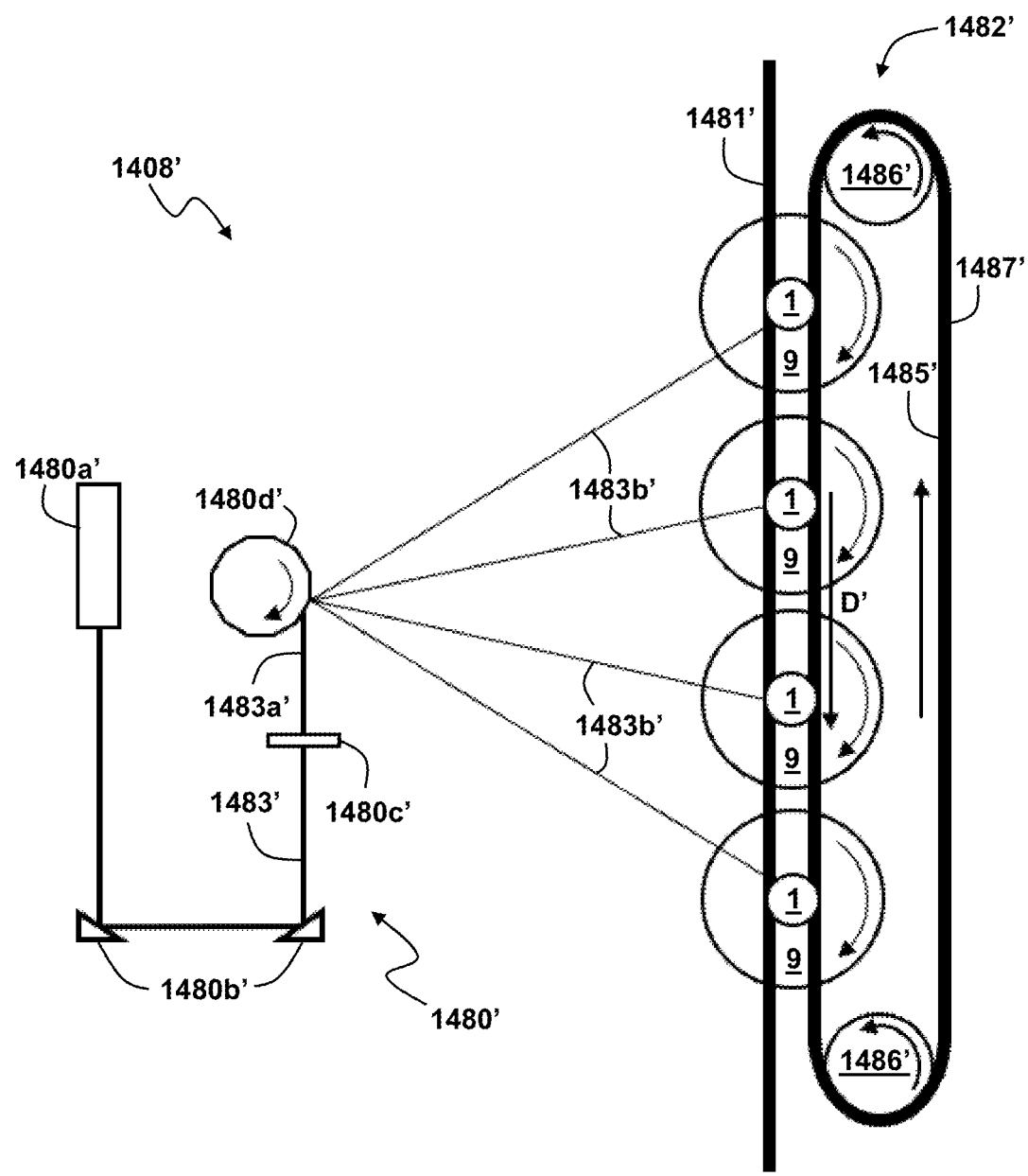
FIG. 67 depicts a schematic representation of a closure conditioning system according to yet another example.

FIG. 67 illustrates a closure conditioning system 1408' which is a variation of the system 8' of FIG. 13, wherein like features are depicted by like references, incremented by 1400. The closure conditioning system 1408' differs from that of FIG. 13 in that both conveyors 1481', 1482' engage the container neck 2 instead of the body of the container 9, and also in that the planar laser source 80' is replaced with a laser assembly 1480'. In this example, the laser assembly 1480' includes a source 1480*a*', a pair of deflection mirrors 1480*b*', a beam shaping optical device 1480*c*', in this case a focusing lens or telescope and a rotating polygonal mirror

1480*d'*. The polygonal mirror 1480*d'* is shown with twelve sides, but it may have more or less than twelve sides.

The source 1480*a'* emits a laser beam 1483', which is reflected through 180° by the deflection mirrors 1480*b'* before passing through the beam shaping optical device 1480*c'*, which narrows the vertical height (parallel to the axis of the container 9) of the laser beam 1483' to provide a focused height laser beam 1483*a'*. The focused height laser beam 1483*a'* is then reflected by the rotating polygonal mirror 1480*d'*, which rotates at a speed configured to separate the focused height laser beam 1483*a'* into distinct laser beams 1483*b'* each directed toward one of the tamper evidence bands 5 of the closures 1 on the containers 9 as they travel along the conveyors 1481', 1482'.

This irradiates the tamper evidence bands 5 in a similar manner to the lasers 1283 in the system 1208 of FIG. 65.

Figure 68:
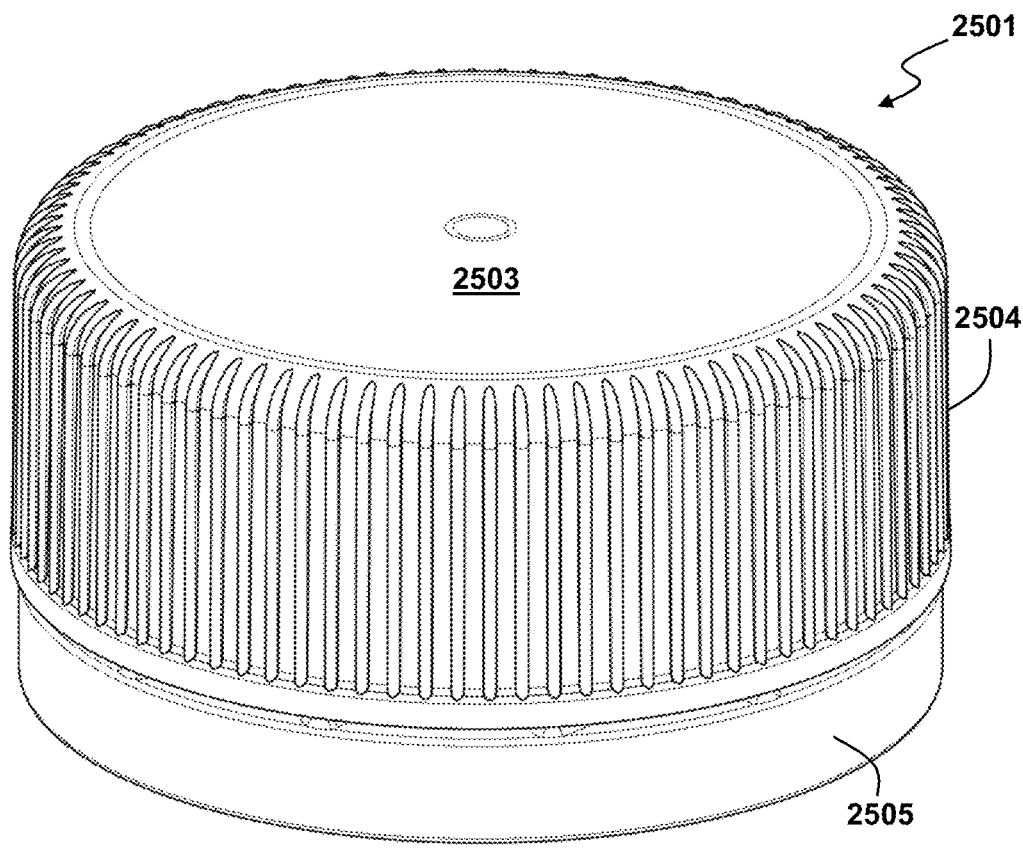
FIG. 68 depicts a perspective view of a closure according to another example.
Figure 69:
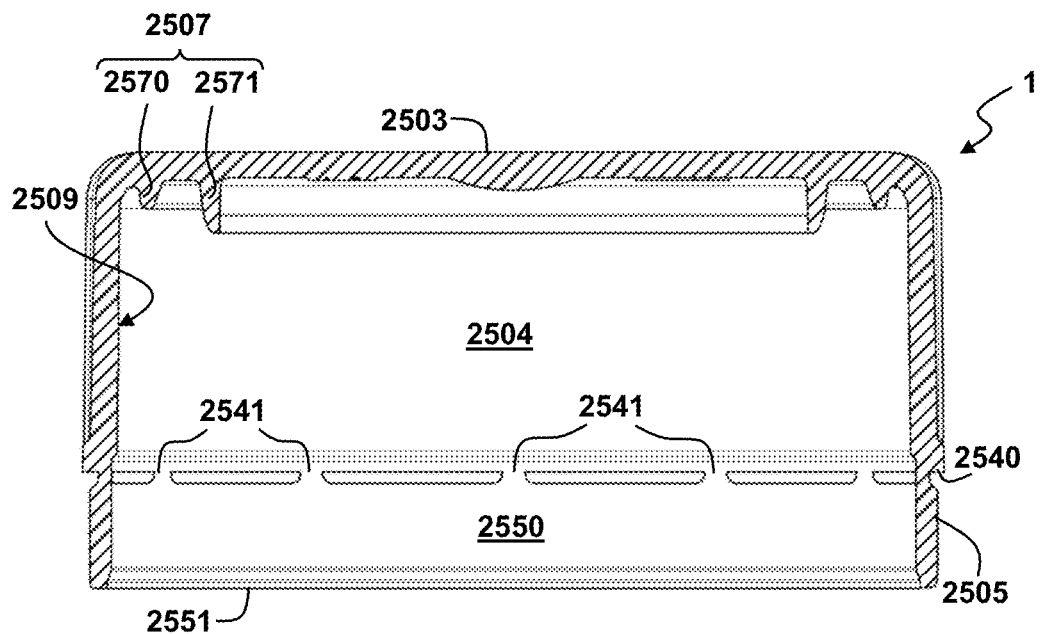
FIG. 69 depicts a cross-sectional view of the closure of FIG. 68.

FIGS. 68 and 69 show a closure 2501 according to another example, which is similar to the closure 1 of FIG. 1, wherein like features are depicted with like references incremented by 2500 and will therefore not be described further. This closure 2501 differs from the closure 1 of FIG. 10 in that it lacks the securing feature 6 in the form of the screw thread 60 which protrudes from an inner surface of the cylindrical skirt 4. Instead, the inner surface 2509 of the skirt 2504 is substantially cylindrical, featureless and/or devoid of any molded securing feature.

As a result, the mold core (not shown) for forming the closure 2501 would have a cylindrical outer surface, without features, in the region for molding the inner surface of the shell. The skilled person will appreciate that such a core, without encapsulated features, would facilitate core production and molded article ejection.

Figure 70:
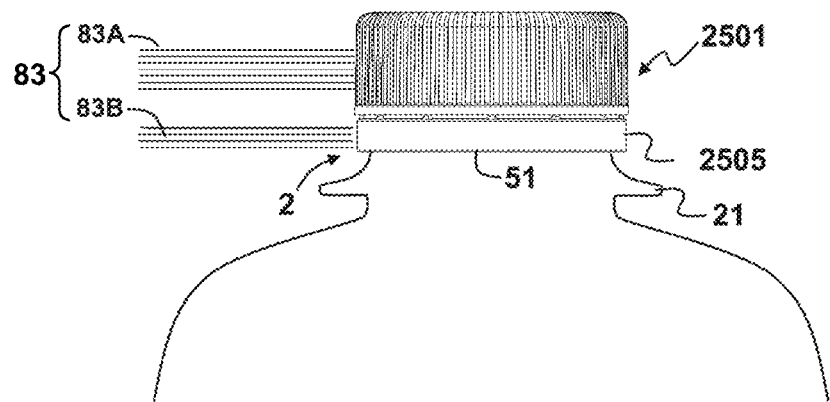
FIG. 70 depicts the closure of FIGS. 68 and 69 installed on a container neck while the container is at an early stage of conditioning by the closure conditioning system of FIG. 6.
Figure 71:
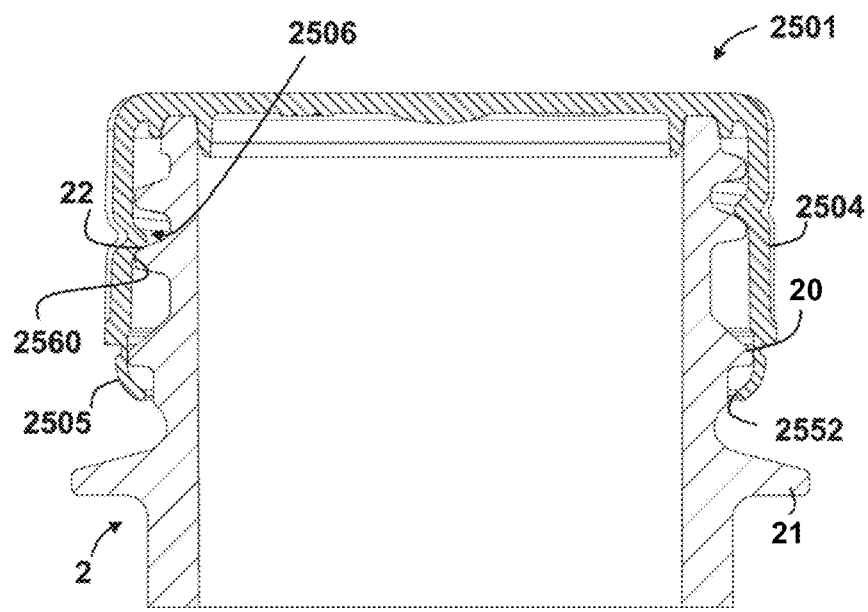
FIG. 71 depicts a section view of the arrangement shown in FIG. 70 during a later stage of conditioning by the closure conditioning system of FIG. 6.

As illustrated in FIGS. 70 and 71, a source of heat energy, such as, for example, a laser beam 83 having component beams 83A and 83B, is directed at a selected region of the skirt 2504 as well as a lower portion of the tamper evidence band 2505 of the closure 2501, adjacent its open end 2551. The source of heat energy is configured to irradiate the selected region of the skirt 2504 and the tamper evidence band 2505. This causes the heated regions to locally contract, which creates a securing feature 2506 on the inner surface 2509 of the skirt and an internal lip 2552, or undercut, having an internal diameter that is smaller than the outer diameter of the flange 20 of the container neck 2.

Advantageously, the securing feature 2506 formed on the skirt 2505 forms a screw thread 2560 that conforms to a profile of the screw threads 22 of the container neck 2. That is, the screw threads 22 of the container neck 2 provide a molding surface for forming the screw thread 2560 on the inner surface of the closure.

Figure 72:
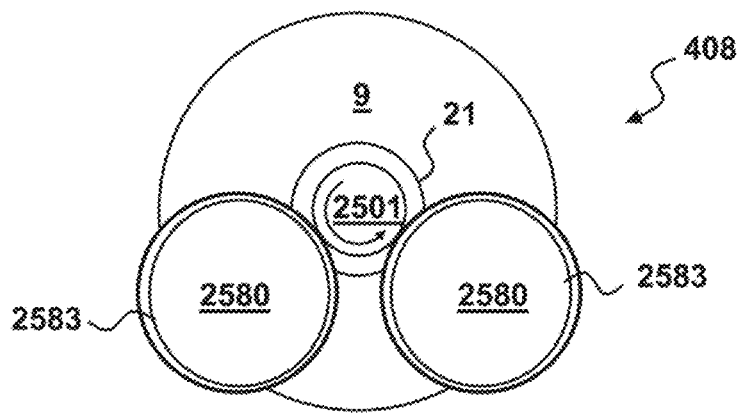
FIG. 72 depicts a schematic top view of rollers of a closure conditioning system according to another example, in operation.

Furthermore, reference FIG. 72, the length of a heating tunnel, not shown, could be adapted to the need to further incorporate a pair of rollers 2580 with which to press the skirt 2504 and tamper evidence band 2505 against the container neck 2 to assist with the reshaping thereof. The skilled person will appreciate that other sources of heat energy are also envisaged.

The heated regions may also crystallize. This can provide both a visual indication of deformation and a more rigid securing feature 2506 and internal lip 2552. In some cases, the entire closure 2501 may be heated sufficiently to cause it to crystallize. This can also have the added advantage of improving barrier properties and reducing gas permeability.

Figure 73:
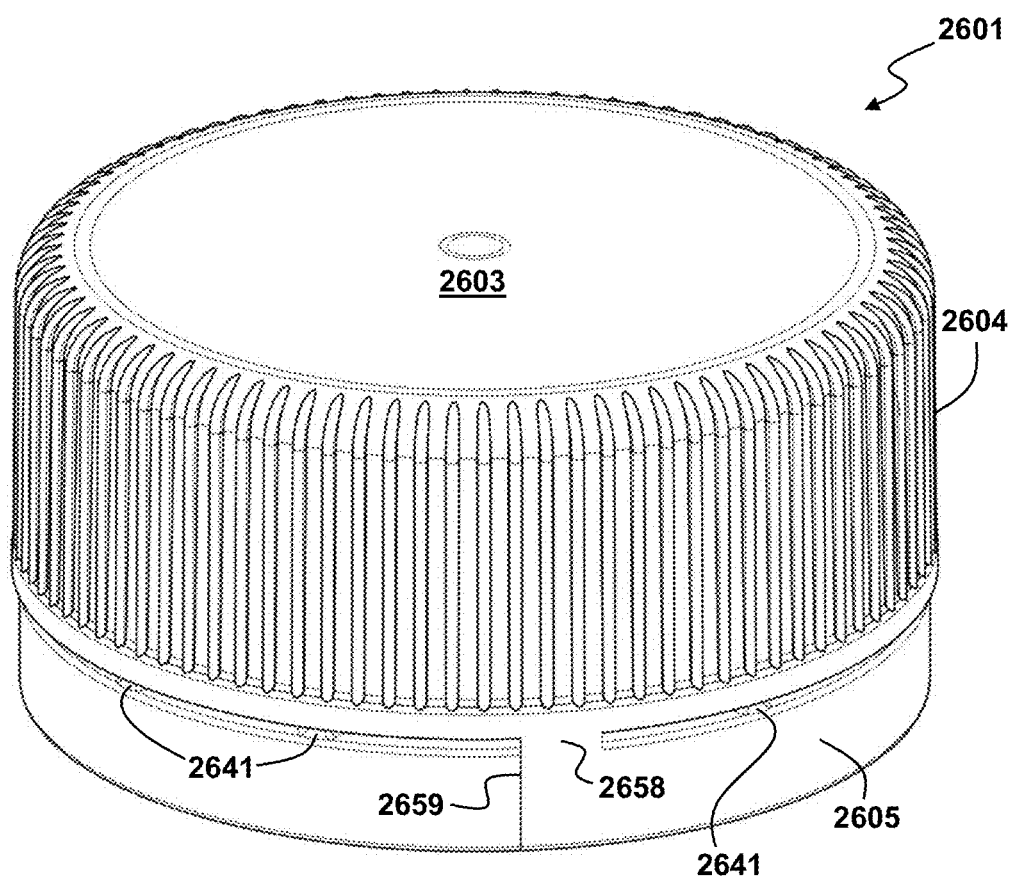
FIG. 73 depicts a perspective view of a closure according to another example.
Figure 74:
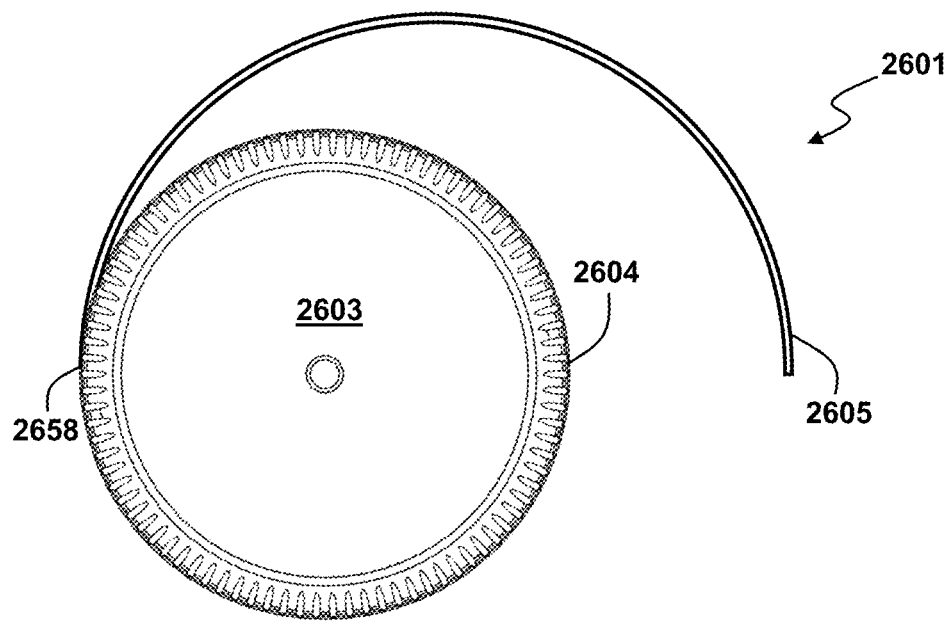
FIG. 74 depicts a top view of the closure of FIG. 73 after removal from a container neck.

FIGS. 73 and 74 show a closure 2601 according to another example, which is similar to the closure 1 of FIG. 1, wherein like features are depicted with like references incremented by 2600 and will therefore not be described further. This closure 2601 differs from the closure 1 of FIG. 1 in that it the tamper evidence band 2605 includes a non-frangible connection 2658 and a frangible line 2659 across its height, which is next to the non-frangible connection 2658.

With the closure 2601 installed on a neck 2, the tamper evidence band 2605 is deformed in a similar way to the closure 1 of FIGS. 1 and 2. However, on first removal of the closure 2601 from the container neck 2, the bridges 2641 break and the frangible lines 2659 causes the tamper evidence band 2605 to break as well and releases it from the container neck 2. This converts the tamper evidence band 2605 into a strip attached by the non-frangible connection 2658 to the cylindrical skirt 2604, as illustrated in FIG. 74. As such, the broken tamper evidence band 1805 remains connected to the closure 2601 on removal from the container neck 2.

Figure 75:
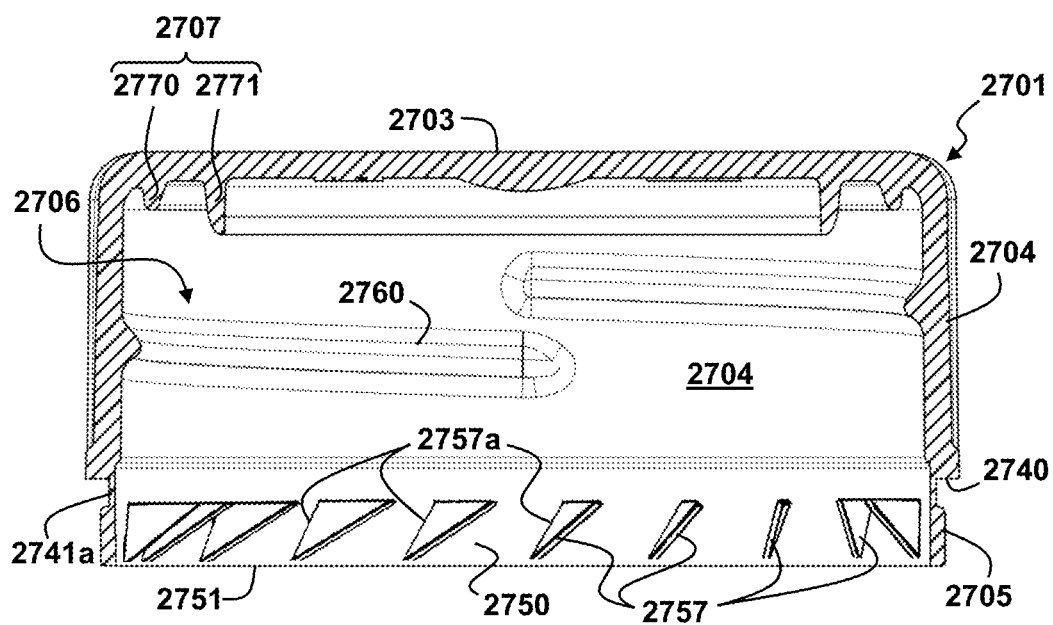
FIG. 75 depicts a cross-sectional view of a closure according to another example.

FIG. 75 shows a closure 2701 according to another example, which is similar to the closure 1' of FIG. 10, wherein like features are depicted without a' and with like references incremented by 2700 and will therefore not be described further. This closure 2701 differs from the closure 1' of FIG. 10 in that it includes a plurality of triangular flaps 2757 projecting inwardly from the tamper evidence band 2705.

As with the closure 1' of FIG. 20, a frangible connection between the cylindrical skirt 2704 and the tamper evidence band 2705 is formed by slitting, or otherwise cutting, the membrane 2741*a* post-molding. This may be done prior to its installation on the container neck 2 or after being installed on the container neck 2.

However, unlike the closure 1' the tamper evidence band 2705 need not be irradiated, as engagement with the flange 20 of the container neck 2 is achieved with the flaps 2757. More specifically, the flaps 2757 are configured to pivot or fold along their connecting line 2757*a* with the tamper evidence band 2705 as the closure 2705 is screwed onto the container neck 2, but to deploy on rotation of the closure 2701 in the opposite, unscrewing direction. Once deployed, the flaps 2757 engage the flange 20 of the container neck 2 to retain the tamper evidence band 2705 thereon, severing the frangible connection.

In some examples, the container neck 2 has a ratchet or engaging features for cooperating with the flaps 2757 to inhibit rotation of the tamper evidence band 2705 on rotation of the closure in the unscrewing direction. The engaging features could be serrations.

Figures 76, 77:
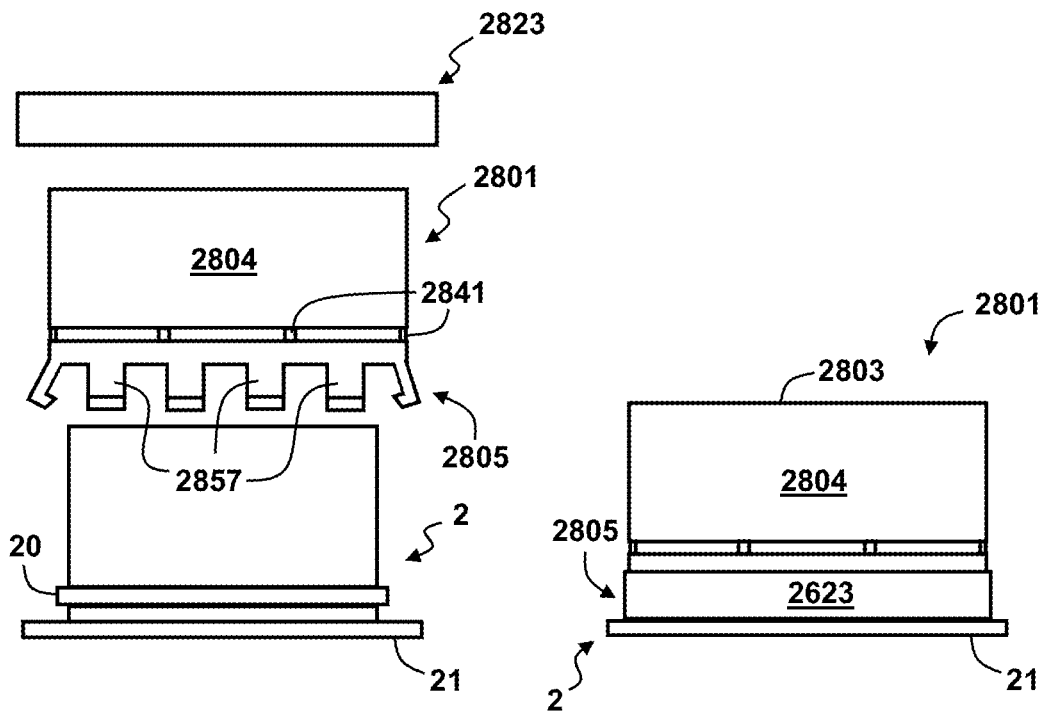
FIG. 76 depicts a schematic exploded side view of another closure and container neck combination, with a separate connecting ring.
FIG. 77 depicts the closure and container neck combination of FIG. 76 with the connecting ring and tamper evidence hooks of the closure engaged with the container neck.

FIGS. 76 and 77 show a closure 2801 and connecting ring 2823 combination according to another example, which is similar to the closure 1001 and connecting ring 1523 combination of FIGS. 48 and 49, wherein like features are depicted with like references incremented by 1800 and 1300 respectively and these will therefore not be described further. This closure 2801 differs from the closure 1001 of FIGS. 48 and 49 in that it the tamper evidence band 2805 includes a plurality of hooks 2857.

The closure 2801 may be molded with the hooks 2857 splayed outwardly, as illustrated in FIG. 76, which may facilitate demolding and installation onto the container neck 2 in such a way that reduces the stress to which the bridges 2841 are subjected. This can be particularly useful when the closure 2801 is formed of polyethylene terephthalate (PET).

With the closure 2801 on the container neck 2, the connecting ring 2823 is placed around tamper evidence band 2805 and its hooks 2857, and heat is applied to the connecting ring 2823 so that it shrinks around the hooks 2857 of the tamper evidence band 2805 and forces them into engagement with the flange 20 of the container neck 2. This creates an arrangement similar to a conventional tamper evidence band, wherein the hooks 2857 engage the flange 20 such that subsequent removal of the closure 2801 from the container neck 2 severs the bridges 2841 and separates the tamper evidence band 2805 from the rest of the closure 2801.

Figures 78, 79:
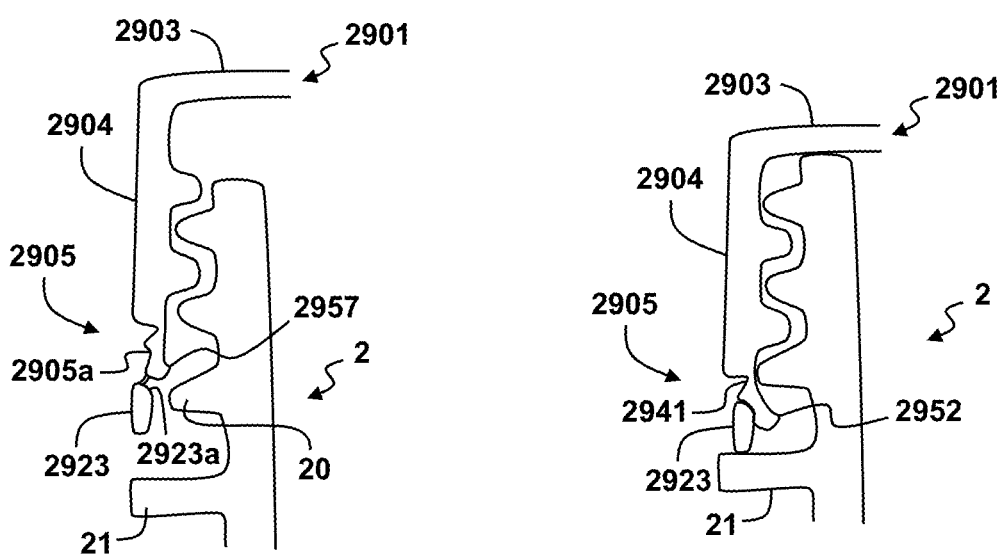
FIG. 78 depicts a schematic section view of part of another closure with an integral connecting ring during installation onto a container neck.
FIG. 79 depicts the closure and container neck combination of FIG. 78 with the connecting ring engaged with the tamper evidence band of the closure with the container neck.

Turning now to FIGS. 78 and 79, there is shown a closure 2901 according to another example, which is similar to the closure 2801 and connecting ring 2823 combination of FIGS. 76 and 77, wherein like features are depicted with like references incremented by 100 respectively and these will therefore not be described further. This closure 2901 differs from the closure 2801 of FIGS. 78 and 79 in that it includes an integral connecting ring 2923, rather than the separate connecting ring 2823. The connecting ring 2923 is connected to the tamper evidence band 2905 by a membrane 2923*a* and the tamper evidence band 2905 has a profiled outer surface 2805*a* that is shaped to cooperate with a cam surface 2923*a* of the connecting ring 2923.

As the closure 2901 is installed onto the container neck 2, the connecting ring 2923 contacts the support ledge 21 and continued downward movement of the closure 2901 forces the cam surface 2923*a* of the connecting ring 2923 against the profiled outer surface 2805*a* of the tamper evidence band 2905. As can be seen from FIGS. 78 and 79, the cam surface 2923*a* of the connecting ring 2923 causes an inward deformation of the lower portion of the tamper evidence band 2905, thereby contracting an inner, relatively shallow annular projection 2957. This inward deformation creates an internal lip 2952 that engages with the flange 20 such that subsequent removal of the closure 2901 from the container neck 2 severs the bridges 2941 and separates the tamper evidence band 2905 from the rest of the closure 2801.

Figure 80:
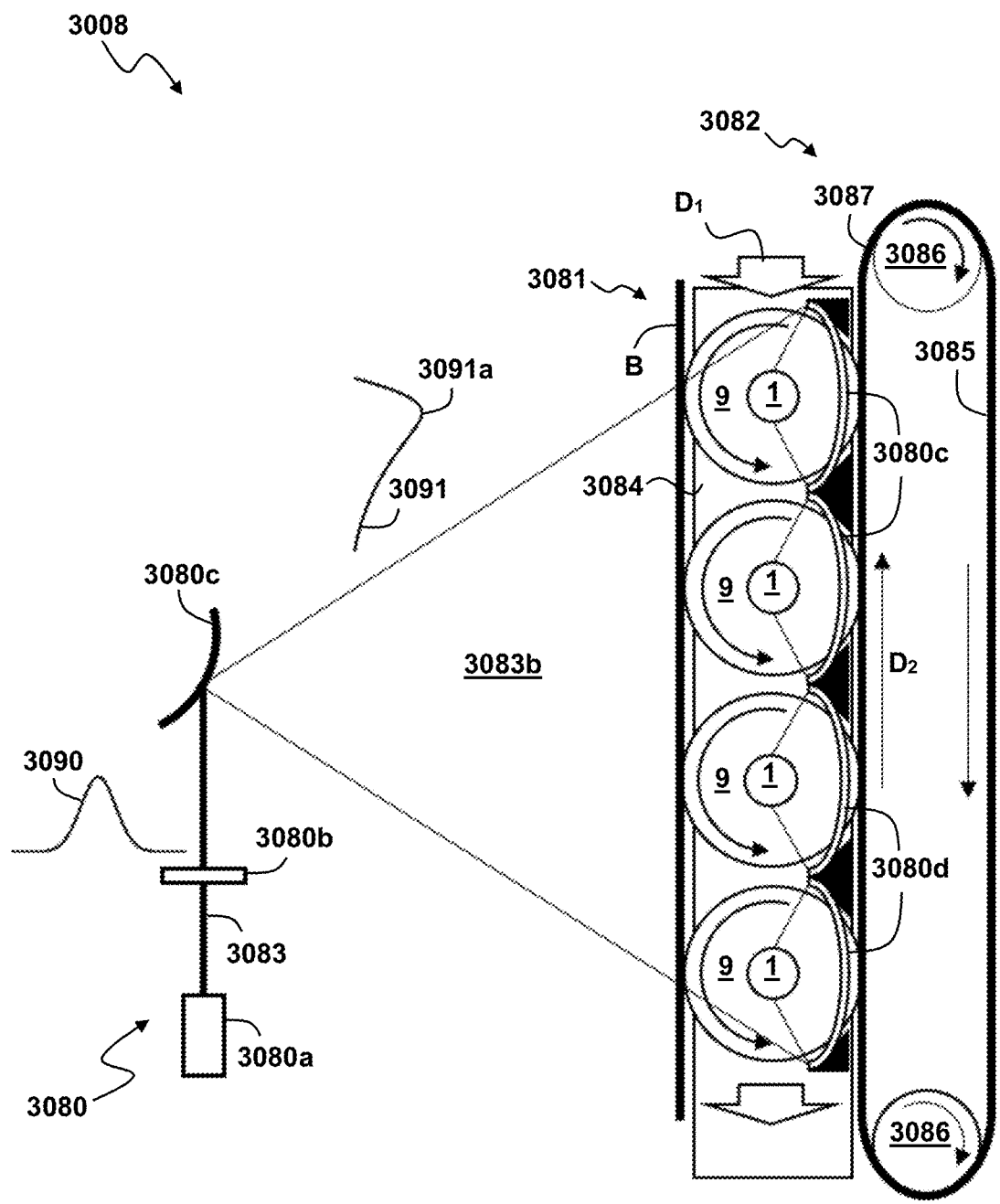
FIG. 80 depicts a schematic top view of a closure conditioning system according to another example, in operation and illustrating a horizontal laser intensity distribution to which the closure is subjected.

FIG. 80 illustrates a closure conditioning system 3008 similar to the closure conditioning system 1308 of FIG. 66, wherein like features are depicted by like references, incremented by 1700. The closure conditioning system 3008 differs from that of FIG. 66 in that the beam shaping optical device 3080*b* spreads the laser beam 3083 emitted from the source 3080*a* vertically without altering its horizontal width and the polygon mirror 1380*c* is replaced with a freeform mirror 3080*c*. By way of example and as shown in FIG. 80, the laser assembly 3080 can be used to irradiate a series of closures 1 shown in FIGS. 1 and 2 on a container 9, as they move along the conveying direction $D_1$.

In use, the source 3080*a* emits a laser beam 3083 through the beam shaping optical device 3080*b*, which is then reflected by the freeform mirror 3080*c* toward the tamper evidence bands 5 of the closures 1 on the containers 9 travelling along the conveyor 3084. The freeform mirror 3080*c* in this example is configured to alter the initial horizontal intensity distribution 3090 of the laser beam 3083 emitted from the source 3080*a*. This initial horizontal intensity distribution 3090 is along a horizontal plane, that is to say along the conveying direction $D_1$ as illustrated in FIG. 80. After the laser beam 3083 is reflected by the freeform mirror 3080*c*, the resulting laser beam 3083*b* has an irradiating horizontal intensity distribution 3091 that is different from the initial horizontal intensity distribution 3090.

More specifically, the initial horizontal intensity distribution 3090 has a standard normal distribution, with a central peak. The irradiating horizontal intensity distribution 3091 has a peak 3091*a* that is skewed toward the upstream end of the conveyor 3084, such that the laser beam 3083*b* irradiates the tamper evidence bands 5 of the closures 1 on the containers 9 toward the upstream end of the conveyor 3084 with a higher intensity than those toward the downstream end thereof. It is, however, envisaged that the freeform mirror 3080*c* may be shaped to provide a different vertical and/or horizontal intensity distribution to suit the required intensity distribution profile.

The freeform mirror 3080*c* may be tiltable to alter the direction of the laser beam 3083*b* irradiating the closure 1. Moreover, the laser assembly 3080 may include an adjustment mechanism (not shown) for altering dynamically the shape of the freeform mirror 3080*c*. This enables user control of the vertical and/or horizontal intensity distribution to suit any particular application. Alternatively, the freeform mirror 3080*c* may be provided by a rigid mirror, which is pre-shaped to provide the desired vertical and/or horizontal intensity distribution.

Figure 81:
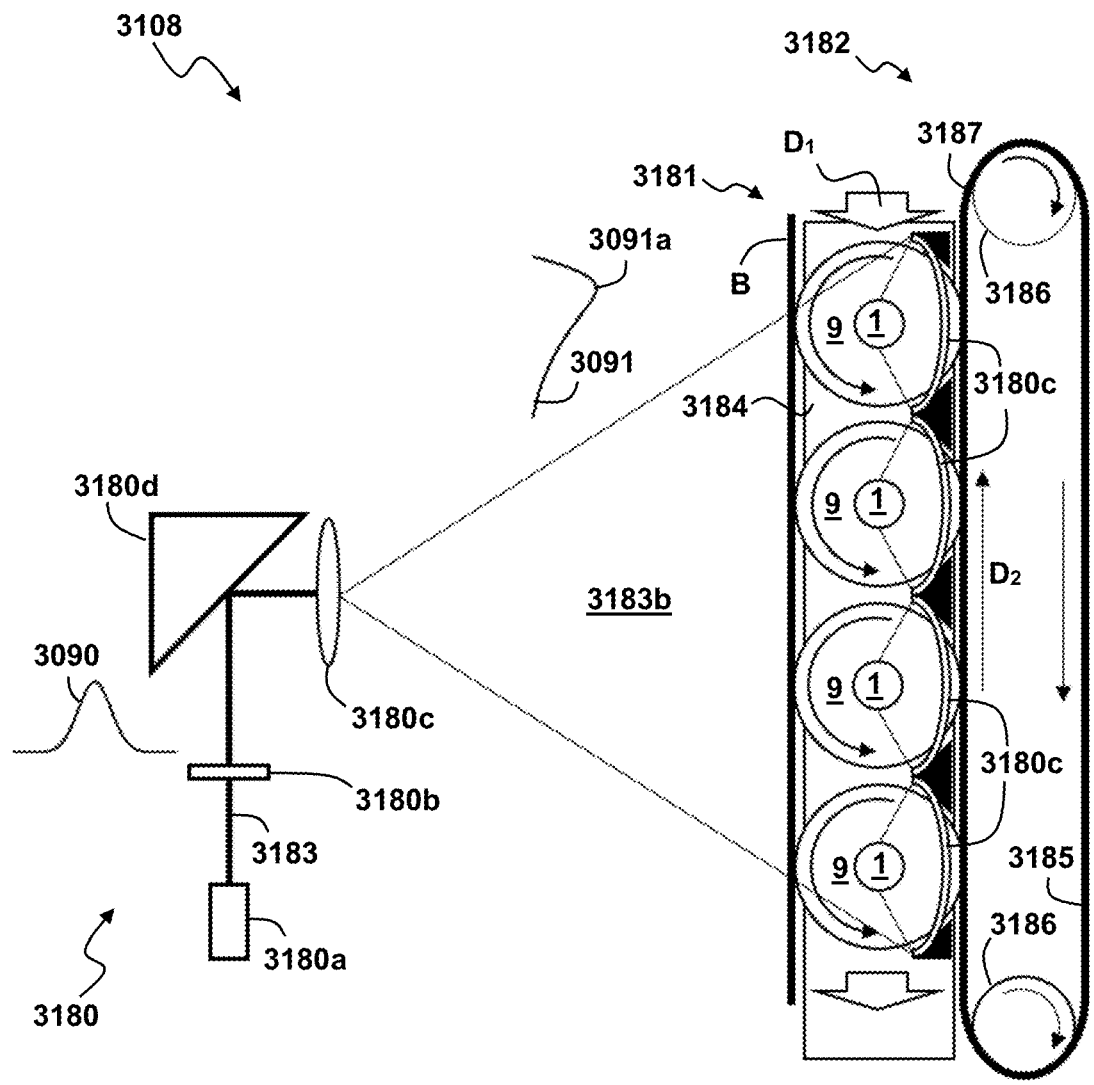
FIG. 81 depicts a schematic top view of a closure conditioning system according to yet another example, in operation and illustrating a horizontal laser intensity distribution similar to FIG. 80.

FIG. 81 illustrates a closure conditioning system 3108 similar to the closure conditioning system 3008 of FIG. 80, wherein like features are depicted by like references, incremented by 100. The closure conditioning system 3108 differs from that of FIG. 80 in that the freeform mirror 3080*c* is replaced with a flat mirror 3180*d* and freeform lens 3180*c*. As such, the orientation and intensity redistribution steps are separated, which can be simpler in some applications.

However, the initial horizontal intensity distribution 3090 and the irradiating horizontal intensity distribution 3091 are the same as those in closure conditioning system 3008 of FIG. 80. As such, the same numbering has been used.

The shape of the freeform lens 3180*c* may be varied according to specific requirements. This enables the vertical and/or horizontal intensity distribution to be modified suit any particularly application.

Figure 82:
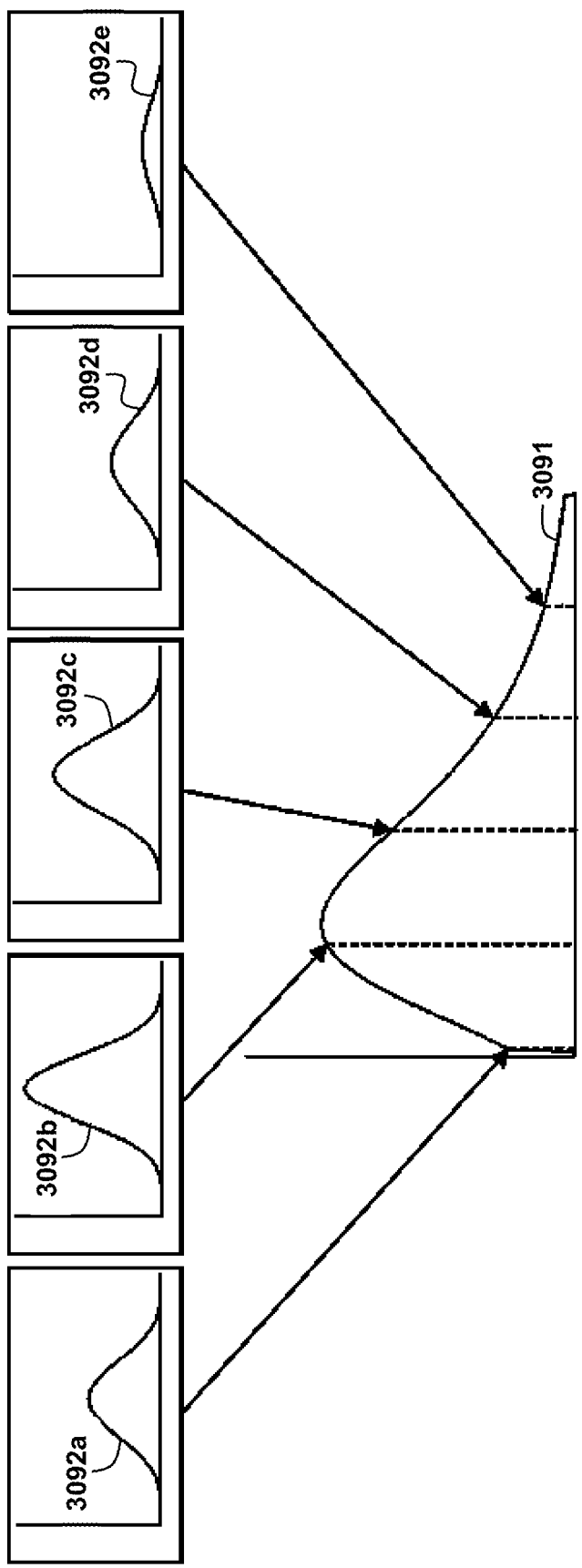
FIG. 82 illustrates an example vertical laser intensity distribution associated with the horizontal laser intensity distribution to which the closure is subjected by the closure conditioning systems of FIGS. 80 and 81.

FIG. 82 illustrates the vertical intensity distribution 3092*a*, 3092*b*, 3092*c*, 3092*d*, 3092 at each of five different horizontal positions (i.e. different locations along the conveying direction $D_1$) of the irradiating horizontal intensity distribution 3091. As can be seen from FIG. 82, each of the vertical intensity distributions 3092*a*, 3092*b*, 3092*c*, 3092*d*, 3092*e* has a standard normal distribution, with a central peak. Thus, the vertical intensity distribution of the reflected laser beam 3083*b* is substantially the same as the initial laser beam 3083.

It is, of course, envisaged that the freeform mirror 3080*c* of the laser assembly 3080 of FIG. 80 or the freeform lens 3180*c* of the laser assembly 3180 of FIG. 81 may be shaped to alter its distribution as well, or separate freeform optical devices can be used to achieve this.

Figure 83:
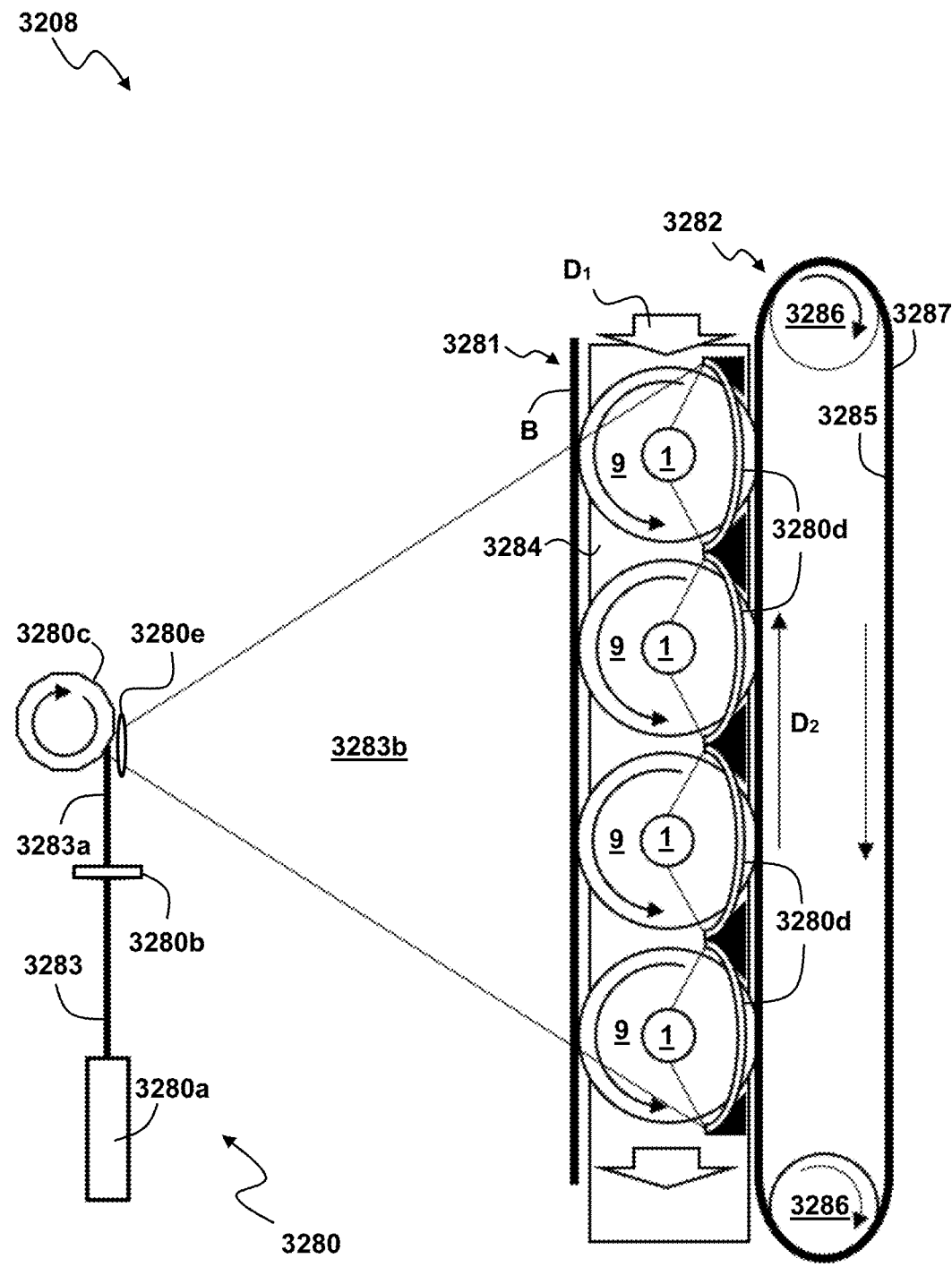
FIG. 83 depicts a schematic top view of a closure conditioning system according to yet another example, which includes a scanning lens.

FIG. 83 illustrates a closure conditioning system 3208 similar to the closure conditioning system 1308 of FIG. 66, wherein like features are depicted by like references, incremented by 1900. The closure conditioning system 3208 differs from that of FIG. 66 in that it includes a scanning lens 3280*e* between the polygonal mirror 3280*c* and the closures 1. The scanning lens 3280*e* is preferably an f-Theta scanning lens, but other forms of scanning lenses may be used instead, for example a simple flat-field scanning lens.

The skilled person will appreciate that the scanning lens 3280*e* alters the characteristics of the beam 3283*b* to provide a substantially planar focal point. This results in a more continuous resolution and intensity across the plane along which the irradiated closures 1 lie, providing more consistent 30 irradiation characteristics across all of the closures 1.

Figure 84:
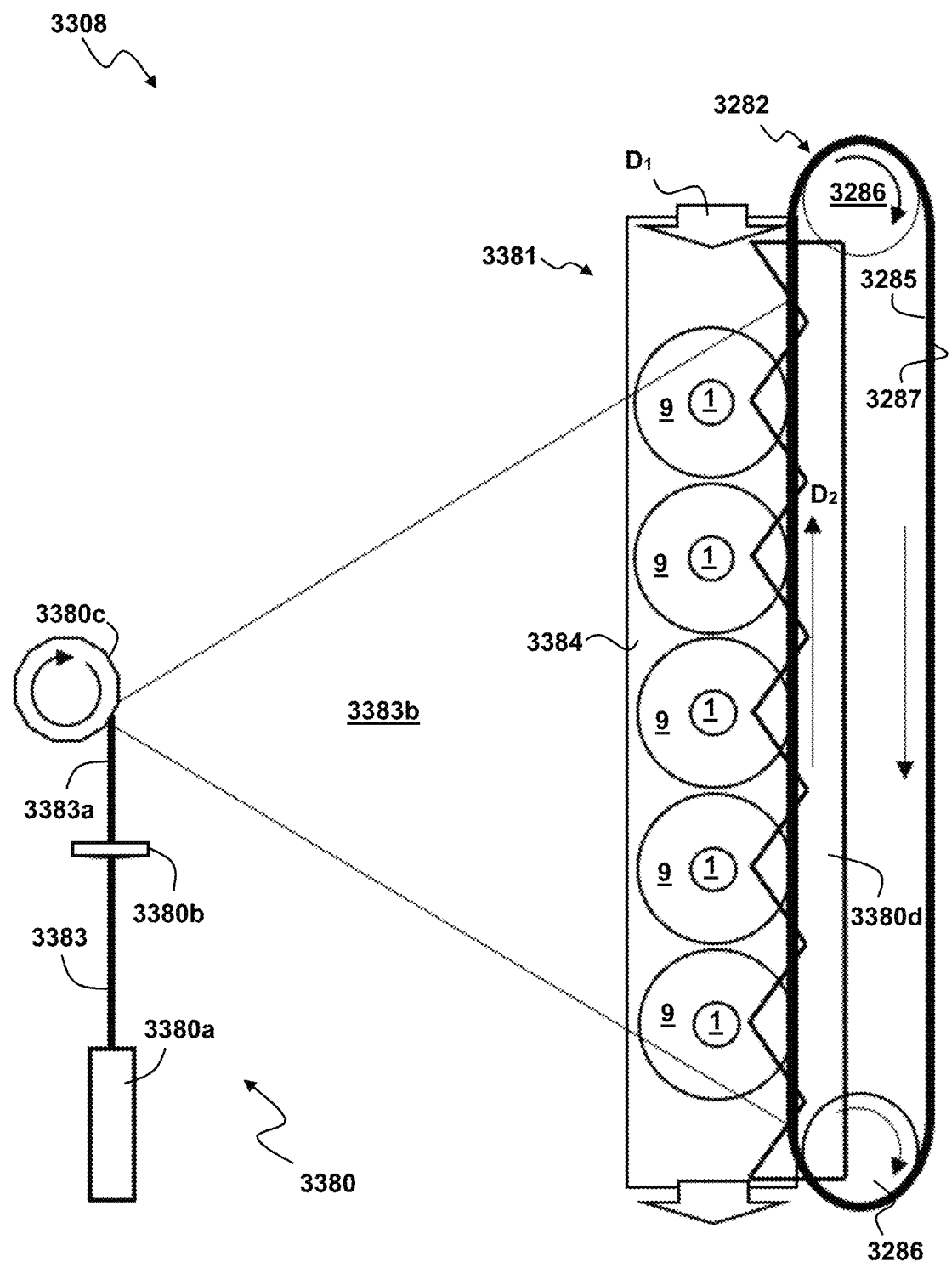
FIG. 84 depicts a schematic top view of a closure conditioning system according to yet another example, which includes a saw tooth reflector.

FIG. 84 illustrates a closure conditioning system 3308 similar to the closure conditioning system 3208 of FIG. 83, wherein like features are depicted by like references, incremented by 100. The closure conditioning system 3308 differs from that of FIG. 83 in that the moving concave mirrors 3280*d* are replaced with a single, stationary saw tooth reflector 3380d with a plurality of substantially identical triangular reflector portions 3380f. The direction of the reflected rays of the beam 3383b therefore remains constant. However, as the closures 1 move in direction $D_1$, they pass between the polygon mirror 3380c and the saw tooth reflector 3380d. As a result, the portion of the beam 3383b reflected by any part of the saw tooth reflector 3380d varies as the closures 1 move past it.

Figure 85:
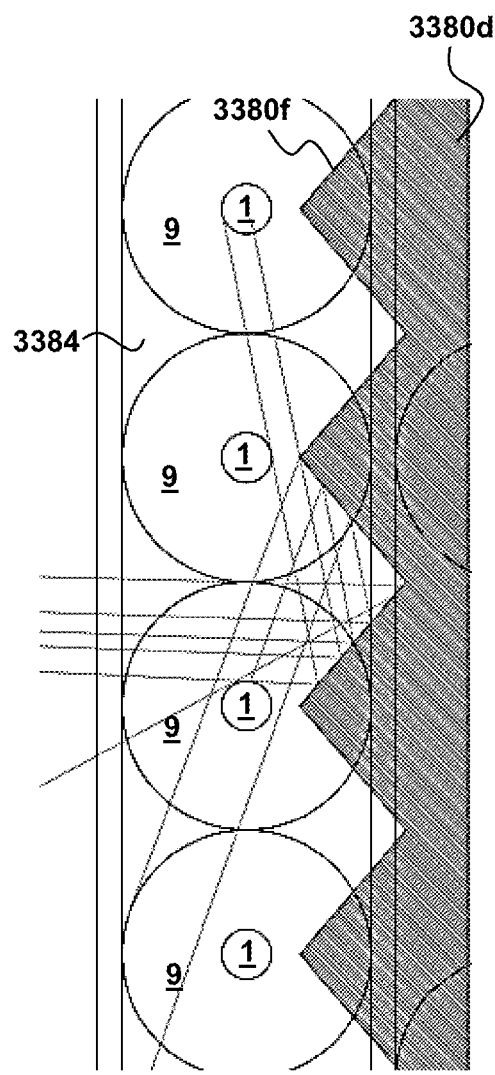
FIG. 85 depicts an enlarged view of the irradiation of the closures by the reflected beam in the system of FIG. 84.

FIG. 85 shows schematically the reflection of individual rays of the beam 3383b to illustrate how the closures 1 may be irradiated at one particular moment in time. The inventors have determined that the majority, roughly 70%, of the beam 3383b either irradiates the closure 1 directly or is reflected onto its rear side by the saw tooth reflector 3380d. The skilled person will appreciate that this arrangement is simpler to implement than the moving concave mirrors 3280d, and the loss may be deemed acceptable in many cases.

Figure 86:
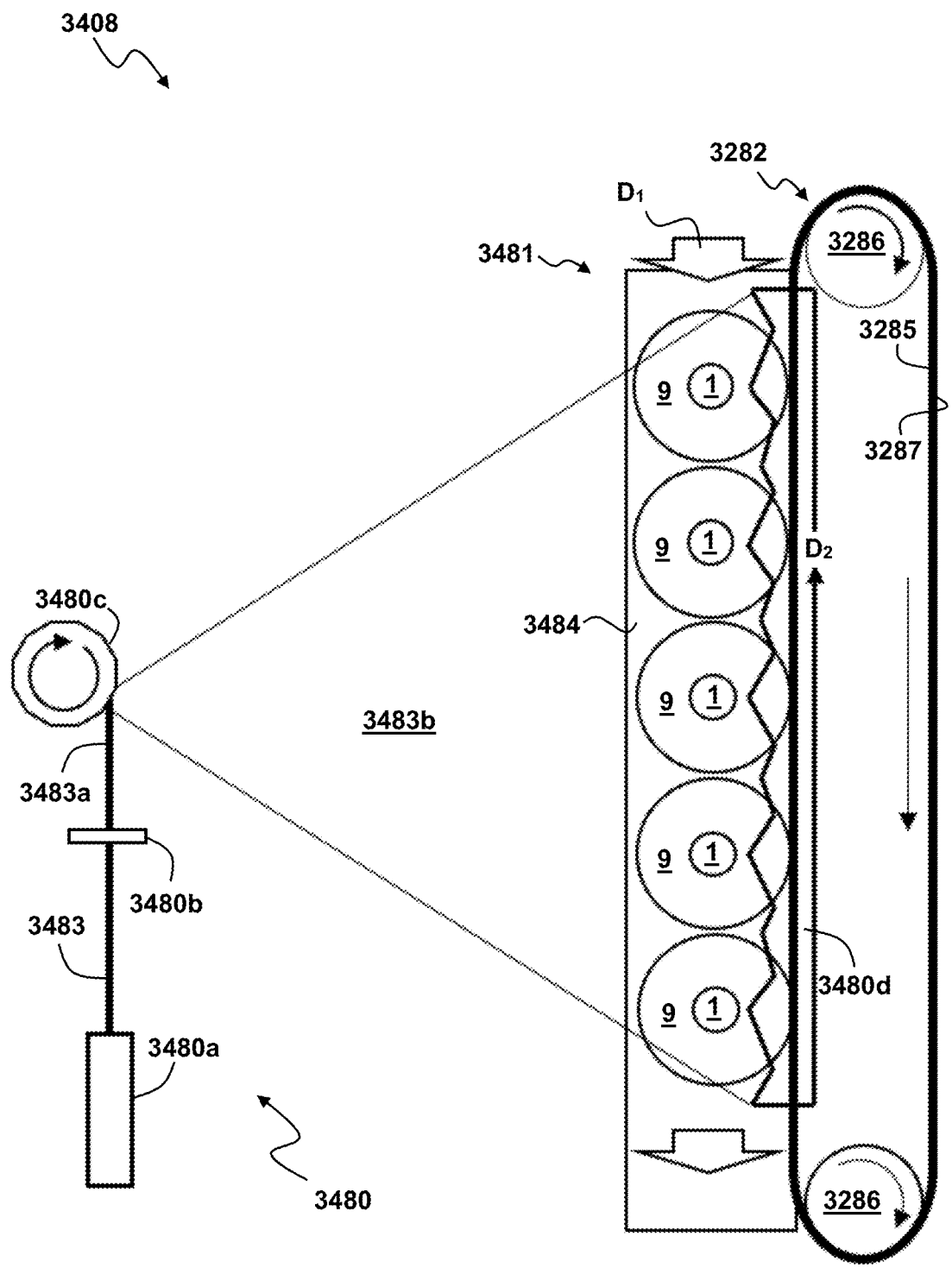
FIG. 86 depicts a schematic top view of a closure conditioning system according to yet another example, with a modified saw tooth reflector.

FIG. 86 illustrates a closure conditioning system 3408 similar to the closure conditioning system 3308 of FIG. 84, wherein like features are depicted by like references, incremented by 100. The closure conditioning system 3408 differs from that of FIG. 84 in that the stationary saw tooth reflector 3480d includes alternating large and small triangular reflector portions 3480f, 3480g.

Figure 87:
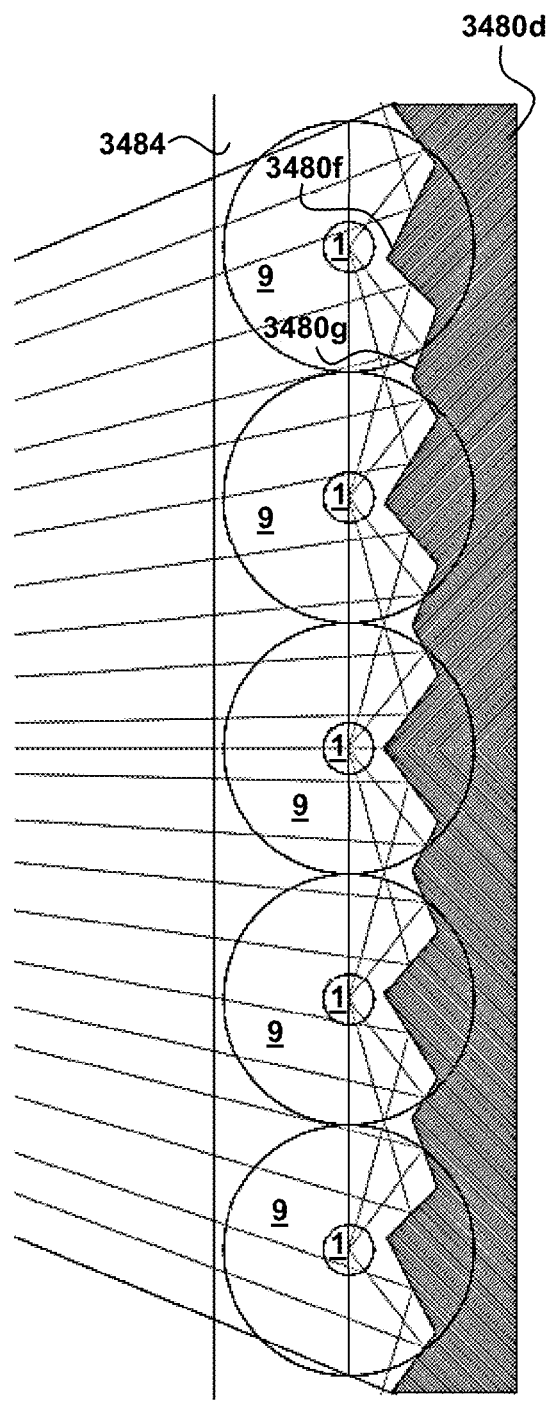
FIG. 87 depicts an enlarged view of the irradiation of the closures by the reflected beam in the system of FIG. 86.

The inventors believe that this results in a greater efficiency than the saw tooth reflector 3380d of the previous embodiment. As illustrated in FIG. 87, the alternating depth and angles of the large and small triangular reflector portions 3480f, 3480g reduces the multiple reflections that occur with substantially identical triangular reflector portions 3380f.

Of course, the triangular reflector portions 3380f, 3480f, 3480g of the saw tooth reflectors 3380d, 3480d need not be triangular in shape. They may have flanks that are curved, concave, convex, sinusoidal or any other suitable shape.

Figure 88:
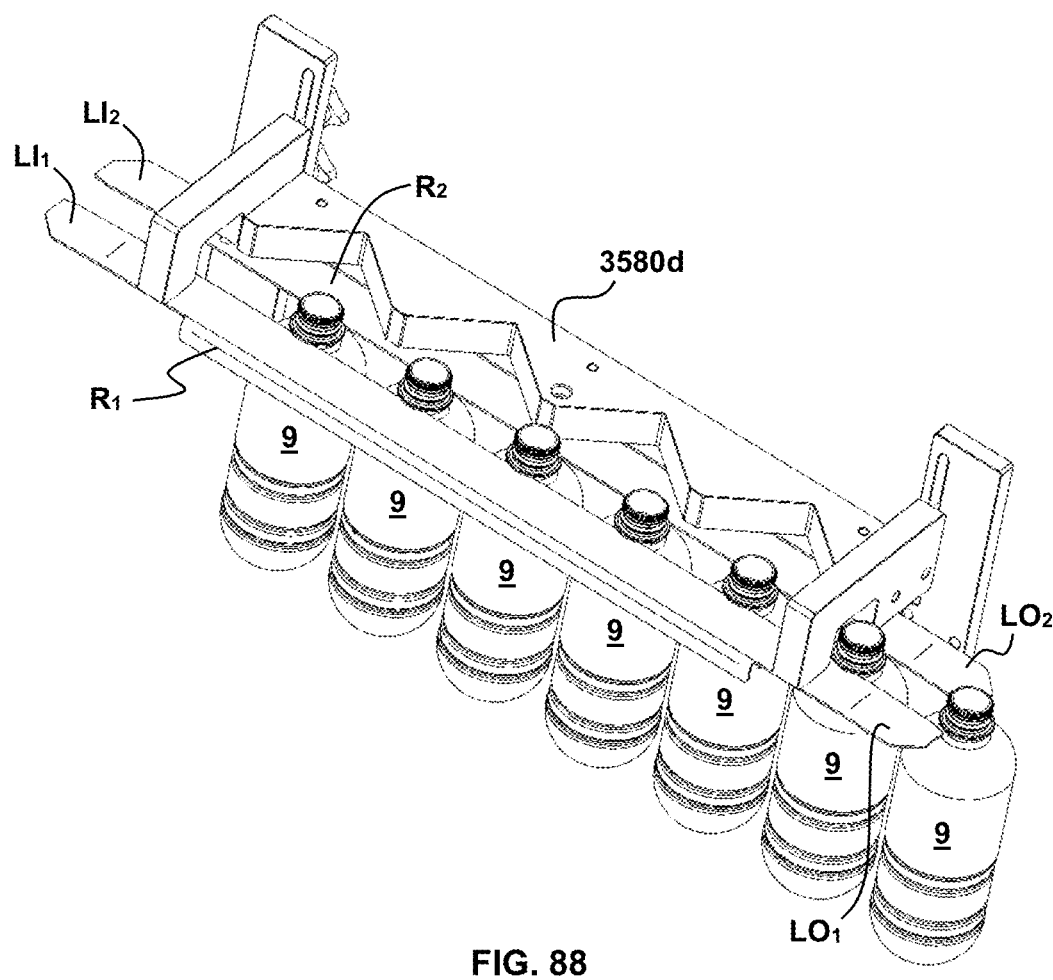
FIG. 88 depicts a perspective view of an alternative conveying means.
Figure 89:
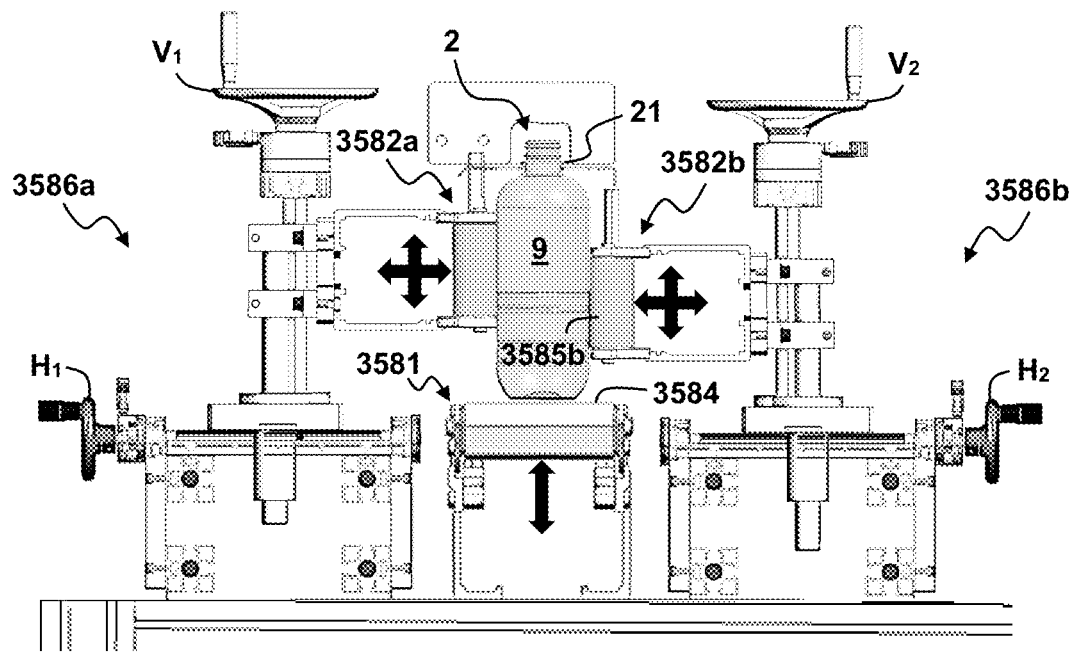
FIG. 89 depicts an view of the alternative conveying means of FIG. 88.
Figure 90:
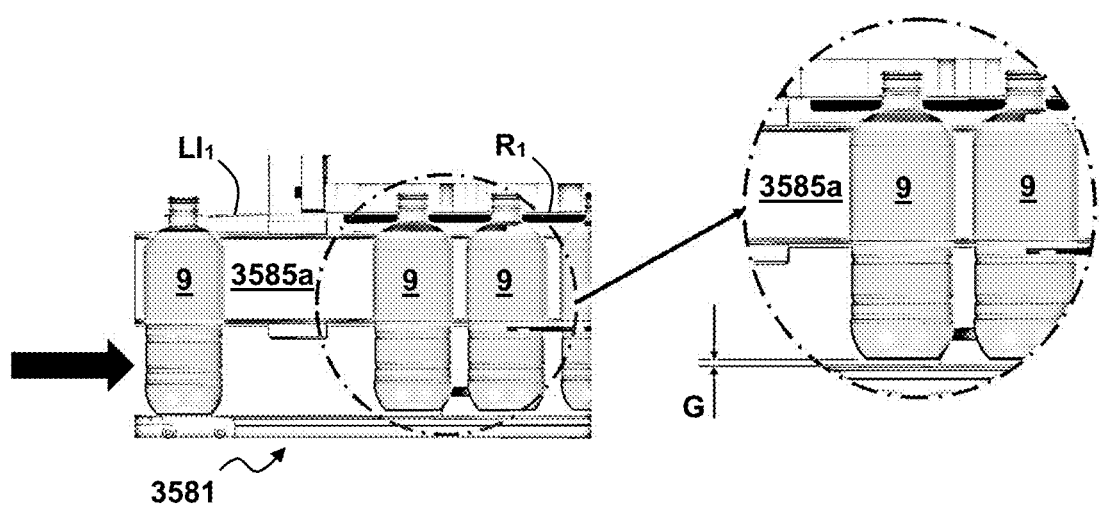
FIG. 90 depicts a side of the alternative conveying means of FIG. 88.

Turning now to FIGS. 88 to 90, there is shown an alternative conveying means, which includes a pair of rails $R_1$, $R_2$ and three conveyors 3581, 3582a, 3582b. Each rail $R_1$, $R_2$ is provided by a plate formed of a strip of shaped sheet metal oriented horizontally to provide a horizontal support surface for supporting the support ledge 21 of the container neck 2 (shown without closures installed thereon).

Each rail $R_1$, $R_2$ also has an angled lead-in $LI_1$, $LI_2$ and lead-out $LO_1$, $LO_2$. A saw tooth reflector 3580d similar to the one in the closure conditioning system 3308 of FIG. 84 is shown mounted to the rails $R_1$, $R_2$ to illustrate the relative position between the rails $R_1$, $R_2$ and the saw tooth reflector 3580d.

A first conveyor 3581 provides a moving horizontal surface 3584, which is provided by a belt in this example. The vertical height of the first conveyor 3581 is adjustable to accommodate containers 9 having different heights.

Second and third conveyors 3582a, 3582b each include an endless belt 3585a, 3585b. The endless belts 3585a, 3585b face each other and provide opposed moving vertical surfaces, which are substantially perpendicular to the moving horizontal surface 3584 of the first conveyor 3582 and engage opposite sides of the containers 9.

The vertical and horizontal position of each of the second and third conveyors 3582a, 3582b is also adjustable. More specifically, the second and third conveyors 3582a, 3582b are mounted to respective adjustment frames 3586a, 3586b, each of which includes a vertical height adjustment wheel $V_1$, $V_2$ for adjusting the vertical height of the conveyor 3582a, 3582b and a horizontal height adjustment wheel $H_1$, $H_2$ for adjusting the horizontal height of the conveyor 3582a, 3582b.

In this example, the second and third conveyors 3582a, 3582b are positioned at different heights so as to engage opposite sides of the body of the container 9 at different axial locations. The inventors have determined that this provides more reliable positioning of the closures (not shown) during simultaneous conveying and rotation of the containers 9.

As the containers 9 are conveyed along the conveyors 3581, 3582a, 3582b, their necks 2 are directed between the rails $R_1$, $R_2$, where the support ledges 21 engage the angled lead-ins $LI_1$, $LI_2$. Continued conveying of the containers 9 causes them to be raised up off the first conveyor 3581 by a distance G as they are irradiated by the laser beam (not shown). This reduces skewing of the closures (not shown) that might otherwise occur due to the rotation of the base of the containers 9 relative to the moving horizontal surface 3584.

It will be appreciated by those skilled in the art that several variations to the construction and/or use of aforementioned examples are envisaged without departing from the scope of the invention. For example, the polygon mirror 1282, 1380c, 1480d', 3080d, 3180d, 3280d, 3380d, 3480d may comprise a non-polygonal shape or any shape configured to provide the required optical effect. Similarly, the beam shaping optical device 1380b, 1480b, 3080b, 3180b, 3280b may comprise one or more lenses, or may comprise a telescopic device or any other device configured to create the desired beam characteristics.

It will also be appreciated by those skilled in the art that any number of combinations of the aforementioned features and/or those shown in the appended drawings provide clear advantages over the prior art and are therefore within the scope of the invention described herein.

What is claimed is:

1. A method of securing a closure on a container, the method comprising:
    placing the closure on a container neck of the container;
    conveying the container along a conveying direction;
    irradiating a portion of a tamper evidence band of the closure with a substantially planar laser beam to engage the portion of the tamper evidence band with the container neck as the container is conveyed along the conveying direction; and
    modifying one or more characteristics of a laser emitted by a source using one or more optical devices to provide, alter or redirect the substantially planar laser beam.

2. The method of claim 1, wherein modifying one or more characteristics of a laser emitted by a source using one or more optical devices comprises directing the laser emitted by the source at a rotating polygonal mirror to spread the laser.

3. The method of claim 2, wherein modifying one or more characteristics of a laser emitted by a source using one or more optical devices comprises directing the laser emitted by the source at a freeform mirror to spread the laser.

4. The method of claim 1, further comprising rotating the closure whilst the portion of the tamper evidence band is irradiated by the substantially planar laser beam.

5. The method of claim 4, further comprising supporting a radial support flange of the container neck and engaging opposite sides of a container body depending from the container neck to both convey the container along the conveying direction and to rotate the container and closure as it is conveyed along the conveying direction.

6. The method of claim 5, wherein engaging opposite sides of the container body comprises engaging the container body with a pair of conveyers, each conveyor of the pair of conveyers engaging the container body disposed at a different axial location.

7. The method of claim 1, further comprising reflecting a part of the substantially planar laser beam which travels past the closure back towards the closure with one or more mirrors.

8. The method of claim 7, further comprising moving the one or more mirrors with the closure along the conveying direction.

9. The method of claim 1, wherein modifying one or more characteristics of the laser emitted by the source using the one or more optical devices comprises providing the substantially planar laser beam with a substantially planar focal point along the conveying direction with a scanning lens.

10. The method of claim 1, wherein irradiating the portion of the tamper evidence band with a substantially planar laser beam comprises creating a predetermined temperature differential between an outer surface of the closure and an inner surface thereof.

11. The method of claim 1, further comprising perforating, slitting or cutting a membrane joining the tamper evidence band to the closure whilst the closure is installed on the container neck, thereby to provide a frangible connection therebetween.

12. The method of claim 1, wherein irradiating the portion of the tamper evidence band generates a visual indicator.

13. The method of claim 12, wherein generating the visual indicator comprises changing a color or opacity of the portion of the tamper evidence band.

14. The method of claim 1, wherein irradiating the portion of the tamper evidence band comprises directing the substantially planar laser beam along part of a circumference of the portion of the tamper evidence band to engage the portion of the tamper evidence band with a flange of the container neck.

15. The method of claim 1, wherein a power of the substantially planar laser beam is between 10 W and 400 W.

16. The method of claim 1, wherein a power of the substantially planar laser beam is between 20 W and 350 W.

17. The method of claim 1, further comprising gradually reducing a power of the substantially planar laser beam as the portion of the tamper evidence band of the closure is irradiated by the substantially planar laser beam.

18. The method of claim 17, wherein the power of the substantially planar laser beam is gradually reduced from between 400 W and 350 W to between 150 W and 100 W.

19. The method of claim 1, wherein the substantially planar laser beam irradiates the portion of the tamper evidence band of the closure for less than 2 seconds.

20. The method of claim 1, wherein the substantially planar laser beam irradiates the portion of the tamper evidence band of the closure for between 0.3 seconds and 0.7 seconds.

21. The method of claim 1, wherein the substantially planar laser beam irradiates the portion of the tamper evidence band of the closure for between 0.4 seconds and 0.6 seconds.

22. The method of claim 1, wherein the closure is a plurality of closures, and the container is a plurality of containers, and further comprising:
placing each of the plurality of closures on a container neck of each of the plurality of containers;
conveying each of the plurality of containers along a conveying direction; and
simultaneously irradiating a portion of tamper evidence bands of at least some of the plurality of closures on container necks of at least some of the plurality of containers with the substantially planar laser beam.

23. A method of securing a closure on a container, the method comprising:
placing the closure on a container neck of the container;
conveying the container along a conveying direction; and
irradiating a portion of a tamper evidence band of the closure with a substantially planar laser beam to engage the portion of the tamper evidence band with the container neck as the container is conveyed along the conveying direction;
wherein irradiating the portion of the tamper evidence band generates a visual indicator, and
wherein generating the visual indicator comprises crystallizing the portion of the tamper evidence band.

24. A method of securing a closure on a container, the method comprising:
placing the closure on a container neck of the container;
conveying the container along a conveying direction; and
irradiating a portion of a tamper evidence band of the closure with a substantially planar laser beam to engage the portion of the tamper evidence band with the container neck as the container is conveyed along the conveying direction;
wherein irradiating the portion of the tamper evidence band comprises directing the substantially planar laser beam along part of a circumference of the portion of the tamper evidence band to engage the portion of the tamper evidence band with a flange of the container neck; and
wherein directing the substantially planar laser beam along part of the circumference of the portion of the tamper evidence band causes a free edge of the tamper evidence band to curl inwardly to engage with the flange of the container neck.

25. The method of claim 24, wherein a mating surface of the tamper evidence band clears the flange when the closure is placed over the container neck, but engages the flange if the closure is removed from the container neck after the tamper evidence band is irradiated by the substantially planar laser beam.

26. A method of securing a closure on a container, the method comprising:
placing the closure on a container neck of the container;
conveying the container and the closure along a conveying direction;
rotating the container and the closure as the container and the closure are conveyed along the conveying direction;
irradiating a portion of a tamper evidence band of the closure with a laser to engage the portion of the tamper evidence band with the container neck as the container and the closure are rotated and conveyed along the conveying direction; and
supporting a radial support flange of the container neck and engaging opposite sides of a container body depending from the container neck to both convey the container along the conveying direction and to rotate the container and closure as it is conveyed along the conveying direction.

27. The method of claim 26, wherein irradiating the portion of a tamper evidence band comprises irradiating an entire circumference of the tamper evidence band.

28. The method of claim 26, wherein engaging opposite sides of the container body comprises engaging the container body with a pair of conveyers, each conveyor of the pair of conveyers engaging the container body disposed at a different axial location.

\* \* \* \* \*